United States Patent
Bonissone et al.

(10) Patent No.: US 7,630,928 B2
(45) Date of Patent: *Dec. 8, 2009

(54) SYSTEMS AND METHODS FOR MULTI-OBJECTIVE PORTFOLIO ANALYSIS AND DECISION-MAKING USING VISUALIZATION TECHNIQUES

(75) Inventors: Piero Patrone Bonissone, Schenectady, NY (US); Srinivas Bollapragada, Niskayuna, NY (US); Kete Charles Chalermkraivuth, Niskayuna, NY (US); Neil Holger White Eklund, Clifton Park, NY (US); Naresh Sundaram Iyer, Clifton Park, NY (US); Rajesh Venkat Subbu, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/781,871

(22) Filed: Feb. 20, 2004

(65) Prior Publication Data
US 2005/0187847 A1    Aug. 25, 2005

(51) Int. Cl.
G06Q 40/00    (2006.01)
(52) U.S. Cl. .................................... 705/36 R
(58) Field of Classification Search ............... 705/36 R, 705/35
See application file for complete search history.

(56) References Cited

U.S. PATENT DOCUMENTS

| 5,126,936 A | 6/1992 | Champion et al. |
| 5,148,365 A | 9/1992 | Dembo |
| 5,195,026 A | 3/1993 | Nonaka |
| 5,202,827 A | 4/1993 | Sober |
| 5,210,687 A | 5/1993 | Wolfberg |
| 5,347,446 A | 9/1994 | Iino |

(Continued)

FOREIGN PATENT DOCUMENTS

EP    0356191 A2    2/1990

(Continued)

OTHER PUBLICATIONS

"Genetic Algorithms and Genetic Programming in Computational Finance" by Shu-Hen Chen p. 223-224 Copyright 2002 http://books.google.com/books?id=U7MuQQS-XNsC&printsec=copyright&dq=genetic+algorithm+to+form+efficient+frontier#PPR19,M1.*

(Continued)

*Primary Examiner*—James A Kramer
*Assistant Examiner*—James A Vezeris
(74) *Attorney, Agent, or Firm*—Scott J. Asmus

(57) ABSTRACT

The systems and methods of the invention are directed to portfolio optimization and related techniques. For example, the invention provides a method for multi-objective portfolio optimization for use in investment decisions based on competing objectives and a plurality of constraints constituting a portfolio problem, the method sequentially comprising: generating a non-dominated solution set in a space; applying a first set of user-specified constraints to reduce the solutions in the non-dominated solution set to a solution subset; and executing a series of local tradeoffs on the solution subset to result in a resulting solution subset, the local tradeoffs being performed in a lower dimension performance space as compared to the space, and the solution subset being used in investment decisioning.

14 Claims, 38 Drawing Sheets

U.S. PATENT DOCUMENTS

| | | |
|---|---|---|
| 5,351,184 A | 9/1994 | Lu |
| 5,550,734 A | 8/1996 | Tarter |
| 5,587,897 A | 12/1996 | Iida |
| 5,590,037 A | 12/1996 | Ryan |
| 5,659,667 A | 8/1997 | Buescher |
| 5,682,465 A | 10/1997 | Kil |
| 5,704,044 A | 12/1997 | Tarter |
| 5,732,397 A | 3/1998 | DeTore |
| 5,784,696 A | 7/1998 | Melinikoff |
| 5,799,287 A | 8/1998 | Dembo |
| 5,802,500 A | 9/1998 | Ryan |
| 5,875,437 A | 2/1999 | Atkins |
| 5,884,283 A | 3/1999 | Manos |
| 5,884,286 A | 3/1999 | Daughtery |
| 5,884,287 A * | 3/1999 | Edesess ............... 705/36 R |
| 5,918,217 A | 6/1999 | Maggioncalda |
| 5,926,792 A | 7/1999 | Koppes |
| 5,930,762 A | 7/1999 | Masch |
| 5,991,744 A | 11/1999 | DiCresce |
| 5,999,917 A | 12/1999 | Facciani |
| 6,003,018 A | 12/1999 | Michaud |
| 6,018,722 A | 1/2000 | Ray et al. |
| 6,032,109 A | 2/2000 | Ishii |
| 6,049,772 A | 4/2000 | Payne |
| 6,078,904 A | 6/2000 | Rebane |
| 6,092,050 A | 7/2000 | Lungren |
| 6,098,051 A | 8/2000 | Lupien |
| 6,138,102 A | 10/2000 | Hinckley |
| 6,161,096 A | 12/2000 | Bell |
| 6,219,649 B1 | 4/2001 | Jameson |
| 6,240,399 B1 | 5/2001 | Frank et al. |
| 6,275,814 B1 | 8/2001 | Giasante et al. |
| 6,278,464 B1 | 8/2001 | Kohavi |
| 6,282,520 B1 | 8/2001 | Schirripa |
| 6,289,296 B1 | 9/2001 | Umeno |
| 6,289,508 B1 | 9/2001 | Erickson |
| 6,330,541 B1 | 12/2001 | Meyer |
| 6,336,102 B1 | 1/2002 | Luskin et al. |
| 6,336,103 B1 | 1/2002 | Baker |
| 6,351,740 B1 | 2/2002 | Rabinowitz |
| 6,360,191 B1 | 3/2002 | Koza et al. |
| 6,373,485 B2 | 4/2002 | Sowizral |
| 6,393,409 B2 | 5/2002 | Young et al. |
| 6,405,179 B1 | 6/2002 | Rebane |
| 6,424,952 B1 | 7/2002 | Yinbal |
| 6,445,391 B1 | 9/2002 | Sowizral |
| 6,470,321 B1 | 10/2002 | Cumming |
| 6,601,044 B1 | 7/2003 | Wallman |
| 6,611,807 B1 | 8/2003 | Bernheim |
| 6,684,190 B1 | 1/2004 | Powers |
| 6,735,571 B2 | 5/2004 | Coleman |
| 6,735,573 B1 | 5/2004 | Gelman |
| 6,771,293 B1 | 8/2004 | Josephson et al. |
| 6,895,390 B1 | 5/2005 | Hagan |
| 7,047,167 B2 | 5/2006 | Yamaguchi |
| 7,089,206 B2 | 8/2006 | Martin |
| 7,155,423 B1 | 12/2006 | Josephson et al. |
| 2001/0014875 A1 | 8/2001 | Young et al. |
| 2001/0032029 A1 * | 10/2001 | Kauffman ............... 700/99 |
| 2001/0051936 A1 | 12/2001 | Michalewicz |
| 2001/0055019 A1 | 12/2001 | Sowizral |
| 2002/0000986 A1 | 1/2002 | Sowizral |
| 2002/0002521 A1 | 1/2002 | Shearer |
| 2002/0032585 A1 | 3/2002 | Keyes |
| 2002/0033835 A1 | 3/2002 | Sowizral |
| 2002/0038272 A1 | 3/2002 | Menchero |
| 2002/0040307 A1 | 4/2002 | Roscoe |
| 2002/0049618 A1 | 4/2002 | McClure |
| 2002/0050990 A1 | 5/2002 | Sowizral |
| 2002/0059294 A1 | 5/2002 | Bottarelli |
| 2002/0065636 A1 | 5/2002 | Yamaguchi |
| 2002/0082872 A1 | 6/2002 | Aoki |
| 2002/0091605 A1 | 7/2002 | Labe, Jr. |
| 2002/0091613 A1 | 7/2002 | Kendall |
| 2002/0099929 A1 | 7/2002 | Jin |
| 2002/0111780 A1 | 8/2002 | Sy |
| 2002/0116158 A1 | 8/2002 | Heching |
| 2002/0116309 A1 | 8/2002 | Keyes |
| 2002/0123951 A1 | 9/2002 | Olsen et al. |
| 2002/0123953 A1 | 9/2002 | Goldfarb |
| 2002/0128544 A1 | 9/2002 | Diab |
| 2002/0129332 A1 | 9/2002 | Svensson |
| 2002/0138299 A1 | 9/2002 | Nations |
| 2002/0138383 A1 | 9/2002 | Rhee |
| 2002/0143682 A1 | 10/2002 | Bergmann |
| 2002/0147671 A1 | 10/2002 | Sloan et al. |
| 2003/0110113 A1 | 6/2003 | Martin |
| 2003/0139993 A1 | 7/2003 | Feuerverger |
| 2003/0144944 A1 | 7/2003 | Kalt et al. |
| 2003/0177077 A1 | 9/2003 | Norman |
| 2003/0182224 A1 | 9/2003 | Horrigan et al. |
| 2003/0187771 A1 | 10/2003 | Bulan |
| 2003/0191672 A1 | 10/2003 | Kendall |
| 2003/0208427 A1 | 11/2003 | Peters et al. |
| 2003/0208432 A1 | 11/2003 | Wallman |
| 2003/0233304 A1 | 12/2003 | Dhurandhar |
| 2004/0059609 A1 | 3/2004 | Chatlain |
| 2004/0078244 A1 | 4/2004 | Katcher |
| 2004/0078248 A1 | 4/2004 | Altschuler |
| 2004/0111278 A1 | 6/2004 | Brown |
| 2004/0181479 A1 | 9/2004 | Zosin et al. |
| 2004/0186804 A1 | 9/2004 | Chakraborty |
| 2004/0186814 A1 | 9/2004 | Chalermkraivuth |
| 2004/0199448 A1 | 10/2004 | Chalermkraivuth |
| 2004/0220837 A1 | 11/2004 | Bonissone |
| 2004/0225536 A1 | 11/2004 | Schoen |
| 2004/0243499 A1 | 12/2004 | Bateson |
| 2005/0055250 A1 | 3/2005 | Kopold |
| 2005/0091085 A1 | 4/2005 | Colley |
| 2005/0154617 A1 | 7/2005 | Ruggieri |
| 2005/0187844 A1 | 8/2005 | Chalermkraivuth |
| 2005/0187845 A1 | 8/2005 | Eklund et al. |
| 2005/0187846 A1 | 8/2005 | Subbu et al. |
| 2005/0187847 A1 | 8/2005 | Bonissone et al. |
| 2005/0187848 A1 | 8/2005 | Bonissone et al. |
| 2005/0187849 A1 | 8/2005 | Bollapragada et al. |

FOREIGN PATENT DOCUMENTS

| | | |
|---|---|---|
| EP | 0505087 A2 | 9/1992 |
| JP | 63-279301 | 11/1988 |
| JP | 6-95707 | 4/1994 |
| JP | 7-85110 | 3/1995 |
| JP | 2001-76057 | 3/2001 |
| WO | WO 95/25295 | 9/1995 |
| WO | WO 96/18162 | 6/1996 |
| WO | WO 98/13776 | 4/1998 |
| WO | WO 99/23592 | 5/1999 |
| WO | WO 99/39290 | 8/1999 |
| WO | WO 99/49399 | 9/1999 |
| WO | WO 01/31481 A2 | 5/2001 |
| WO | WO 01/39005 A2 | 5/2001 |
| WO | WO 01/55890 A2 | 8/2001 |
| WO | WO 01/55939 A2 | 8/2001 |
| WO | WO 01/77872 A2 | 10/2001 |
| WO | WO 01/84355 A2 | 11/2001 |
| WO | WO 01/93153 A1 | 12/2001 |
| WO | WO 02/075650 | 9/2002 |

OTHER PUBLICATIONS

JPMorgan/Reuters RiskMetrics™—Technical Documents Fourth Edition, Dec. 17, 1996.

Jorge Mina & Andrew Ulmer Delta-Gamma Four Ways Aug. 31, 1999.

Stefan Pichler & Karl Selitsch A Comparison of Analytical VaR Methodologies for Portfolios That Include Options Dec. 1999.

Jorge Mina & Jerry Yi Xiao return to RiskMetrics: The Evolution of a Standard Apr. 2001.

Eklund, Neil Holger White, Multiobjective visible spectrum optimization: A genetic algorithm approach, Rensselaer Polytechnic Institute, vol. 6311B of Dissertions Abstracts International, 2002.

Abbass, H.A., Sarker, R Newton, C, PDE:a Pareto-frontier differential evolution approach for multi-ojective optimization problems, Proceedings of the 2001 Congress on Evolutionary Computation, vol. 2, IEEE, May 27-30, 2001.

Ignizio, James, An Algorithm for Solving the Linear Goal Programming Problem by Solving Its Dual, The Journal of the Operational research Society, vol. 36, No. 6 (Jun. 1985) pp. 507-515.

Masud, Abu, Interactive Sequential Goal Programming, The Journal of the Operational Research Society, vol. 32, No. 5 (May 1981), pp. 391-400.

Bellmore, M, Generalized Penalty function Concepts in Mathmatical Optimization, Operations research, vol. 18, No. 2 (Mar.-Apr. 1970), pp. 229-252.

Iwamura, K., Chances constrained integer Programming Models for Capital Budgeting in Fizzy Environments, The Journal of the Operational Research Society, vol. 49, No. 8 (Aug. 1998), pp. 854-860.

Iyer, Naresh Sundaram, "A family of dominance filters for mulitple criteria decision making: Chossing the right filter for a decision situation". Proquest Dissertations and Theises 2001. Section 0168, Part 0984 169 pages: [Ph.D. dissertation]. United States—Ohio: The Ohio State University: 2001. Publication No. AAT 3035522.

Baglioni, S., et al., An Evolutionary Approach to Multiperiod Asset Allocation, Proceedings of Genetic Programming, (EuroGP'2000), vol. 1802, pp. 225-236, Springer-Verlag, Edinburgh, 2000.

Loraschi, A., et al., An Evolutionary Algorithm For Portfolio Selection In A Downside Risk Framework, European Journal of Finance, 1994.

Kalvelagen, E., Solving Multi-Objective Models With GAMS, citeseer.nj.nec.com/article/kalvelagen02solving.html, Sep. 20, 2002.

Rinaldo, F., A Comparison of Stochastic Search Heuristics for Portfolio Optimization, Proceedings of the Second International Conference on Artificial Intelligence Applications on Wall Street, Software Engineering Press, Apr. 1993, pp. 149-151.

Streichert, F., Introduction to Evolutionary Algorithms, University of Tuebingen, Presented at the Frankfurt MathFinance Workshop, Apr. 2, 2002.

Korczak, et al., Evolutionary Approach to Portfolio Optimization, University of Wroclaw, Institute of Computer Science, 2001.

Eklund, N., Multi-objective optimization of spectra using genetic algorithms, Dept. of Decision Sciences and Engineering Systems, RPI, 2001.

Bodie, Z., et al., Investments, Fourth edition, Irwin/McGraw Hill, 1999.

DeFusco, R.A., et al., Quantitative Methods for Investment Analysis, AIMR, 2001.

Hull, J.C., Options, Futures & Other Derivatives, Fourth Edition, Prentice-Hall, 2000.

Back, Thomas, Evolutionary Algorithms in Theory and Practice, Oxford University Press, New York, 1996.

Breiman, L., et al., Classification and Regression Trees, Wadsworth International Group, Calfornia, 1984.

De ath, G., Multivariate Regression Trees: A new technique for modeling species-environment relationships, Ecology, p. 1105, 2001.

Coello, C., et al. Evolutionary Algorithm MOP Approaches, Evolutionary Algorithms for Solving Multi-Objective Problems, pp. 59-99. Kluwer Academic, 2002.

Goldberg, D., Genetic Algorithms in Search, Optimization, and Machine Learning, Addison-Wesley, Massachusetts, 1989.

Dempster, A., Upper and lower probabilities induced by a multivalued mapping, Annals of Mathematical Statistics, 38:325-339, 1976.

Shafer, G., A Mathematical Theory of Evidence, Princeton University Press, Princeton, New Jersey, 1967.

Schweizer B., et al., Associative Functions and Abstract Semi-Groups, Publicationes Mathematicae Debrecen, 10:69-81, 1963.

Bonissone, P., Summarizing and Propagating Uncertain Information with Triangular Norms, International Journal of Approximate Reasoning, 1(1):71-101, Jan. 1987.

Winston, W., Operations Research: Applications and Algorithms, Duxbury Press, Belmont, California, 1994.

Goldberg, D., The Design of Innovation: Lessons from and for Competent Genetic Algorithms Kluwer Academic Publishers, Norwell, Mass., 2002.

Michalewicz, Z., Genetic Algorithms+Data Structures=Evolution Programs (3rd. Ed). Springer-Verlag, Berlin, 1996.

Josephson, J.R., et al. An Architecture for Exploring Large Design Spaces, Proceedings of National Conference of the American Association for Artificial Intelligence, Madison, Wis., pp. 143-150, 1998.

Tarascio, V., Pareto's Methodological Approach to Economics, University of North Carolina Press, Chapel Hill, Va., 1968.

Fong, G., A Multidimensional Framework for Risk Analysis, Financial Analysts Journal, Jul./Aug. 1997.

Larsen, D., et al., Multivariate Regression Tree for analysis of abundance data, 2002.

Albanese, C., et al. Dimension Reduction in the computation of Value-at-risk, Feb. 28, 2002.

Reilly, F.K., et al., Investment Analysis and Portfolio Management, 6th Edition, Dryden, 2000.

Fabozzi, F.J., Fixed income analysis for the chartered financial analyst program, Fabozzi Associates, 2000.

Indraneel, D., et al., A Closer Look at Drawbacks of Minimizing Weighted Sums of Objectives for Pareto Set Generation in Multicriteria Optimization Problems Structural Optimization, 14(1), pp. 63-69, 1997.

Schaffer, J.D., et al., Multi-objective Learning via Genetic Algorithms, Ninth International Joint Conference on Artificial Intelligence, pp. 593-595, 1985.

Subbu, Raj, et al., Modeling and Convergence Analysis of Distributed Coevolutionary Algorithms, IEEE International Congress on Evolutionary Computation, pp. 1276-1283, 2000.

Greene, F., A method for utilizing diploid/dominance in genetic search, First IEEE International Conference on Evolutionary Computation, v1, 439. IEEE Service Center, Piscataway, N.J., pp. 171-176, 1994.

(In book "Foundations of Genetic Algorithms") D. Goldberg and K. Deb, A comparison of selection schemes used in genetic algorithms. In "Foundations of Genetic Algorithms," Rawlins, G. (Ed.), 69. M. Kaufmann Publishers, San Mateo, Calif., 69-93, 1991 (select pages from book, including paper Abstract).

Coello, C., et al., Moses: A multiobjective optimization tool for engineering design, Engineering Optimization, 31:337-368, 1999.

Horn, J., Multicriterion Decision Making, Handbook of Evolutionary Computation, (Back T, Fogel DB and Michalewicz Z, eds.), pp. F1.9:1-F1.9:15, IOP Publication Ltd and Oxford University Press, 1997.

Subbu, Raj, et al., Modeling and Convergence Analysis of Distributed Coevolutionary Algorithms, IEEE Transactions on Systems, Man, and Cybernetics—Part B: Cybernetics, vol. 34, No. 2, Apr. 2004.

* cited by examiner

Process to interactively fill any gaps in the identified efficient frontier

Efficient Frontier in a 3D View

| Allocation | Asset Class 1 | Asset Class 2 | Asset Class 3 | Asset Class 4 | Asset Class 5 | Total |
|---|---|---|---|---|---|---|
| Original Portfolio | 35% | 20% | 5% | 15% | 25% | 100% |
| P1 | 20% | 15% | 25% | 15% | 25% | 100% |
| P2 | 40% | 25% | 10% | 10% | 15% | 100% |
| P3 | 20% | 20% | 15% | 20% | 25% | 100% |
| P4 | 15% | 30% | 20% | 20% | 15% | 100% |
| P5 | 45% | 20% | 15% | 10% | 10% | 100% |
| P6 | 20% | 25% | 20% | 25% | 10% | 100% |
| P7 | 25% | 25% | 15% | 20% | 15% | 100% |
| P8 | 30% | 15% | 10% | 25% | 20% | 100% |
| P9 | 20% | 25% | 15% | 20% | 20% | 100% |
| P10 | 30% | 10% | 15% | 25% | 20% | 100% |

Fig. 24

| Deltas | Asset Class 1 | Asset Class 2 | Asset Class 3 | Asset Class 4 | Asset Class 5 | Net Change |
|---|---|---|---|---|---|---|
| P1 | -15% | -5% | 20% | 0% | 0% | 0% |
| P2 | 5% | 5% | 5% | -5% | -10% | 0% |
| P3 | -15% | 0% | 10% | 5% | 0% | 0% |
| P4 | -20% | 10% | 15% | 5% | -10% | 0% |
| P5 | 10% | 0% | 10% | -5% | -15% | 0% |
| P6 | -15% | 5% | 15% | 10% | -15% | 0% |
| P7 | -10% | 5% | 10% | 5% | -10% | 0% |
| P8 | -5% | -5% | 5% | 10% | -5% | 0% |
| P9 | -15% | 5% | 10% | 5% | -5% | 0% |
| P10 | -5% | -10% | 10% | 10% | -5% | 0% |
| Average | -9% | 1% | 11% | 4% | -8% | |
| Median | -13% | 3% | 10% | 5% | -8% | |

Fig. 25

Deterministic Evaluation

Discrete Probabilistic Evaluation $A=\{ \quad p_1(1,1) = 1$
$\quad p_2(3,3) = 1$
$\quad p_3(6,5) = 1\}$ $B=\{\{ \ p_4(1, 1.5) = \ m1*m3$
$\quad p_4(1, 3) = \quad m1*(1-m3)$
$\quad p_4(2, 1.5) = \ (1-m1)*m3,$
$\quad \mathbf{p_4\,(2, 3)} = \quad \mathbf{(1-m1)*(1-m3)}\},$ $\{\mathbf{p_5(2, 3)} = \quad \mathbf{m4*m6}$
$\quad \mathbf{p_5(3, 3)} = \quad \mathbf{m5*m6}$
$\quad p_5(4, 3) = \quad (1-m4-m5)*m6$
$\quad p_5(2, 4) = \quad m4*(1-m6)$
$\quad p_5(3, 4) = \quad m5*(1-m6)$
$\quad p_5(4, 4) = \quad (1-m4-m5*(1-m6)\} \}$ Fusion (PF) of multiple assignments to the same point:
$PF(2,3) = p_4(2,3) + p_5(2,3) - p_4(2,3)*p_5(2,3)$
$\quad = (1-m1)*(1-m3) + m4*m6 - [(1-m1)*(1-m3)*m4*m6$ $PF(3,3) = p_2(3,3) + p_5(3,3) - p_2(3,3)*p_5(3,3)$
$\quad = 1 + m5*m6 - 1*m5*m6 = 1$

Probabilistic Fusion

Feasible Regions for Optimization

| Graphic Visual | Word Description | Example Equation | GEAM |
|---|---|---|---|
| Linear Convex Space<br>(octagon with line$_1$, line$_2$) | • For any two points in the space, the line connecting the two points is always contained in the same space<br>• Space is defined using linear equations | $\begin{bmatrix} a_{11} & a_{12} \\ a_{21} & a_{22} \\ \vdots & \vdots \\ a_{81} & a_{82} \end{bmatrix} \begin{bmatrix} x \\ y \end{bmatrix} \leq \begin{bmatrix} b_1 \\ b_2 \\ \vdots \\ b_8 \end{bmatrix}$<br>Set of linear equations | • Market value weighted yield formulation<br>• Duration weighted yield formulation |
| Nonlinear Convex Space<br>(shape with line$_1$, line$_2$) | • For any two points in the space, the line connecting the two points is always contained in the same space<br>• Space is defined using some nonlinear equations | $\begin{bmatrix} a_{11} & a_{12} \\ a_{21} & a_{22} \\ \vdots & \vdots \\ a_{51} & a_{52} \end{bmatrix} \begin{bmatrix} x \\ y \end{bmatrix} \leq \begin{bmatrix} b_1 \\ b_2 \\ \vdots \\ b_5 \end{bmatrix}$<br>$x^2 + y^2 \leq \alpha$   Nonlinear equation | • Interest rate sigma formulation |
| Nonlinear Nonconvex Space<br>(crescent shape with line$_1$, line$_2$) | • For any two points in the space, the line connecting the two points is <u>not</u> always contained in the same space<br>• Space is defined using some nonlinear equations | $\begin{bmatrix} a_{11} & a_{12} & a_{13} \\ a_{21} & a_{22} & a_{23} \end{bmatrix} \begin{bmatrix} x^2 \\ x \\ y \end{bmatrix} \leq \begin{bmatrix} b_1 \\ b_2 \end{bmatrix}$<br>Set of nonlinear equations | • Interest rate sigma and VAR formulation<br>• VAR is a nonlinear nonconvex constraint |

Figure 34

Objective Functions

| Graphic Visual | Word Description | Example Equation | GEAM |
|---|---|---|---|
| Linear Function | • Function is defined using linear equations<br>• Straightforward math relationship<br>• Easy to optimize | $f(x, y) = 2x + y + 5$ | • Market value weighted yield<br>• Duration weighted yield |
| Nonlinear Convex Function | • Function is defined using a nonlinear equation<br>• Functional gradients lead to single optimum<br>• Harder to optimize | $f(x, y) = x^2 + y^2$ | • Interest rate sigma |
| Nonlinear Nonconvex Function | • Function is defined using complex nonlinear equations<br>• Multiple local optima<br>• Functional gradients are inefficient<br>• Very hard to optimize | $f(x,y) = g_1(x,y) + g_2(x,y) + g_3(x,y) + g_4(x,y)$ | • Interest rate sigma and VAR |

Example of Outer Product using as operator the function T(x,y)

| T-norm | Correlation Type |
|---|---|
| $T_1(x,y) = \max(0, x+y-1)$ | Extreme case of negative correlation |
| $T_2 = x * y$ | No correlation |
| $T_3 = \min(x,y)$ | Extreme case of positive correlation |

Figure 37

Example of Outer Product using as operator the function $S(x,y)$

| T-conorm | Correlation Type |
|---|---|
| $S_1 = \min(1, x+y)$ | Extreme case of negative correlation |
| $S_2 = x + y - (x*y)$ | No correlation |
| $S_3 = \max(x,y)$ | Extreme case of positive correlation |

Figure 38

SYSTEMS AND METHODS FOR MULTI-OBJECTIVE PORTFOLIO ANALYSIS AND DECISION-MAKING USING VISUALIZATION TECHNIQUES

BACKGROUND OF THE INVENTION

The invention is directed to portfolio optimization and techniques associated with optimization processing of asset portfolios, such as portfolios of securities, for example.

Markowitz's portfolio theory, a foundation of modern finance, is based on a trade-off between a single return and a single risk measure. Variance or standard deviation of return is typically employed as a measure of risk. The goal of portfolio optimization is maximizing return and, at the same time, minimizing risk. This is typically treated as a two-objective optimization problem using the following problem formulation:

| Minimize | Variance; |
|---|---|
| subject to | Return $\geq$ target, and portfolio constraints. |

Alternatively, the portfolio optimization might be described with the following alternative portfolio optimization problem formulation:

| Maximize | Return; |
|---|---|
| subject to | Variance $\leq$ target, and portfolio constraints. |

As is known in the art, the efficient frontier can be obtained by varying the return target, or alternatively the risk target, and optimizing on the other measure, i.e., the measure that is not being varied. The resulting efficient frontier is a curve in a two-dimensional space as shown in FIG. 1. Each of these approaches uses variance as a sole risk measure. Each point on the efficient frontier is a portfolio consisting of a collection of assets. For example, these assets may be a collection of securities.

However, there are major drawbacks to this approach. In modern portfolio management, portfolio managers not only care about the variation around mean, but also the risk of losing most of the portfolio's value due to rare events. In a normal situation, the portfolio value fluctuates around its mean due to market volatility and other risk drivers. However, a portfolio may lose a significant amount of value from a low-probability-high-impact event. This possibility calls for a need to use other risk measures, in addition to variance, for managing the portfolio risk.

FIG. 28 shows further aspects of the Pareto optimal front. Most real-world optimization problems have several, often conflicting, objectives. Therefore, the optimum for a multi-objective problem is typically not a single solution; rather, it is a set of solutions that trade off between objectives. This concept was first formulated by the Italian economist Vilfredo Pareto in 1896 (Tarascio, 1968), and it bears his name today. A solution is Pareto optimal if (for a maximization problem) no increase in any criterion can be made without a simultaneous decrease in any other criterion (Winston, 1994). The set of all Pareto optimal points is known as the Pareto optimal front.

FIG. 28 represents the objective space for two dimensions of an imaginary portfolio, where one wants to maximize both yield measure one and yield measure two, for example. The shaded area represents the feasible region (the region where solutions are possible). Solutions A and B are Pareto optimal: no increase in yield measure one can be made without a decrease in yield measure two, and vice versa. Solution C is dominated (not Pareto optimal): there are solutions with the same yield measure two with a higher yield measure one (e.g., solution B), or with a higher yield measure two for the same yield measure one (e.g., solution A). The heavy line 2802 indicates the Pareto optimal front—each point on it is non-dominated. Given the Pareto optimal front, a portfolio manager can choose a solution based on other criteria (e.g., cost of implementing the portfolio, risk measures, and other return measures).

In accordance with further known aspects of portfolio processing, FIG. 33 is a diagram showing aspects of different spaces as is known in the art. FIG. 33 shows an example of linear convex space, nonlinear convex space, as well as non-linear nonconvex space. Further, FIG. 33 provides a description of such defined spaces, as well as illustrative equations representing such defined spaces. Further, FIG. 33 shows further aspects of each space, i.e., in terms of variables and approaches to solving problems in each particular space.

In a similar manner, in accordance with further known aspects of portfolio processing, FIG. 34 is a diagram showing aspects of different functions as is known in the art. FIG. 34 shows an example of linear function, nonlinear convex function, as well as nonlinear nonconvex function. Further, FIG. 34 provides a description of such functions, as well as illustrative equations representing such defined spaces. Further, FIG. 34 shows further aspects of each space, i.e., in terms of variables and approaches to solving problems in each particular space.

In prior art techniques, various risk measures were developed for capturing tail risk, i.e., the risk that constitutes the tail of the distribution. Value at risk (VaR) has been widely adopted by financial institutions as a measure of financial exposure, and by regulators and rating agencies for determining the capital adequacy. Expected shortfall, another tail risk measure, is the average of losses exceeding some pre-described loss level.

Portfolio managers may also deal with an optimization problem that involves multiple return measures. Some portfolio managers may be concerned with accounting incomes as well as economic returns.

To incorporate multiple measures of risk and return, portfolio managers must consider a multi-objective optimization problem (rather than a two objective problem presented above). The general multi-objective optimization problem can be described by the following formulation:

| Maximize | Return measure(s); and |
|---|---|
| Minimize | Risk measure(s); |
| Subject to | Portfolio constraints. |

Adding complexity to the problem, the risk measures are typically non-linear, and sometimes non-convex. In a problem with all linear objective functions, one can use a linear programming solver to efficiently obtain optimal solutions. If one or more of the objective functions is non-linear, a non-linear solver is required. For a problem with high dimensionality, but wherein the risk measure is non-linear but convex, a special technique may be utilized to reduce computational run time. In a prior application, U.S. application Ser. No. 10/390,689 filed Mar. 19, 2003, which is incorporated herein by reference in its entirety, we described a method for solving such type of problem. The method describes providing a mathematical model of a relaxation of a problem; generating a sequence of additional constraints; and sequentially applying respective nonlinear risk functions to generate respective adjusted maximum return solutions to obtain an efficient frontier.

In modern-day portfolio management problems, measuring and incorporating tail risk introduces more complexity. Some of them are nonlinear and non-convex. Some measures are even not in analytical forms. The needs of present portfolio analysis calls for special techniques to solve this class of problems.

In accordance with another aspect of the invention, evolutionary algorithms will now be described. In one approach, Evolutionary Algorithms (EAs) include techniques based on a general paradigm of simulated natural evolution (Bäck 1996, Goldberg 1989). EAs perform their search by maintaining at any time t a population $P(t)=\{P_1(t), P_2(t), \ldots, P_p(t)\}$ of individuals. "Genetic" operators that model simplified rules of biological evolution are applied to create the new and desirably more superior (optimal) population $P(t+1)$. This process continues until a sufficiently good population is achieved, or some other termination condition is satisfied. Each $P_i(t) \in P(t)$, represents via an internal data structure, a potential solution to the original problem. The choice of an appropriate data structure for representing solutions is very much an "art" than "science" due to the plurality of data structures suitable for a given problem.

However, the choice of an appropriate representation is an important step in a successful application of EAs, and effort is required to select a data structure that is compact and can avoid creation of infeasible individuals. Closely linked to choice of representation of solutions, is choice of a fitness function $\psi: P(t) \rightarrow R$. The fitness function assigns credit to candidate solutions. Individuals in a population are assigned fitness values according to some evaluation criterion. Fitness values measure how well individuals represent solutions to the problem. Highly fit individuals are more likely to create offspring by "recombination" or "mutation" operations, described below. Weak individuals are less likely to be picked for reproduction, and so they eventually die out. A mutation operator introduces genetic variations in the population by randomly modifying some of the building blocks of individuals.

Evolutionary algorithms are essentially parallel by design, and at each evolutionary step a breadth search of increasingly optimal sub-regions of the search space is performed. Evolutionary search is a powerful technique of solving problems, and is applicable to a wide variety of practical problems that are nearly intractable with other conventional optimization techniques. Practical evolutionary search schemes do not guarantee convergence to the global optimum in a predetermined finite time, but they are often capable of finding very good and consistent approximate solutions. However, they are shown to asymptotically converge under mild conditions (Subbu and Sanderson 2000).

Evolutionary algorithms have received a lot of attention for use in a single objective optimization and learning applications, and have been applied to various practical problems. In recent years, the relatively new area of evolutionary multi-objective optimization has grown considerably. Since evolutionary algorithms inherently work with a population of solutions, they are naturally suited for extension into the multi-objective optimization problem domain, which requires the search for and maintenance of multiple solutions during the search. This characteristic allows finding an entire set of Pareto optimal solutions in a single execution of the algorithm. Additionally, evolutionary algorithms are less sensitive to the shape or continuity of the Pareto front than traditional mathematical programming-based techniques.

In the past decade, the field of evolutionary multi-objective decision-making has been significantly energized, due in part to the multitude of immediate real-life applications in academia and industry. Several researchers have proposed several evolutionary multi-objective optimization techniques, as is reviewed and summarized in Coello et al. 2002.

However, the known techniques as discussed above fail to effectively and efficiently provide optimization processing to the extent possible. Further, techniques related to optimization processing fail to provide the tools needed to effectively work with the portfolios. The various systems and methods of the invention provide novel approaches to optimize portfolios.

BRIEF DESCRIPTION OF THE INVENTION

In one embodiment, the invention provides a method for multi-objective portfolio optimization for use in investment decisions based on competing objectives and a plurality of constraints constituting a portfolio problem, the method sequentially comprising: generating a non-dominated solution set in a space; applying a first set of user-specified constraints to reduce the solutions in the non-dominated solution set to a solution subset; and executing a series of local tradeoffs on the solution subset to result in a resulting solution subset, the local tradeoffs being performed in a lower dimension performance space as compared to the space, and the solution subset being used in investment decisioning.

In a further embodiment, the invention provides a system for multi-objective portfolio optimization for use in investment decisions based on competing objectives and a plurality of constraints constituting a portfolio problem, the system comprising: a solution set generation portion that generates a non-dominated solution set; an initial constraint portion that applies a first set of user-specified constraints to reduce the solutions in the non-dominated solution set to a solution subset; and a trade-off processing portion that executes a series of local tradeoffs on the solution subset to result in a resulting solution subset, the resulting solution subset being used in investment decisioning.

In a further embodiment, the invention provides a computer readable medium for multi-objective portfolio optimization for use in investment decisions based on competing objectives and a plurality of constraints constituting a portfolio problem, the computer readable medium comprising: a first portion that generates a non-dominated solution set; a second portion that applies a first set of user-specified constraints to reduce the solutions in the non-dominated solution set to a solution subset; a third portion that executes a series of local tradeoffs on the solution subset to result in a resulting solution subset; and a fourth portion, and after executing the series of local tradeoffs in performance metric space on the solution subset to result in the resulting solution subset, the fourth portion applies further user specified constraints, the resulting solution subset being used in investment decisioning.

BRIEF DESCRIPTION OF THE DRAWINGS

The present invention can be more fully understood by reading the following detailed description together with the accompanying drawings, in which like reference indicators are used to designate like elements, and in which:

FIG. 24 is a diagram showing aspects of manipulation and analysis of asset classes in accordance with one embodiment of the invention;

FIG. 25 is a further diagram showing aspects of manipulation and analysis of asset classes in accordance with one embodiment of the invention;

FIG. 32 is a graph showing aspects of probabilistic fusion in accordance with one embodiment of the invention;

FIG. 33 is a diagram showing aspects of different spaces as is known;

FIG. 34 is a diagram showing aspects of different functions as is known;

FIG. 37 is a table showing aspects of an outer product in accordance with one aspect of the invention; and FIG. 38 is a table showing aspects of an outer product in accordance with one aspect of the invention.

DETAILED DESCRIPTION OF THE INVENTION

Figure 1:
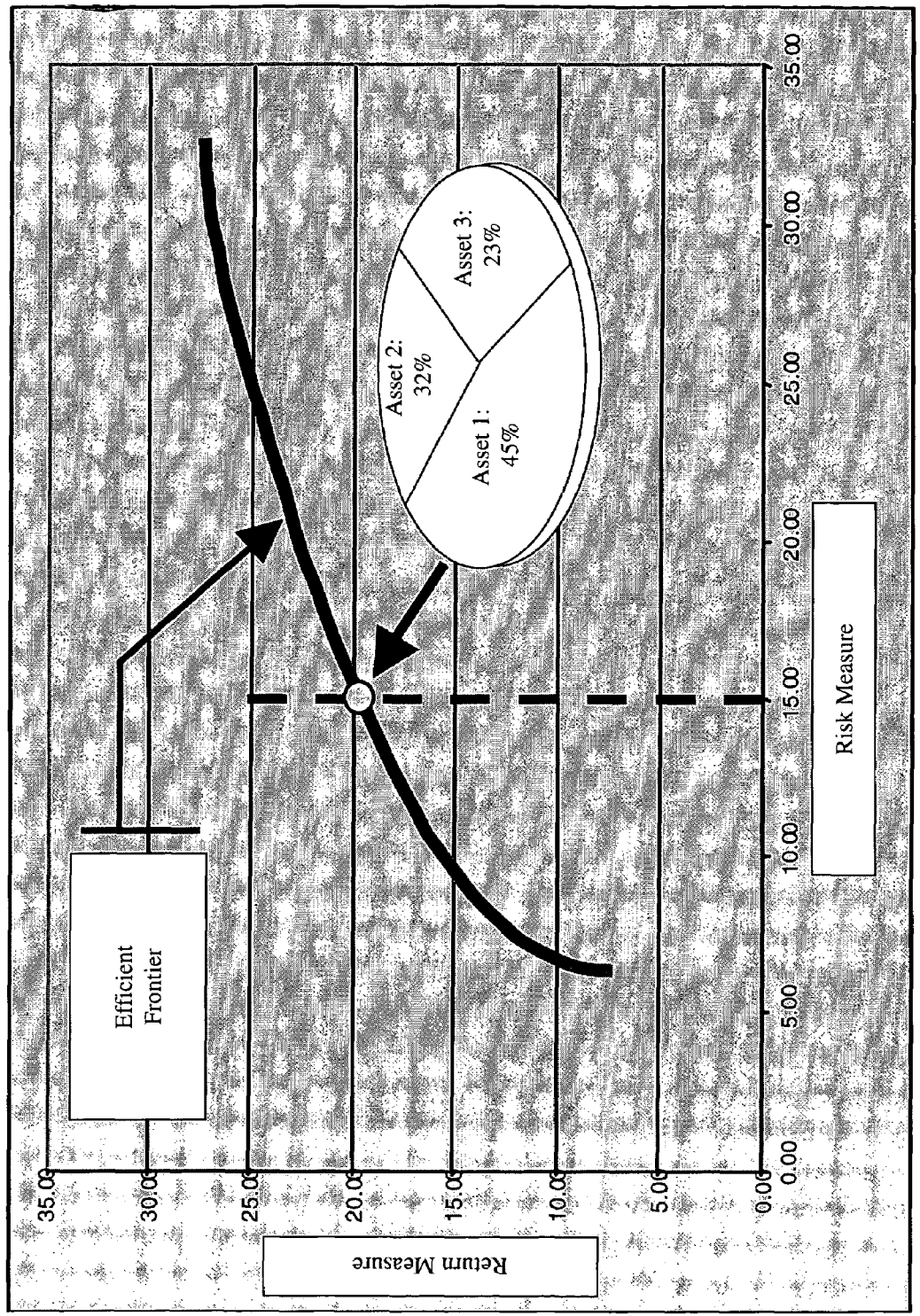
FIG. 1 is a diagram showing a two-dimensional efficient frontier as is known in the art.

The various embodiments of the invention are directed to systems and methods relating to multi-objective portfolio optimization and/or analysis for use in investment decisions, i.e., for use in investment decisioning, based on competing objectives and a plurality of constraints constituting a portfolio problem. For example, the invention relates to a situation wherein one or more decision makers, e.g. portfolio managers and investors, determine an optimal investment strategy that achieves a set of competing investment objectives characterized by more than two objectives without violating a plurality of investment constraints. For example, the more than two objectives might be more than two risk/return measures.

The various inventions and embodiments as described herein provide the technical effect of offering various tools for use in investment decisioning, including manipulation and generation of efficient frontiers representing asset portfolios, for example.

In the disclosure as set forth herein, various references are disclosed to provide background information and to show the state of the art, as described herein. The particulars of these references are set forth in a list thereafter, i.e., at the end of this disclosure.

For example, in an invention described herein, we propose an approach for solving multiple-objective portfolio risk optimization problems with complex risk/return measures using evolutionary algorithms in conjunction with domain knowledge, as well as related techniques.

The systems and methods described herein, in accordance with some embodiments, propose a method for solving portfolio risk optimization problems with complex multiple objectives. A complex objective may be defined as a function that is nonlinear and non-convex or not in an analytical form. The approach, as described below, is based on a powerful combination of evolutionary algorithms and heuristics that exploit problem domain knowledge. The invention is used for modern portfolio management, which involves trade-offs between multiple complex return and risk measures. Given a set of measures to be managed, the portfolio managers face a challenge of solving multi-objective optimization problems, which are not handled by conventional approaches. The invention and the systems and methods described herein can handle problems with more than two objectives and complex functions.

Various systems and methods are described herein, in accordance with various inventions and embodiments. The inventions described herein and claimed may be used in conjunction with the inventions of the following eight (8) patent applications, each of which is incorporated herein by reference in its entirety:

U.S. Patent application Ser. No. 10/781,780, entitled "Systems And Methods For Multi-Objective Portfolio Optimization" filed Feb. 20, 2004;

U.S. patent application Ser. No. 10/781,898, entitled "Systems And Methods For Initial Sampling In Multi-Objective Portfolio Analysis, filed Feb. 20, 2004;

U.S. patent application Ser. No. 10/781,805, entitled "Systems And Methods For Multi-Objective Portfolio Analysis Using Pareto Sorting Evolutionary Algorithms, filed Feb. 20, 2004;

U.S. patent application Ser. No. 10/781,804, entitled "Systems And Methods For Multi-Objective Portfolio Analysis Using Dominance Filtering, filed Feb. 20, 2004;

U.S. patent application Ser. No. 10/781,804, entitled "Systems And Methods For Efficient Frontier Supplementation In Multi-Objective Portfolio Analysis, filed Feb. 20, 2004;

U.S. patent application Ser. No. 10/390,689, entitled "Methods And Systems For Analytical-Based Multifactor Multi-Objective Portfolio Risk Optimization" filed Mar. 19, 2003;

U.S. patent application Ser. No. 10/390,710, entitled "Methods And Systems For Analytical-Based Multifactor Multi-Objective Portfolio Risk Optimization" filed Mar. 19, 2003; and U.S. patent application Ser. No. 10/390,709, entitled "Methods And Systems For Analytical-Based Multifactor Multi-Objective Portfolio Risk Optimization" filed Mar. 19, 2003.

The inventions as described herein may be used with the methods and systems described in the above applications, as well as other techniques that are known in the art. In U.S. application Ser. No. 10/390,689, we described a method for determining an efficient frontier, which comprises a collection of security allocations in a portfolio, with multiple, conflicting objectives in a multi-factor portfolio problem. The described method comprises providing a mathematical model of a relaxation of a problem; generating a sequence of additional constraints; and sequentially applying respective nonlinear risk functions to generate respective adjusted maximum return solutions to obtain an efficient frontier.

In a portfolio optimization problem, there are typically several non-linear functions $f$. These non-linear functions are typically related to risk, but could also arise from other sources. The technique in U.S. application Ser. No. 10/390,689 involved the transformation of a convex nonlinear function $f$ into an iterative sequence of linear constraints. As a result, a sequence of proxy linear constraints is used to obtain the efficient frontier between the multiple objectives of the problem. This approach is also called Sequential Linear Programming (SLP).

The SLP approach as described in U.S. application Ser. No. 10/390,689 is used for problems with nonlinear, but convex constraints, by first relaxing the problem and eliminating the nonlinear constraints, and then successively building a set of linear constraints that approximate each nonlinear constraint in the region of the optimal solutions along the efficient frontier. A fundamental problem arises however when one or more of the nonlinear functions $f$ is also nonconvex. In this event, the SLP approach will not guarantee convergence.

In some portfolio optimization problems, the objective function may not have an analytical form. As a result, the SLP approach is not applicable. Conventional analytical optimization approaches are also not suitable for this type of problem.

Evolutionary Algorithms

As described herein, evolutionary or genetic algorithms are utilized in the various inventions and embodiments described herein. Genetic algorithms might be characterized as a subpart of evolutionary algorithms. Genetic algorithms (GAs) are a general-purpose optimization method based on the theory of natural selection. GAs make no assumptions about the search space, so they can be applied to a variety of optimization problems (Goldberg, 2002). However, GAs exchange applicability for speed—although they can be used on a wide variety of problems, they are typically slower to converge to a solution than algorithms designed for a specific problem.

Genetic algorithms employ a vocabulary borrowed from genetics (Michalewicz, 1996). A "chromosome" is an encoding of an individual solution to an optimization problem. A chromosome is composed of an ordered series of "genes" (i.e., a specific gene always occupies the same position in a chromosome), with each gene corresponding to a specific characteristic of the problem. Typically, this ordered series of genes is a vector, but sometimes arrays are used. Further, it is noted that although there are some applications of diploid chromosomes (e.g., Green, 1994) the overwhelming majority of GA implementations employ haploid chromosomes (i.e., only one set of chromosomes per solution). Further, it is noted that a chromosome in its raw form (i.e., the encoded form that the GA manipulates) is known as the "genotype"; and the solution that the chromosome represents (i.e., the solution decoded from the chromosome) is known as the phenotype. Each gene has a set of "alleles", which are valid values for that gene. A "population" is composed of a collection (typically of fixed size) of chromosomes. An iteration of the algorithm during which a new population is produced is known as a "generation".

Figure 35:
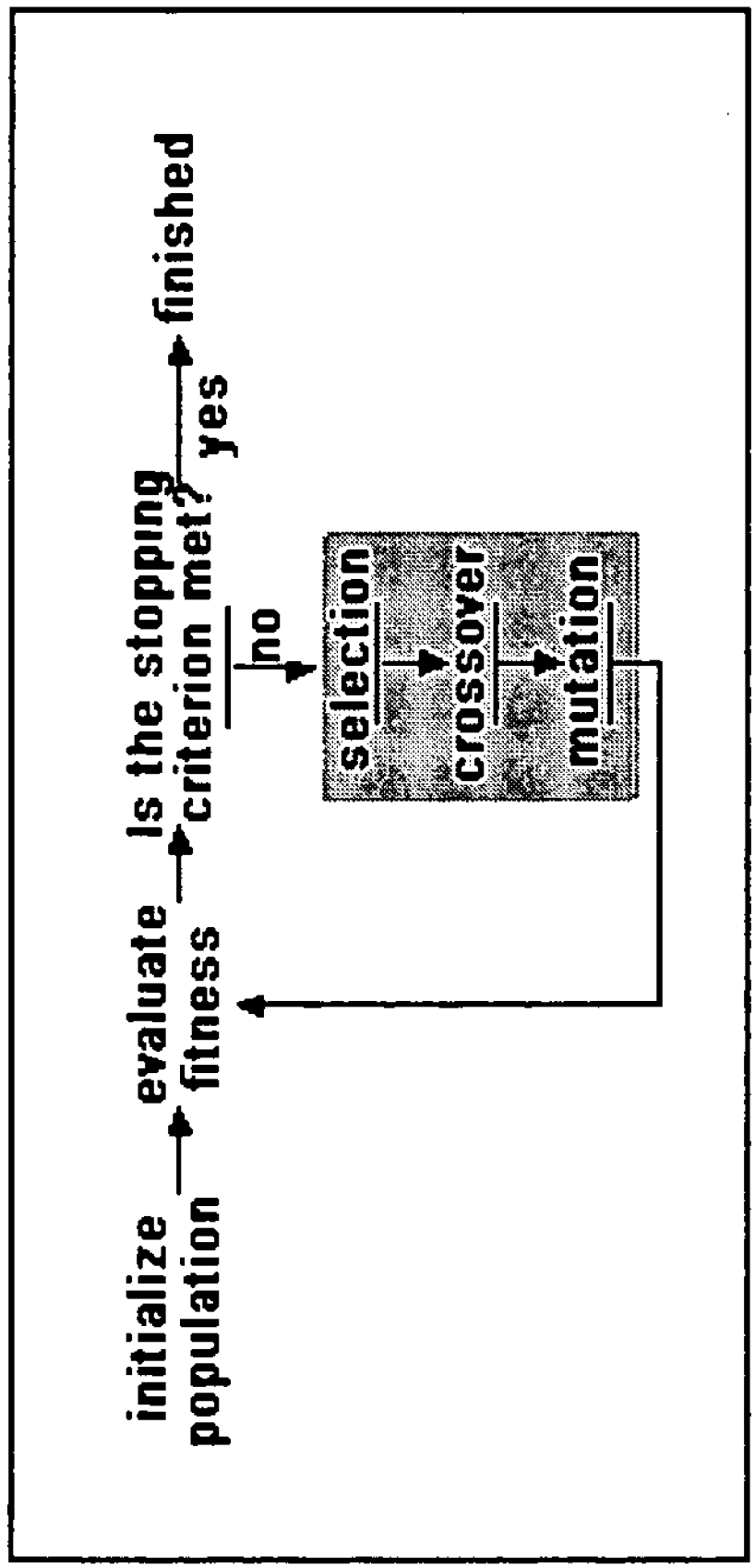
FIG. 35 is a figure showing a basic operation of a genetic algorithm as is known.

The basic operation of a genetic algorithm is outlined in FIG. 35. First, an initial population is generated (typically randomly). Then, the fitness of each chromosome is evaluated using a predefined fitness function. Fitness functions are used to evaluate the "goodness" of a chromosome, and can be either minimized or maximized, depending on the goal of the optimization. For example, consider a minimization problem represented by a chromosome with three genes, $[g_1, g_2, g_3]$, and the simple fitness function:

$$\text{fitness} = g_1^2 + 2g_2^2 - 4g_3$$

The fitness of the chromosome with allele values of [9, 3, 5] is 79 and the fitness of chromosome [2, −5, 2] is 46; therefore, [2, −5, 2] is a fitter ("more near optimal") solution for this minimization problem (although clearly not the optimal solution).

As shown in FIG. 35, in the GA optimization process in summary, a population is initialized and the fitness of each chromosome is evaluated. If the stopping criterion is not met, selection, crossover, and mutation take place generating a new, presumably fitter, population, which is then returned to the fitness evaluation step. When the stopping criterion is met, the algorithm is terminated.

There are many possibilities for the stopping criterion, including stopping after a fixed number of generations, stopping after a predefined fitness has been achieved, stopping when the rate of fitness improvement slows to a predefined level, and/or stopping when the population has converged to a single solution (e.g., when the maximum and mean population fitness is nearly the same). A fixed number of generations and convergence are the most popular stopping criteria.

Selection chooses (frequently with replacement) chromosomes in the current population to be members of the following generation, either passed directly, or modified by crossover or mutation. The goal of selection is to favor relatively more fit chromosomes. Those not selected (presumably, the least fit) die out. The three most commonly used selection schemes (Goldberg and Deb, 1991) are proportionate selection, rank selection, and tournament selection. In proportionate selection ("roulette wheel" selection), the likelihood of selecting a chromosome is equal to the ratio of the fitness of the chromosome to the sum of the fitness of all chromosomes. One limitation of this method is that one comparatively very fit chromosome can very quickly overcome a population; rank and tournament selection are designed to overcome this problem. In rank selection, the population is sorted from best to worst fitness, and the probability of selection is some (linear or nonlinear) function of rank. In tournament selection, some small number of chromosomes (frequently two) are chosen at random, compared, and the fittest chromosome is selected. This process is repeated until sufficient chromosomes have been selected.

Crossover is the exchange of portions of genetic material from a pair of 'parent' chromosomes to produce a pair of 'children'. A pair is typically used, although crossover schemes with greater than two parents do exist. There are many ways to perform crossover (Michalewicz, 1996). The simplest method is single point crossover, where the chromosomes are split at a randomly selected point, and genes to the left of the split from one chromosome are exchanged with genes to the right of the split from the other chromosome, and vice versa. For example, consider these two parent chromosomes, where the non-underlined chromosomes are from a first parent and the underlined chromosomes are from a second parent:

[3, 4, 9, 1, 7, 6, 4, 8, 1]

[6, 3, 8, 1, 4, 3, 4, 6, 0]

If the crossover point were between the third and fourth gene, these children would result:

[6, 3, 8, 1, 7, 6, 4, 8, 1]

[3, 4, 9, 1, 4, 3, 4, 6, 0]

Mutation (as it is typically implemented) is the assignment (with low probability of occurrence) of a random change to the allele value of one gene in a chromosome. However, as with everything in GAs, there are no fixed rules: sometimes it is not a random change, and sometimes more than one gene is modified. Mutation introduces new genetic material into the population and ensures that it is possible (over the course of the entire evolution) to search the entire solution space (Coello and Christiansen, 1999).

Accordingly, a newly generated population will be provided. The newly generated population is passed to the fitness evaluation stage, and the cycle continues until the stopping criterion is met.

Figure 36:
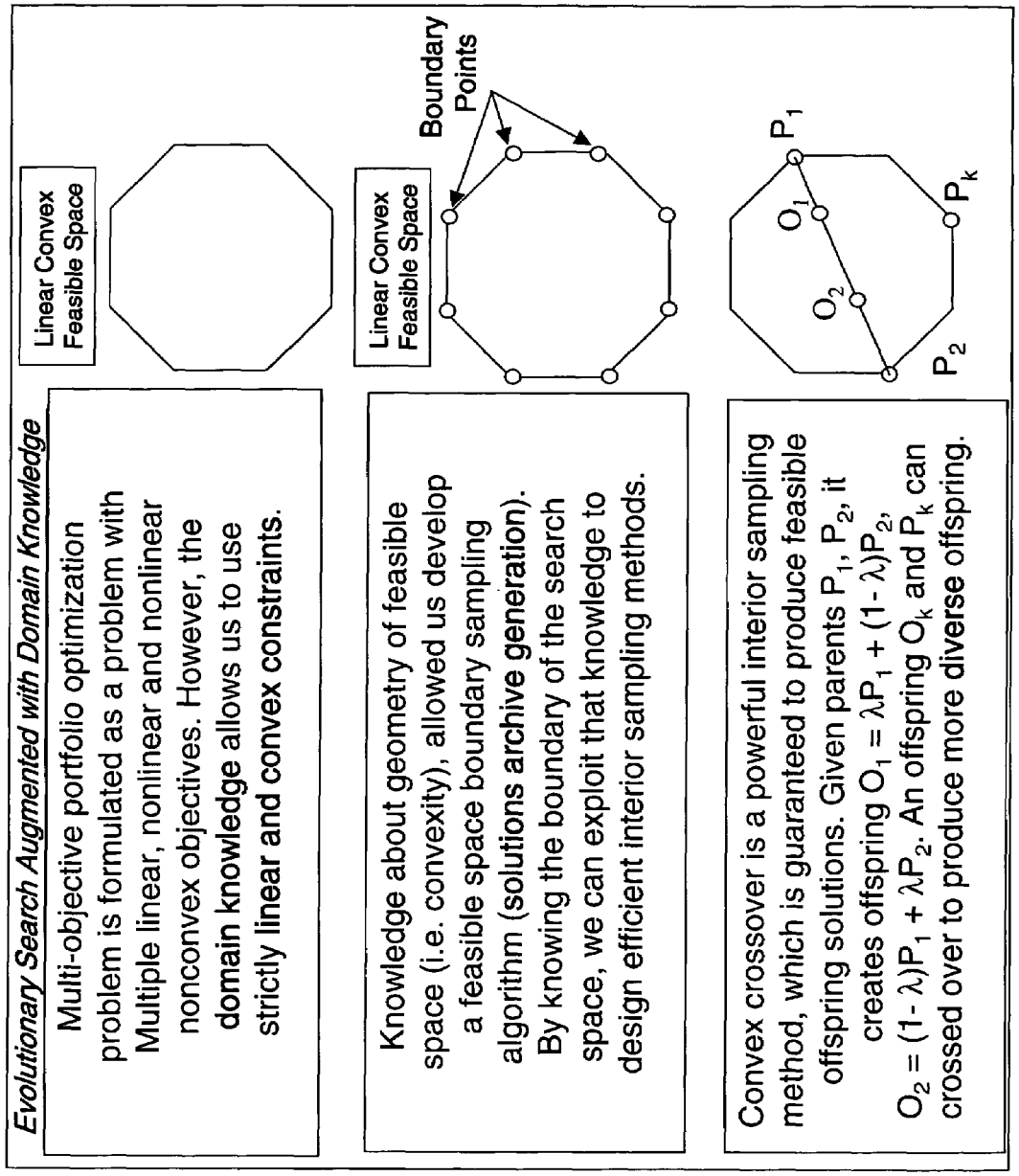
FIG. 36 is a figure showing high level aspects of an evolutionary search process augmented with domain knowledge in accordance with one embodiment of the invention.

With further reference to the present novel concepts, FIG. 36 is a figure showing high level aspects of an evolutionary search process augmented with domain knowledge in accordance with one embodiment of the invention. In accordance with one embodiment of the invention, a multi-objective portfolio optimization problem is formulated as a problem with multiple linear, nonlinear and nonlinear nonconvex objectives. The invention may employ domain knowledge, in accordance with one embodiment. The domain knowledge allows the use of strictly linear and convex constraints. Further, knowledge about the geometry of the feasible space (i.e. convexity), allows, in practice of the invention, to develop a feasible space boundary sampling algorithm, i.e., solutions archive generation. By knowing the boundary of the search space, we can exploit that knowledge to design efficient interior sampling methods. Further details are described below.

The systems and methods of the invention may use convex crossover. Convex crossover is a powerful interior sampling method, which is guaranteed to produce feasible offspring solutions. Given parents $P_1$, $P_2$, it creates offspring $O_1 = \lambda P_1 + (1-\lambda)P_2$, $O_2 = (1-\lambda)P_1 + \lambda P_2$. An offspring $O_k$ and $P_k$ can be crossed over to produce more diverse offspring.

Overview

Hereinafter, various embodiments of the systems and methods of the invention will be described in further detail. Portfolio optimization conventionally involves trade-off between one return and one risk measure, for example. In a quest for better risk management and investment decisions, modern portfolio managers have to simultaneously take multiple measures of often competing interests into account. These competing measures may typically be risk and return measures. From a portfolio optimization perspective in particular, one needs to solve a multi-objective optimization problem to obtain the efficient frontier of a particular investment problem. The objective functions, in particular risk measures, are far more complicated than those in a conventional approach, e.g., variance. Conventional analytical optimization approaches are not suitable for solving modern portfolio optimization problems, which involve trade-offs of complex objectives. A complex objective is defined as a function that is nonlinear and non-convex, or not in an analytical form.

In this invention in some embodiments, we propose a method for solving modern portfolio optimization problems with multiple objectives, some of which are complex functions. In accordance with one embodiment of the invention, the method uses evolutionary algorithms in conjunction with domain knowledge to determine the efficient frontier. The approach exploits domain knowledge via (1) the geometrical nature of the problem to explore and partially memorize the bounds of the feasible space and (2) the geometrical nature of the problem to design search operators that can efficiently explore the interiors of the feasible space, and (3) employs evolutionary algorithms for identifying the efficient frontier over multiple return and risk objectives, some of them being complex objectives.

Figure 2:
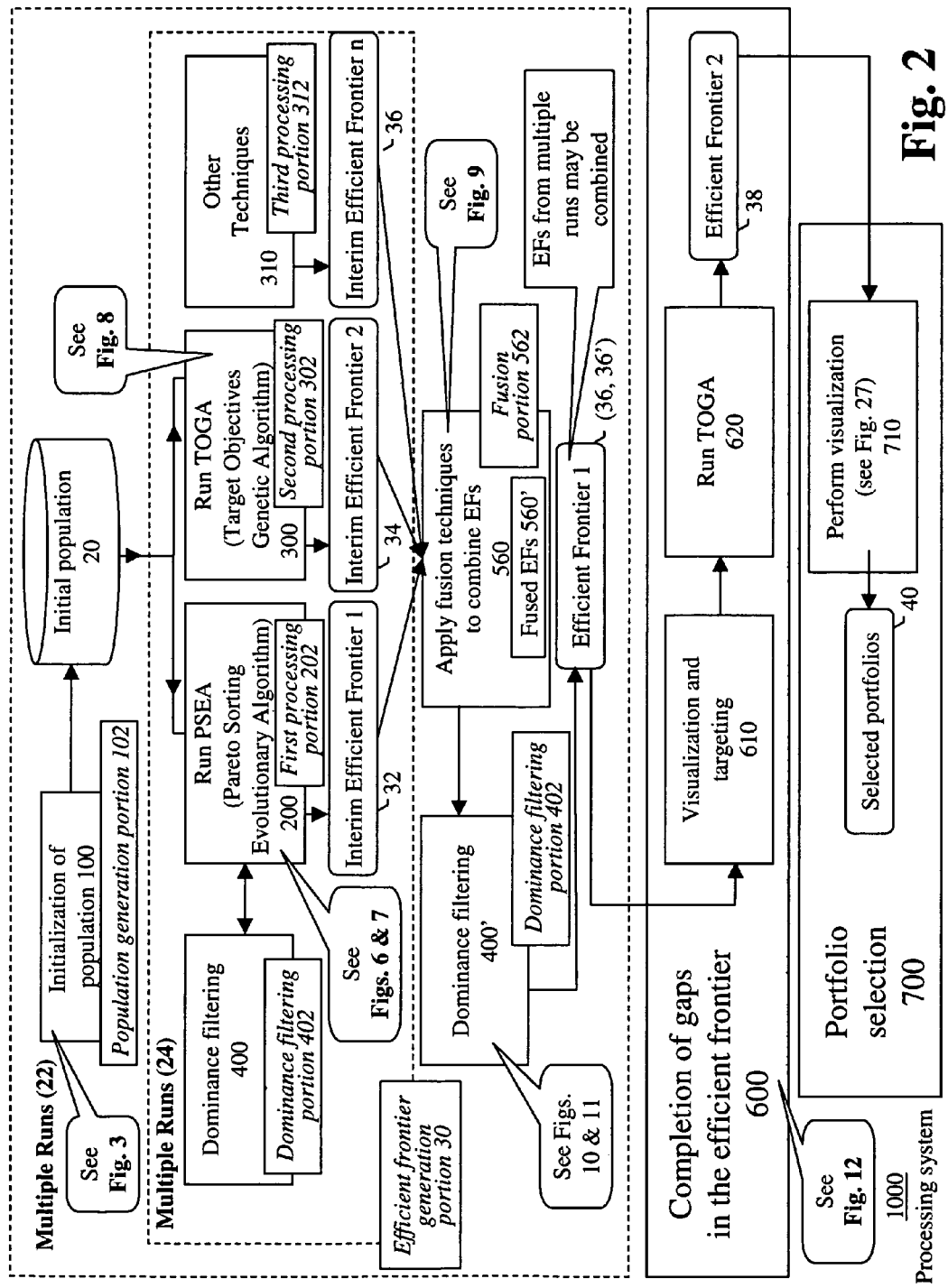
FIG. 2 is an overview process flow chart, which is performed by a processing system, in accordance with one embodiment of the invention.

In accordance with one embodiment of the invention, FIG. 2 provides a process chart of the invention, which may be performed by a suitable processing system 1000. FIG. 2 is described in summary hereinafter, and then further below, aspects of FIG. 2 are discussed in further detail.

As shown in FIG. 2, the process starts in step 100 with an initialization of a population of solutions. This might be performed by a population generation portion 102, for example. The initial population is then output to an initial population database 20. After the initial population has been generated, the process of FIG. 2 passes to what might be characterized as an efficient frontier generation portion 30, as shown in FIG. 2.

The efficient frontier generation portion 30 generates multiple interim efficient frontiers. Specifically, the efficient frontier generation portion 30 includes a number of processing portions (202, 302, 312), as desired, that perform efficient frontier generation processes. The processing portions (202, 302, 312) may perform the efficient frontier generation processes using the same process or different processes. Further details of this processing are described below. As shown, the processing portions (202, 302, 312), as well as the other portions of FIG. 2, may be disposed in the processing system 1000.

As a result of the processing of portions (202, 302, 312) multiple interim efficient frontiers (32, 34, 36) are generated. FIG. 2 characterizes this processing as performing multiple runs 24. That is, each of the processing of portions (202, 302, 312) perform their own respective run so as to generate the respective efficient frontiers (32, 34, 36). As shown in FIG. 2, these interim efficient frontiers are then output to a fusion portion 562. The fusion portion 562 performs a fusion process 560 on the multiple efficient frontiers (32, 34, 36), as described below, so as to generate a fused efficient frontier 560', i.e., an efficient frontier resulting from the fusing operation of step 560.

After step 560 of FIG. 2, the process passes to step 400'. As shown in step 400', an additional dominance filtering process may be utilized to further refine the efficient frontier generated by the fusion portion 562. Further aspects of such dominance filtering in accordance with one embodiment of the invention are discussed below.

As a result of the processing of step 400', FIG. 2 shows the generation of an efficient frontier 36. It is appreciated that further processing may then be effected on the efficient frontier 36, in accordance with one embodiment of the invention. Specifically, a gap filling process may be performed in step 600 of FIG. 2. Further details of the gap filling process are described below. As a result of the gap filling process, a further refined efficient frontier 38 is generated.

Thereafter, the process of FIG. 2 passes to step 700, in accordance with one embodiment of the invention. In step 700, further processing may be performed on the efficient frontier 38. This further processing might be characterized as a visual technique by which a particular user might manipulate the solutions in the efficient frontier 38 so as to arrive on a desired solution. As discussed below with reference to FIG. 27, the portfolio selection process of step 700 might be used differently by different users, i.e., persons with different responsibilities and different interests.

As shown in FIG. 2, multiple runs 22 may be utilized to generate the efficient frontier 36. To explain further, it may be determined through examination of the efficient frontier 36, e.g., as a result of a first run, that the efficient frontier 36 is not sufficient. For example, it might be, that the user senses that the generated efficient frontier 36 is not representative of the global situation. As a result, the process of FIG. 2 might be run additional times, i.e., including generation of an initial population 20, generation of the interim efficient frontiers (32, 34, 36), fusing the interim efficient frontiers (32, 34, 36) and further dominance filtering 400' so as to generate a further efficient frontier 36'. Efficient frontiers (36, 36') from multiple runs may then be combined in some suitable manner, i.e., such as by simply adding the results together, if the user so desires.

It should be appreciated that the particular processing as shown in FIG. 2 may be varied. For example, the gap filling process may not be utilized, such that the efficient frontier 36 is used in the portfolio selection process. Further, the respective processes as described above may be used on their own, and not in conjunction with the other processes, for example, i.e., certain processes and steps of FIG. 2, and as described below, may be omitted, as should be apparent to one of ordinary skill.

As shown FIG. 2, the overall process involves a variety of sub-processes. The following sub-sections set forth below describe the detail of the sub-processes.

Initialization of Population

As described above, evolutionary algorithms, also known as genetic algorithms, are used to obtain solutions that are close to optimal by intelligently searching the feasible region. Evolutionary algorithms do this by implementing simplified models of natural evolution in a computer. In this approach populations of trial solutions compete for survival and succeed in proportion to their fitness, further participating in the production of offspring. The offspring with better genetic content (representation of a trial solution to the problem) survive and reproduce. After many generations of evolution, the best solutions are near optimal.

The success of an evolutionary algorithm for an application depends in part on the computational efficiency of generating new solutions from parent solutions. The algorithm should be able to generate a new population of solutions from the previous generation in a reasonable amount of time. In the portfolio optimization problem generating a valid portfolio is not trivial. This is because a typical portfolio has to satisfy a few thousand linear constraints. Ensuring that all the portfolios in a generation satisfy all these constraints requires computational run time. With known techniques, this makes using an evolutionary algorithm for solving the problem impractical. We therefore developed a novel method to circumvent this problem.

In our evolutionary algorithm, we start with a large set of valid portfolios. This initial points population is generated using a novel technique, as described below in accordance with one embodiment of the invention, and is large enough to sufficiently sample the feasible region of portfolios. We generate each offspring, i.e., a valid portfolio in the next generation by using a convex combination of two or more parent portfolios (linear combination with non-negative weights that sum to unity). This is a convex crossover operation and allows quick generation of new populations from prior generations. To be able to search the entire feasible region using this convex crossover operation the initial points population should include all the vertices or corner points of the polytope defined by the linear portfolio constraints. However, generating the corner vertices of a polytope is an NP-complete problem. That is, NP means "nondeterministic polynomial time", and the term "nondeterministic" means that we need to guess what the solution might be. The solution can be tested in polynomial time, but the difficult aspect of such analysis is to guess right. NP-complete means "Nondeterministic Polynomial time-complete" and is a subset of NP, with the additional property that it is also NP-hard. Thus a solution for one NP-complete problem would solve all problems in NP. Such a problem cannot be solved to completion in a reasonable time for any typical real-world portfolio. We have therefore developed a new algorithm to generate initial points that will sufficiently cover the search space for our needs. We describe this algorithm in detail below.

In accordance with one embodiment of the invention, the multi-objective portfolio optimization problem may be posed as:

[max $f_1$, max $f_2$, ... max $f_n$, min $g_1$, min $g_2$, ..., min $g_m$]

subject to: Linear portfolio investment constraints, where a function $f_i$ is a return measure, and a function $g_i$ is a risk measure. The goal is the joint maximization of return measures, and the minimization of risk measures. Each of these measures may be arbitrarily nonlinear and non-convex. However, the search space for this problem defined by the set of linear constraints is a bounded convex polytope. This polytope P is also the feasible search space. Any interior or extreme point of P is therefore a feasible portfolio investment strategy.

Since a typical portfolio optimization problem can have thousands of constraints defined over a very high dimensional decision space, the feasible space P corresponding to valid portfolio investment strategies, though very large, will only have a small fraction of the volume of the smallest hypercube that encloses the feasible polytope, P. In this situation, starting out with a good idea of the extents of the feasible space P is a powerful feature. Such a feature also serves as a domain-specific guide to any evolutionary search over this space. In the absence of this information, an evolutionary search may consume significant time in either finding a feasible point, or in repairing an infeasible point to make it feasible.

Any portfolio that satisfies the linear constraints above is a valid portfolio. The simplex or the interior point algorithm for solving linear programs (LP) can be used to solve the set of linear constraints. Both of these algorithms are commercially available. An LP solver is used to find the optimal decision vector x that solves the problem:

Maximize $w^T x: Ax \leq b$, where w is a pre-specified coefficient or weight vector,
A is a matrix of linear constraints, and
b is a vector of constants corresponding to the linear constraints.

The space $Ax \leq b$ is a convex polytope P. Due to the geometrical nature of the problem and the linear programming algorithm, given a weight vector w, an extreme corner vertex of the feasible space defined by $Ax \leq b$ is always identified as the optimal decision vector. If a different weight vector w is used, the optimal decision vector will be some other extreme corner vertex x. We use this property to our advantage in generating the initial points population of solutions.

By solving multiple linear programs, each with a different weight vector w, one could obtain different corner vertices of the feasible polytope, P. These vectors w, could be randomly generated. By repeating this process of random weight vector specification followed by the solution of the ensuing linear program a few thousand times one can generate many valid portfolios that are vertices of the feasible polytope. However this process does not ensure that the feasible region is sufficiently sampled for our needs. To ensure adequate sampling of the feasible region we reformulate the linear program as follows by adding new constraints.

Maximize $w^T x$ subject to:
Linear portfolio return constraints:

$\tilde{F}_i x \geq p_i$ i=1,2,...,n

Linear portfolio risk constraints:

$\tilde{G}_i x \leq q_i$ i=1,2,...,m

Linear portfolio investment constraints:

$H_i x \leq r_i$ i=1,2,...,k where $\tilde{F}_i = f_i$ when $f_i$ is a linear return objective and $\tilde{F}_i$=gradient of $f_i$ if $f_i$ is a non-linear return objective. Similarly $\tilde{G} = g_i$ when $g_i$ is a linear risk objective and $\tilde{G}_i$=gradient of $g_i$ if $g_i$ is a non-linear risk objective. The additional constraints ensure that the returns are greater than certain values, $p_i$ while the risks are lower than certain values $q_i$. Illustratively, $p_i$ and $q_i$ might be characterized as range values. $H_i$ represents the coefficient of all investment constraints. By varying the values of $p_i$ and $q_i$ to span the entire range of values that the risks and returns can take, we can generate portfolios that fully sample the objectives space. We generate the initial points population of solutions by solving the linear program described above several thousand times as described in FIG. 3.

Figure 3:
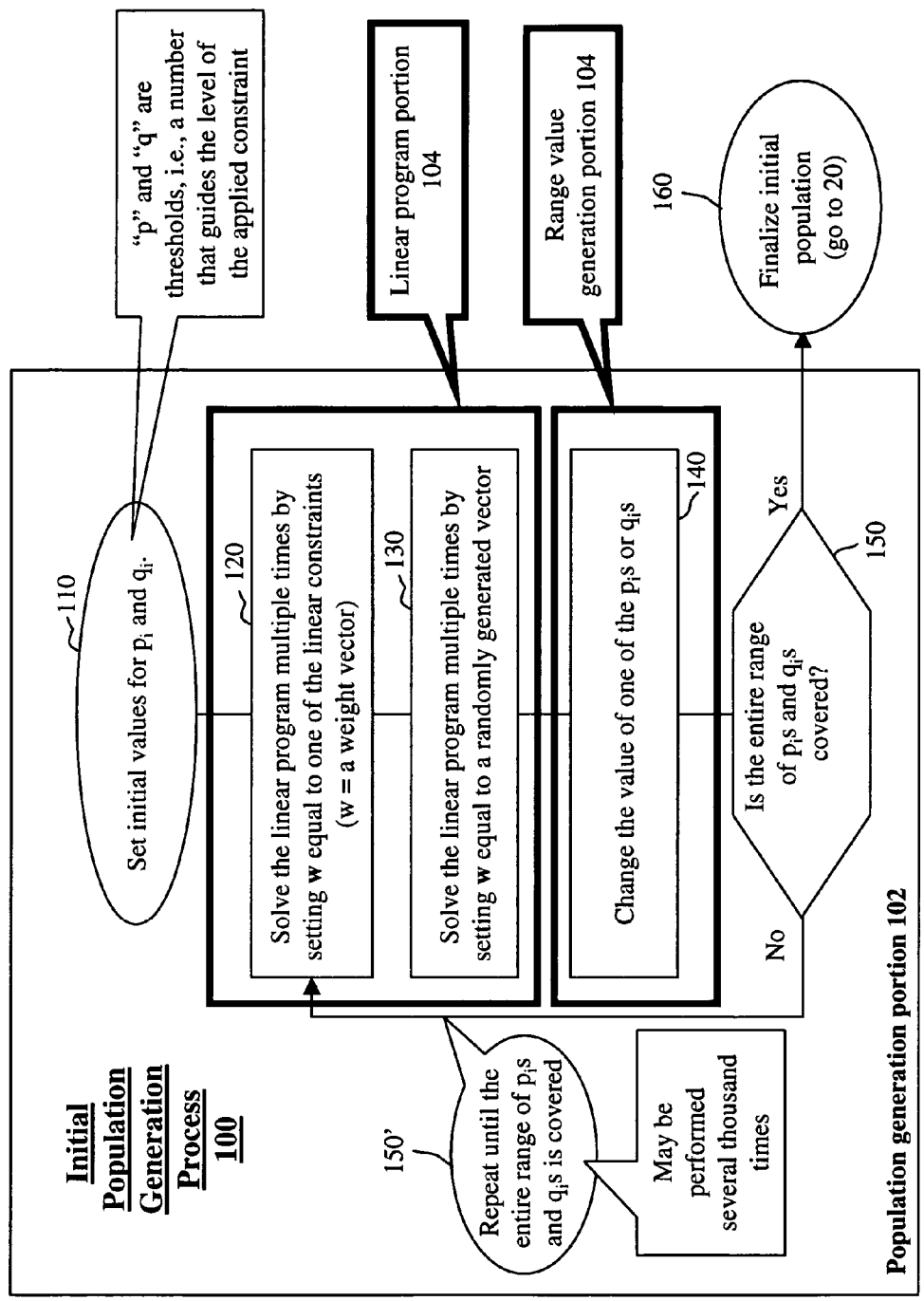
FIG. 3 is a flow chart showing an initial population generation process in accordance with one embodiment of the invention.

As shown in FIG. 3, the processing, that is used in the initialization of the population 100, starts in step 110, in accordance with one embodiment of the invention. In step 110, the initial values of $p_i$ and $g_i$ are set such that the constraints involving them are always satisfied. For example, this can be done by setting all $p_i$s to zero and $g_i$s to large positive values.

Then, the process passes to step 120. In step 120, the linear program is solved multiple times by setting w equal to one of the linear constraints each time. Since in the resulting portfolio the linear constraint chosen for the objective function is activated, this process ensures that there is at least one portfolio where any specific constraint is activated. After step 120, the process passes to step 130. In step 130, the linear program is solved multiple times by setting w equal to a randomly generated vector.

Then, the process proceeds to step 140, in accordance with this embodiment of the invention. In step 140, the value of one of the $p_i$s or $q_i$s is changed. Then, in step 150, a determination is made whether the entire range of $p_i$s and $q_i$s is fully covered, i.e., to the extent desired by the particular user. If no, then the process returns to step 120, and the processing is again performed as described above. Alternatively, if the entire range of $p_i$s and $q_i$s is fully covered, i.e., to the extent desired by the particular user, the process then passes to step 160. In step 160, the initialization processing is completed and the initial points population is output to the database 20, as shown in FIG. 2.

Figure 4:
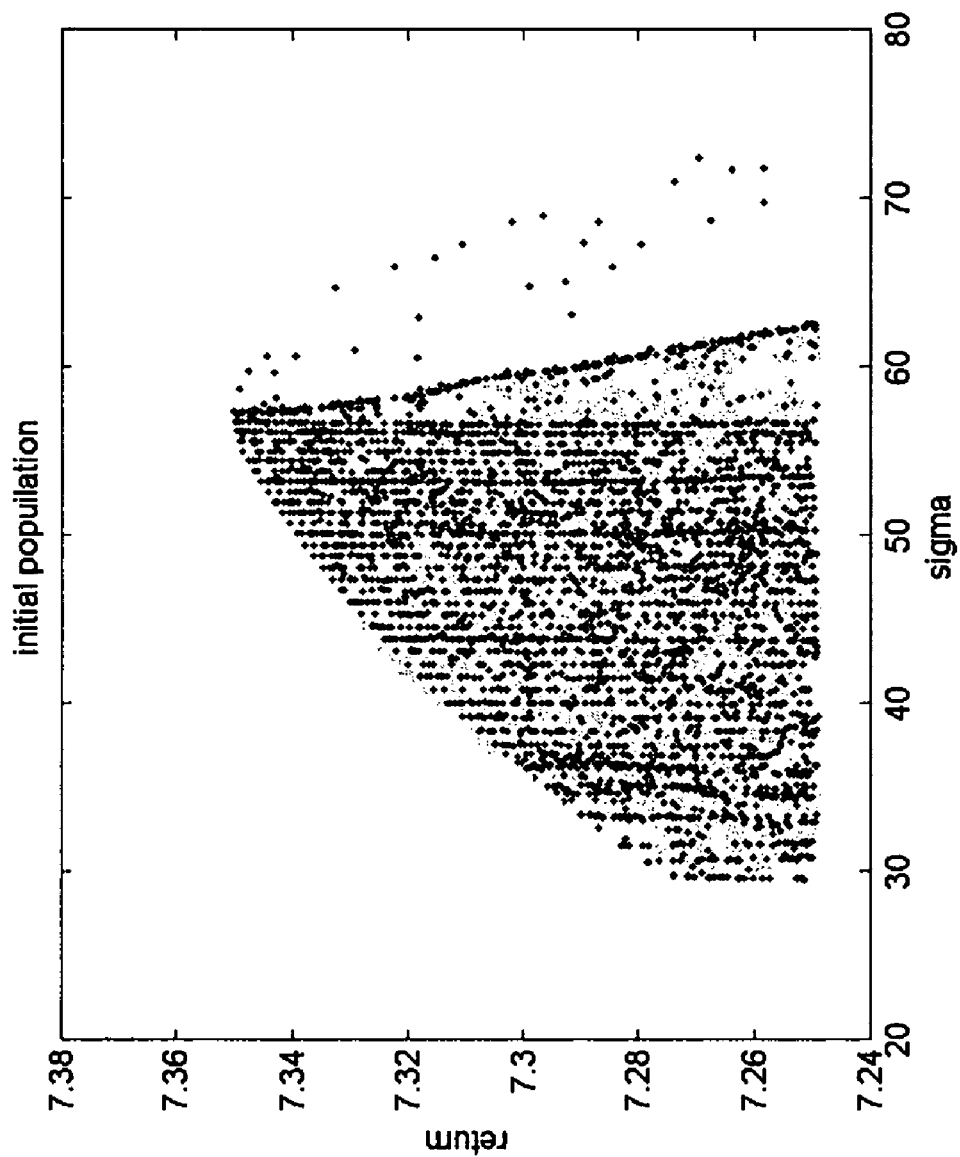
FIG. 4 is a diagram showing an initial points population of a portfolio in the risk/return space in accordance with one embodiment of the invention.

In accordance with one embodiment of the invention, the Sequential Linear Programming (SLP) algorithm that was described in U.S. application Ser. No. 10/390,689 may be used in defining the range of $p_i$s and $q_i$s for linear and convex objectives. FIG. 4 shows the initial points population of portfolios generated by this algorithm in a two dimensional objective space. The return measure here is linear and the sigma is a convex risk measure.

As illustrated in FIG. 3, the initialization of the population may be performed by a suitable processing system, i.e., by a population generation portion 102. The population generation portion 102 may include a linear program portion 104 and a range value generation portion 106, in accordance with one embodiment of the invention.

The linear program portion 104 performs the linear program processing as shown in steps 120 and 130 of FIG. 3. Further, the range value generation portion 106 may change the values of the thresholds, as shown in step 140, as well as set the initial values for the competing objectives in step 110.

As illustrated in FIG. 3, the processing may be repeated several thousand times, for example, until a determination is made, by the population generation portion 102, that the entire range of competing objectives is covered. The particular threshold or criteria by which this determination is made may vary depending on the particular situation. The end result of the population generation portion 102 is the generation of an initial population of solutions for further processing, as described in detail below.

Pareto Sorting Evolutionary Algorithm (PSEA)

The Pareto Sorting Evolutionary Algorithm (PSEA) is an approach to nonlinear non-convex multi-objective optimization, and provides an efficient method for portfolio risk optimization and planning, in accordance with one embodiment of the invention. Though the PSEA is in the family of Pareto-based multi-objective evolutionary algorithms reviewed in Coello et al. 2002, the process of the invention is a unique combination of heuristic techniques that is novel and unlike those in the prior art. The algorithm incorporates the basic evolutionary heuristics of selection, crossover (X-over), and diversity maintenance for identifying Pareto (efficient) frontiers in multi-objective optimization problems.

Figure 5:
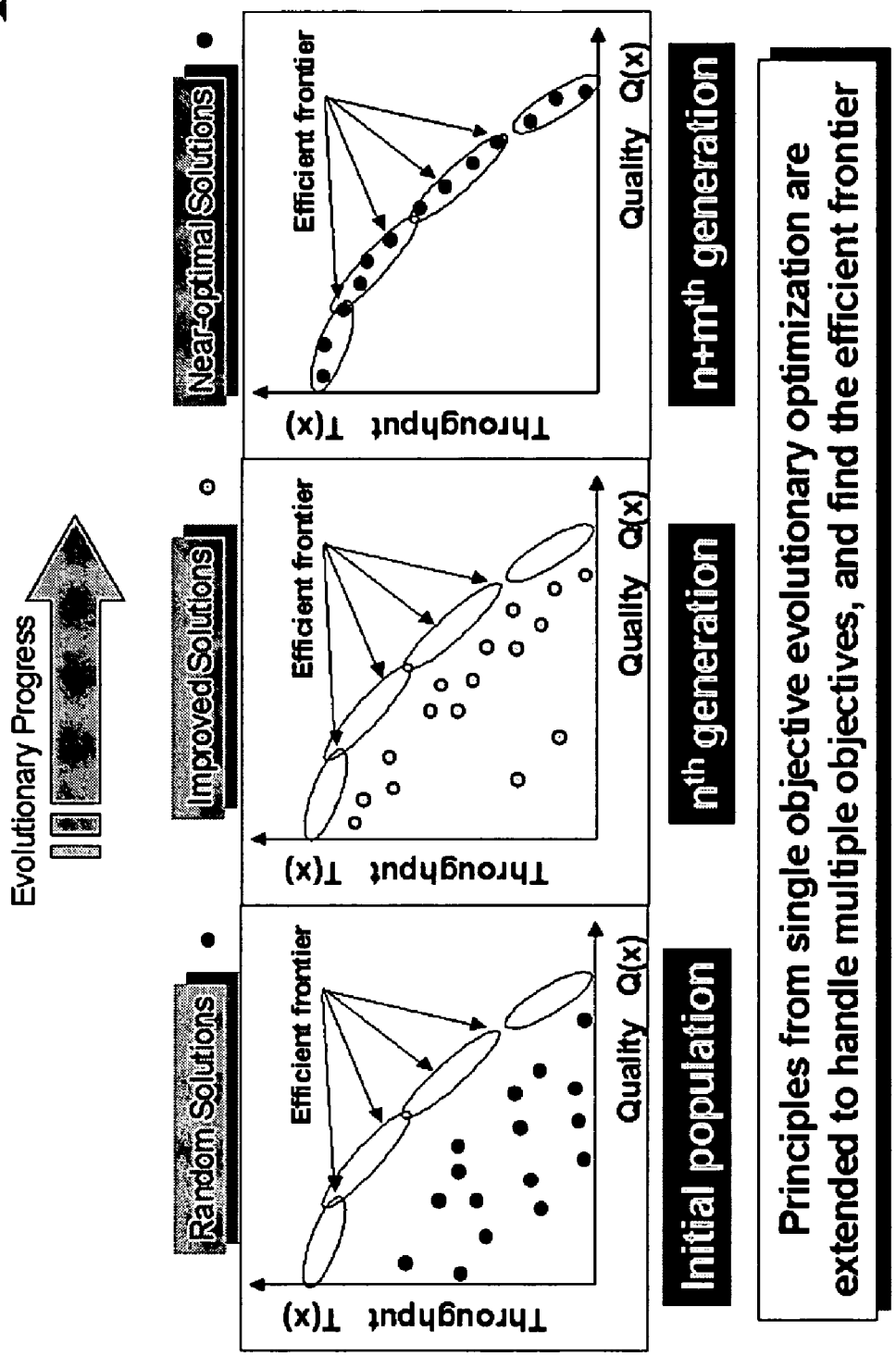
FIG. 5 is a diagram showing an evolutionary multi-objective optimization process in accordance with one embodiment of the invention.

The PSEA process of the invention works by systematically searching, memorizing, and improving populations of vectors (solutions), and performs multi-objective search via the evolution of populations of test solutions in an effort to attain the true Pareto frontier. A high-level view of the operation of the PSEA, a multi-objective optimization algorithm is shown in FIG. 5. In this figure solutions are systematically evolved over multiple generations via structured operations in order to attain near-Pareto-optimal solutions. In this pictorial example, the goal is the identification of process plans that are Pareto optimal with respect to two objectives: quality and throughput. Starting from a population of random solutions, the PSEA is shown systematically closing in on those process plans that correspond to the true Pareto frontier as generations advance, i.e., effecting evolutionary progress.

Given an n-dimensional measurable space whose elements can be partially ordered, a vector in this space $x=(x_1, x_2, \ldots, x_n)$ is considered non-dominated if there exists no other vector z such that $x_i \leqq z_i$ for all i, and $x_k \leqq z_k$ for at least one $1 \leqq k \leqq n$. As used in this relationship, the symbol $\leqq$ may be interpreted as "the right-hand-side of the relationship "is better than" its left-hand-side" (or "better-than" relation) without loss of generality.

A useful component of the PSEA is a dominance filter that is able to identify the subset of non-dominated vectors given a set of vectors, each of which corresponds to a feasible alternative, and given a set of ordering preferences corresponding to each objective (either "lower is better" or "higher is better"). In the context of portfolio optimization, each vector is a point in the multi-objective return-risk space, and is a unique image of a complete portfolio investment plan. A dominance filter partitions a set of vectors into two subsets, i.e., the non-dominated subset and the dominated subset.

A selection operation for an evolutionary algorithm is one that is able to differentiate between the good solutions and weaker solutions, and employs a consistent means to retain the better solutions while discarding the weaker solutions. From the perspective of multi-objective search, a non-dominated solution is considered stronger than a dominated solution. The dominance filter is used to differentiate the stronger solutions from the weaker ones as the first step in a selection operation. The second step in a selection operation, the retention heuristic, may be implemented in a variety of ways. The most simple and intuitive selection operation is retention of only the non-dominated solutions.

Given two objectives, the Pareto frontier is a curve in the space defined by the two objectives. When there are three objectives, the Pareto frontier is a surface in this space, and when there are more than three objectives, the Pareto frontier is volumetric. Since the PSEA works by systematic sampling of the Pareto frontier, one approach to identifying the entire Pareto frontier with reasonable fidelity is to enable the algorithm to maintain the entire Pareto frontier found up to a given generation of the search. However, this may require a very large population size, whose maintenance is computationally unattractive and inefficient as well. One novel way to alleviate this problem is to work with small and tractable population sizes while incorporating an "archive" that saves good non-dominated solutions found at any generation for future reference and use. In this latter method, the search algorithm navigates the search space using only a small population size, but commits any good solutions found to memory. However, there is no guarantee that a non-dominated solution found at a certain generation would also be globally non-dominated with respect to the existing solutions in the archive. Therefore, the final step of the PSEA is dominance filtering of the solutions in the archive to generate the set of globally non-dominated solutions across all the generations.

Though the "archive" method is an efficient diversity preservation technique and is helpful for preservation of diversity across the entire Pareto frontier, it is not sufficient to ensure diversity in the populations during search. Diversity preservation in the populations themselves is an important aspect of an efficient search. In addition, diversity preservation in the populations has a significant impact on the diversity of the solutions in the archive. Diversity in populations may be enabled via three methods: (i) incorporation of the "crossover" operator, where two solutions (parent solutions) are mathematically combined to yield two new solutions (offspring solutions), (ii) incorporation of "new random solutions" in each generation of the search, and (iii) incorporation of a "non-crowding filter", that is able to filter out solutions in a population that are heavily clustered and is able to reduce the propensity for clustering that causes reduced diversity.

Figure 6:
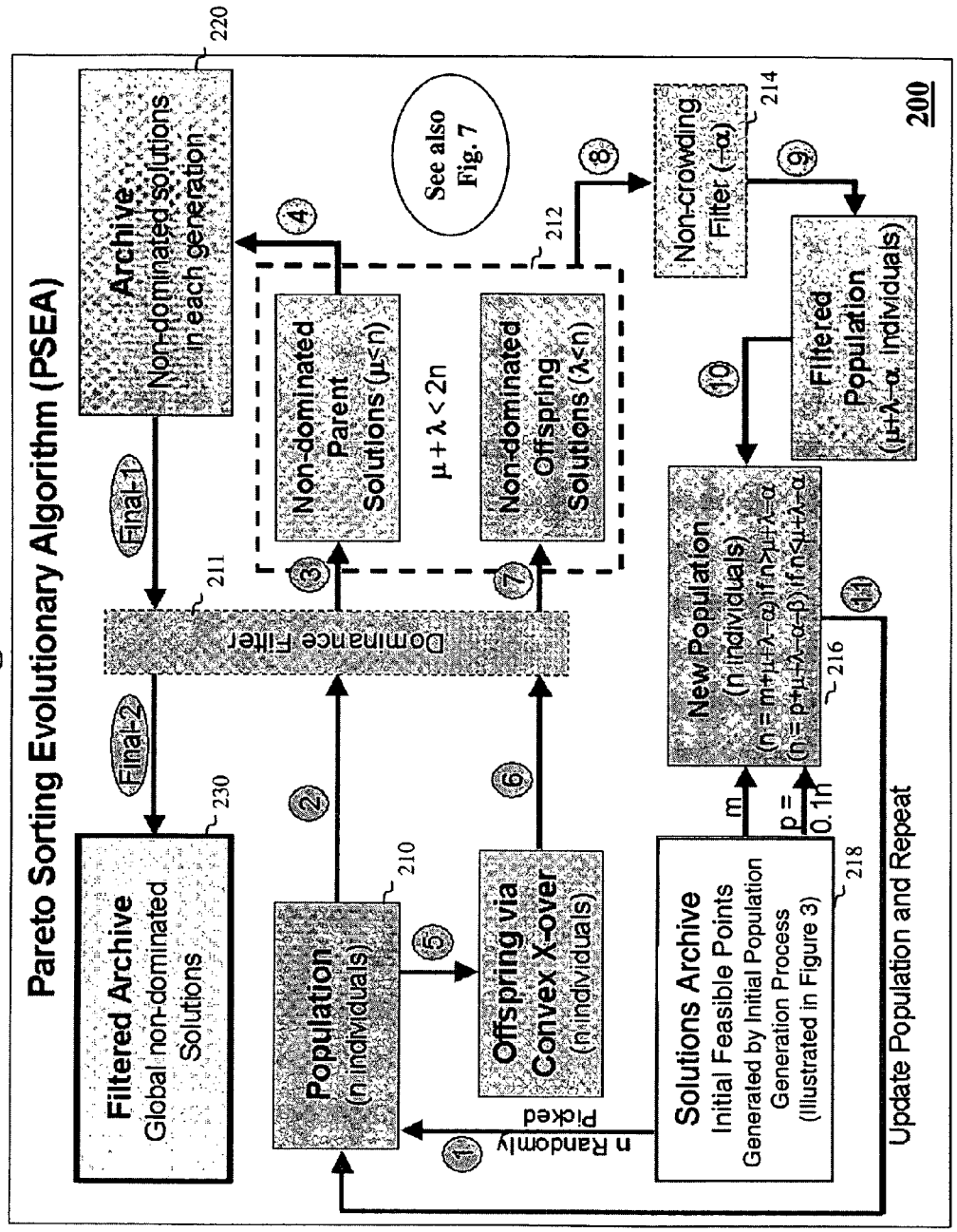
FIG. 6 is a flowchart showing a Pareto Sorting Evolutionary Algorithm (PSEA) operational process in accordance with one embodiment of the invention.

The operational details of the "Run PSEA" step 200 of FIG. 2 are hereinafter described through reference to the PSEA operational block diagram of FIG. 6. That is, FIG. 6 shows various populations and solutions utilized in the PSEA processing in accordance with one embodiment of the invention. Further, FIG. 7 shows the process steps that are performed in conjunction with the processing of the populations and solutions of FIG. 6.

Figure 7:
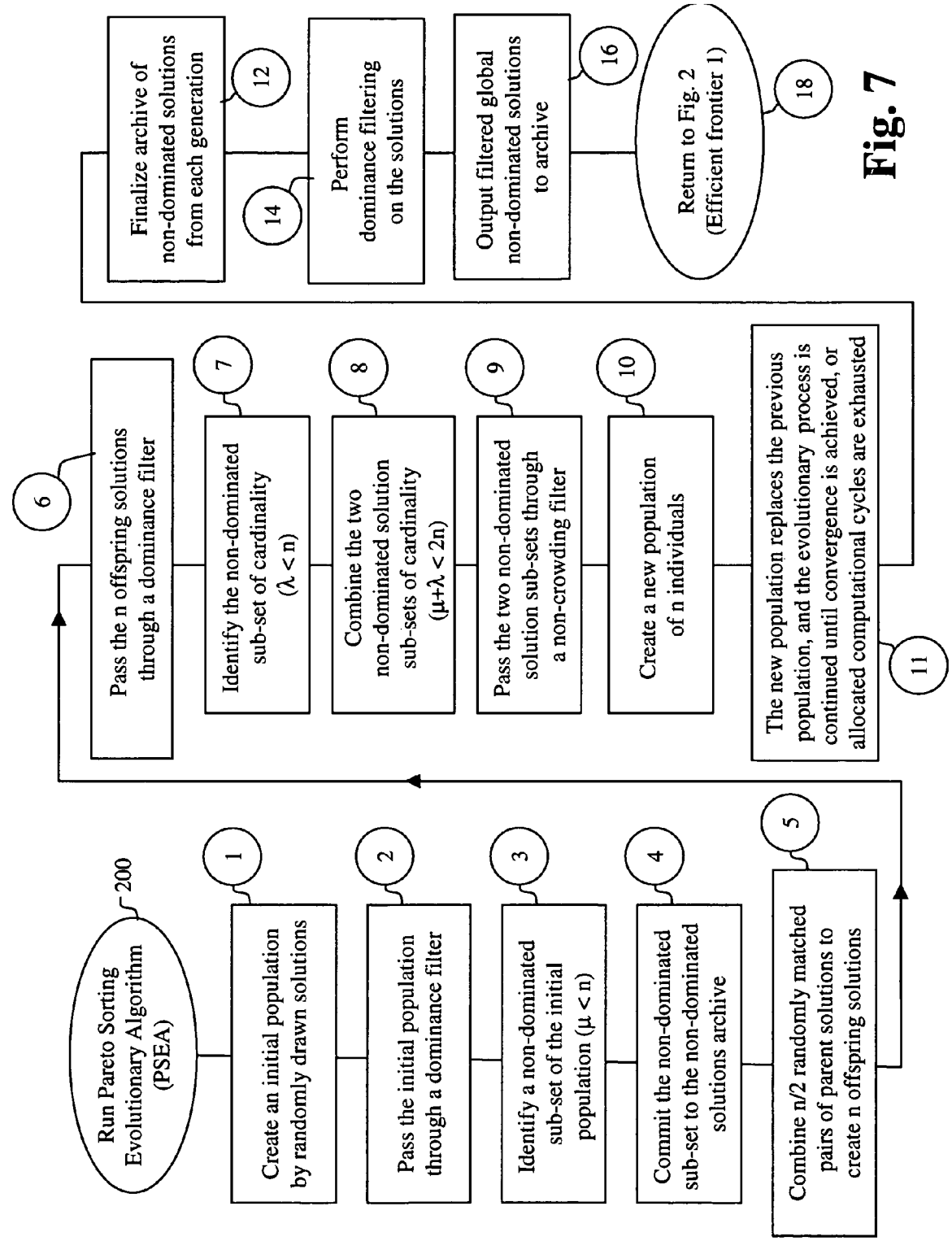
FIG. 7 is a further flowchart showing the Pareto Sorting Evolutionary Algorithm (PSEA) operational process of FIG. 6 in accordance with one embodiment of the invention.

The processing of FIG. 7 might be performed by an efficient frontier processing portion 202, in accordance with one embodiment of the invention. As shown in FIG. 7, the process starts in step 200 and passes to step 1. In Step 1 of FIG. 7, an initial population 210 of cardinality n is created by randomly drawn solutions. In the context of portfolio risk optimization, the solutions constituting the initial population are randomly drawn from a solutions archive 218 which may be comprised of the initial points population retrieved from a database, and which was generated using the initial points generation algorithm described above. Typically, the size of such a population would be in range of 50 to 100 solutions, for example. After step 1, the process passes to step 2.

In Step 2 the initial population of n individuals is passed through a dominance filter 211. As a result of the dominance filtering, in step 3, a non-dominated subset of cardinality ($\mu<n$) is identified. In step 4 as shown in FIG. 6, this non-dominated subset is committed to the non-dominated solutions archive 220, as shown in FIG. 6. After step 4, the process passes to step 5.

In Step 5, n/2 randomly matched pairs of parent solutions from the population 210 are combined to create n "offspring" solutions. In the context of portfolio risk optimization, since the feasible space is convex, and we already include a sample of the bounds of the convex feasible space via points from the solutions archive, convex combination of two parent solutions to yield two offspring solutions is a suitable crossover technique. Given two vectors x and y, the two offspring vectors generated via convex crossover are wx+(1−w)y, and (1−w)x+wy, where w is a real random number in the space [0, 1]. The n offspring solutions are passed through a dominance filter in Step 6. The dominance filter processing identifies the non-dominated subset of cardinality ($\lambda$<n), as shown in Step 7.

Accordingly, as shown in FIG. 6, the processing box 212 shows the prepared non-dominated parent solutions and the non-dominated off-spring solutions. In step 8, these two solutions are combined. That is, in step 8, we combine the two non-dominated solution subsets of cardinality ($\mu+\lambda$<2n). The combined solutions are passed through a non-crowding filter 214 in step 9. The non-crowding filter 214 removes a smaller subset of $\alpha$ solutions that are clustered. The result of this non-crowding operation of step 9 is a reduced solution subset of cardinality $\mu+\lambda-\alpha$. The non-crowding filter identifies regions that are heavily clustered and drops solutions from those dense clusters, i.e., so as to generate a more representative set or solutions.

After step 9, the process passes to step 10, in accordance with one embodiment of the invention. In Step 10, a new population 216 of n individuals is created. If n=$\mu+\lambda-\alpha$, then the filtered population from Step 9 becomes the new improved population. In the case that n>$\mu+\lambda-\alpha$, m individuals from the solutions archive 218 are randomly drawn such that n=m+$\mu+-\alpha$. The inclusion of these m individuals from the solutions archive 218 injects new points into the population enhancing its diversity.

Alternatively, it may be the case that n<$\mu+\lambda-\alpha$. In this situation, we are faced with a problem of discarding some solutions from the set of $\mu+\lambda-\alpha$, and at the same time promoting diversity via the injection of new points. This may be achieved in two sub-steps. In the first sub-step, (n−p) solutions are randomly selected from the $\mu+\lambda-\alpha$ solutions, where "p" is a number that is one tenth the magnitude of n, for example. In this processing, the value of "p" stays constant (e.g. "p" may be 5 solutions). In other words, $\beta$ solutions (e.g. 20 solutions) are randomly discarded from the set of $\mu+\lambda-\alpha$ solutions (e.g., which might number 65). To adjust the cardinality of the new population to n, p solutions are randomly injected from the solutions archive. The inclusion of these p individuals from the solutions archive injects new points into the population enhancing its diversity, and resulting in a desired number of 50 solutions, for example. The process of FIG. 6 and FIG. 7 then passes to step 11.

In Step 11 of FIG. 7, the new population 216 replaces the previous population 210, i.e., the population 210 is updated, and the evolutionary process is continued, i.e., repeated, until convergence is achieved, or allocated computational cycles are exhausted. Accordingly, at the conclusion of the evolutionary search, a non-dominated solutions archive 220 is achieved.

Accordingly, in step 12 of FIG. 7, the archive of non-dominated solutions from each generation is finalized to result in a "Final-1" set of global non-dominated solutions. Then, in step 14, the archived non-dominated solutions from each generation are processed using dominance filtering 211, for example, as described in FIG. 10 and FIG. 11. After step 14, a "Final-2" set of filtered, global non-dominated solutions are generated. Then, in step 16 of FIG. 7, the filtered, global non-dominated solution set is output to an archive 230. After step 16 of FIG. 7, the process passes to step 18. In step 18, the process returns to FIG. 2. That is, the processing of FIG. 6 and FIG. 7 results in the interim efficient frontier 32, which may be temporarily stored, as desired.

In step 16, the process finalizes the resulting archive of filtered global non-dominated solutions. Accordingly, a near-Pareto-optimal frontier is generated.

TOGA Processing

As shown in FIG. 2, the PSEA processing 200 may be said to run in parallel with processing 300 using what may be characterized as a Target Objectives Genetic Algorithm (TOGA), in accordance with one embodiment of the invention. TOGA is a non-Pareto, non-aggregating function approach to multi-objective optimization (Eklund 2002) that borrows concepts from goal programming and Schaffer's Vector Evaluated Genetic Algorithm (Shaffer, et al 1985).

While TOGA has been previously disclosed (Eklund 2002) in the context of multi-objective visible spectrum optimization for lighting applications, its implementation in the context of multifactor nonlinear non-convex multi-objective portfolio risk optimization, as described herein, is novel. Further, in accordance with embodiments of the invention, TOGA is incorporated into a broader framework for portfolio risk optimization. In accordance with some embodiments of the invention, this broader framework for portfolio risk optimization includes the linear programming-based initial points population generation approach (step 100 of FIG. 2), and the PSEA optimization approach (step 200 of FIG. 2).

Figure 8:
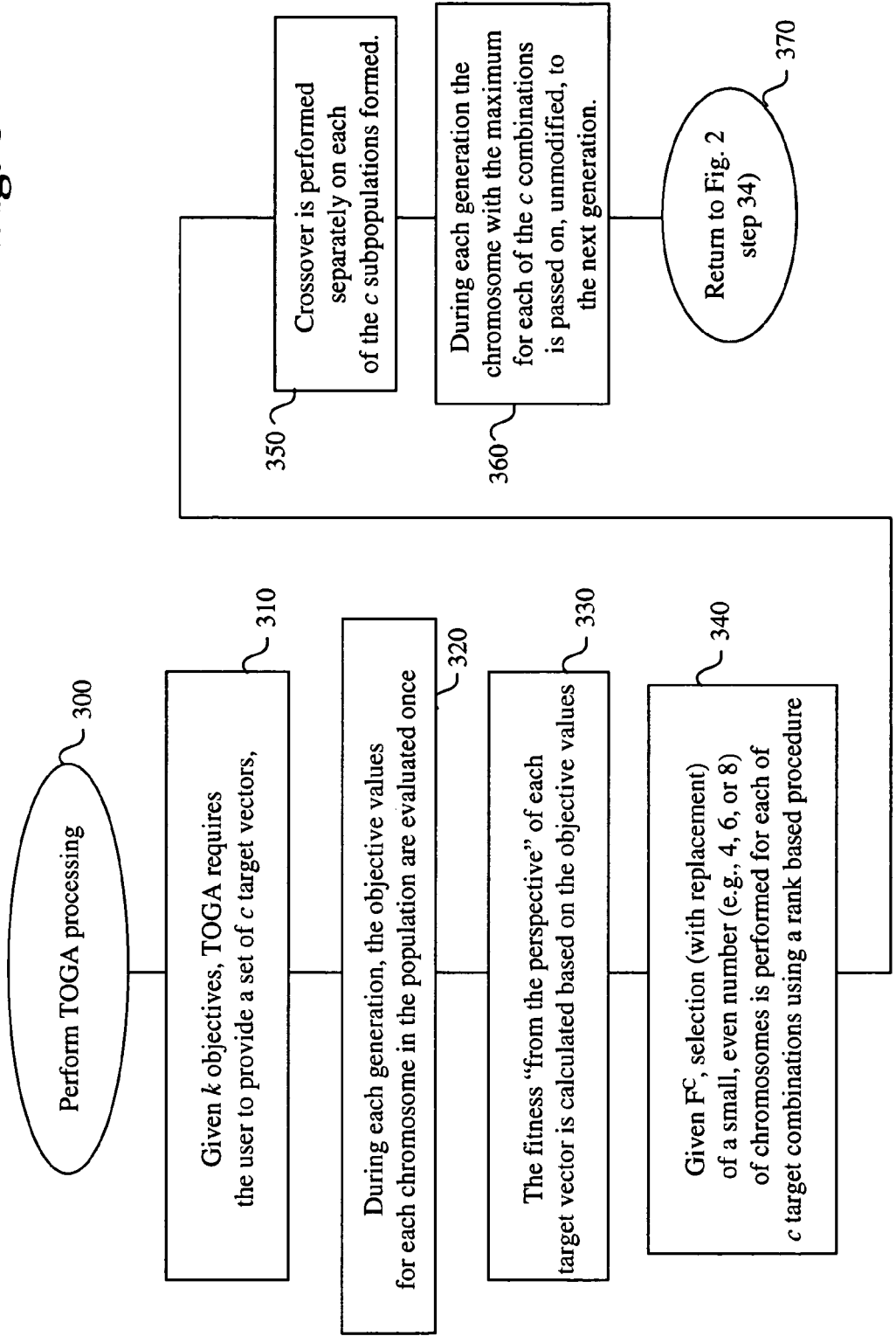
FIG. 8 is a flowchart showing Target Objectives Genetic Algorithm (TOGA) processing in accordance with one embodiment of the invention.

FIG. 8 is a flowchart showing aspects of the TOGA processing in accordance with one embodiment of the invention. That is, FIG. 8 shows further details of step 300 of FIG. 2. As shown in FIG. 8, the process starts in step 300 and passes to step 310. As illustrated by step 310, given k objectives, TOGA requires the user to provide a set of c target vectors, $T^c$, for k-1 objectives, where c is the number of optimal points the user wishes to find in one run of the algorithm. In the absence of domain knowledge to the contrary, taking all combinations of points of interest for each objective (considered separately) is the recommended method for developing the target vectors. In addition, k-1 scaling factors, w, are required (which can typically be determined empirically). After step 310 of FIG. 8, the process passes to step 320. As illustrated by step 320, during each generation, the objective values for each chromosome in the population are evaluated once. Note that this property may be particularly important in cases where the fitness function is very costly to evaluate; e.g., finite element analysis. After the value of the multiple objectives for each chromosome in the population is evaluated once, then as shown in step 330 of FIG. 8, the fitness "from the perspective" of each target vector is calculated based on the objective values using (for a maximization problem):

$$F^c = f_1(\bar{x}) - w_1(f_2(\bar{x}) - T_1^c)^2 - w_2(f_2(\bar{x}) - T_1^c)^2 - \ldots - w_{(k-1)}(f_k(\bar{x}) - T_{(k-1)}^c)^2$$

where:

$F^c$ is the fitness from the perspective of target vector c $f_k(\bar{x})$ is the objective value of objective k $w_{(k-1)}$ is a scaling factor for objective k $T_{(k-1)}^c$ is the target value for objective k in target combination c After step 330 of FIG. 8, the process passes to step 340. That is, given $F^c$, selection (with replacement) of a small, even number (e.g., 4, 6, or 8) of chromosomes is performed for each of c target combinations using a rank based procedure, with the probability of selecting the $i^{th}$ chromosome (when the chromosomes are sorted according to fitness), $P_i$ according to:

$$P_i = \frac{q(1-q)^{r-1}}{1-(1-q)^n}$$

where:
q is the probability of selecting the fittest individual;
r is the rank of chromosome (1 is best); and
n is the population size.

After step 340 of FIG. 8, the process passes to step 350. In step 350, crossover is performed separately on each of the c subpopulations formed.

In accordance with one embodiment of the invention, it is recommended that q be kept quite low (less than 0.1), to promote exchange of genetic material from different locations on the optimal front (i.e., so that universally good building blocks developed in one region can spread rapidly to other regions). However, because of the low likelihood of preserving the best chromosome from each target combination, elitism is an important feature of TOGA. Further, as shown in step 360, during each generation the chromosome with the maximum $F^c$ for each of the c combinations is passed on, unmodified, to the next generation. Note that this might be the same chromosome for different target combinations, particularly during early generations. The method of mutation is not specified for TOGA. That is, mutation should occur, but the particulars of implementation are not dictated by the TOGA approach.

With further reference to FIG. 8, after step 360, the process passes to step 370. In step 320, the process returns to step 34 of FIG. 2. That is, an interim efficient frontier has been generated.

In further explanation of the TOGA processing, the selection and elitism strategies are the key elements in TOGA. By selecting from the perspective of each $T^c$, subpopulations specializing in performance at that particular point on the optimal front are developed. However, diversity is maintained by having multiple $T^c$, and by elitism. Moreover, by sharing good genetic building blocks developed on different regions of the optimal front, substantial efficiency is gained when compared to individual goal programming runs, which have to start from scratch.

The Fusion Technique

In accordance with further aspects of the invention, it may be the situation that the measures of return and risk are represented by functions that are arbitrarily non-convex and nonlinear. In this case, there is no computationally tractable algorithmic approach that can guarantee optimality of the identified efficient frontier. In such a situation, a single execution of any of the stochastic multi-objective optimization algorithms described above may be insufficient. However, in accordance with one embodiment of the invention, better coverage of the efficient frontier may be obtained by multiple executions and combination of the results of the executions of a combination of these algorithms. Accordingly, step 560 of FIG. 2 shows the application of fusion techniques to combine the interim efficient frontiers to generate the efficient frontier.

Figure 9:
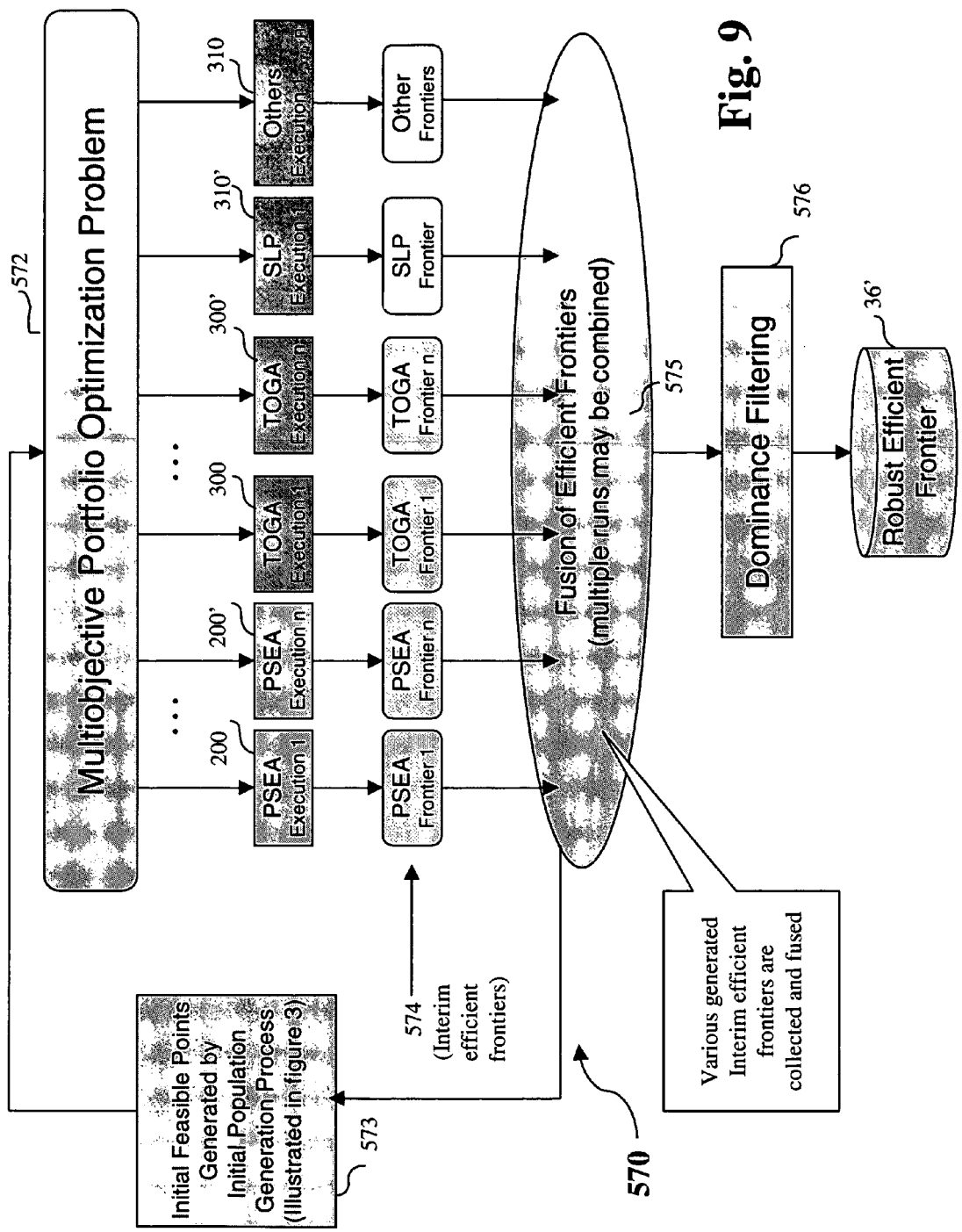
FIG. 9 is a flowchart showing a fusion process in accordance with one embodiment of the invention.

Further, FIG. 9 further shows the fusion processing in accordance with one embodiment of the invention.

It is noted that each of the multi-objective optimization algorithms (200, 300, 310) incorporates a different set of stochastic search heuristics. Accordingly, one such algorithm may therefore be better than the other algorithm for certain problems and in certain regions of the efficient frontier. Therefore, an efficient and robust method (for identification of the best possible efficient frontier) is to combine the results of multiple executions of each of these optimization algorithms, and perform a dominance filtering of the fused set of results. This process is described in FIG. 9.

That is, FIG. 9 shows a fusing process 570 in accordance with one embodiment of the invention. For example, the fusing process might be used in the processing of FIG. 2. The application of fusion techniques to combine efficient frontiers starts with a multiobjective portfolio optimization problem, as shown in step 572 of FIG. 9. In accordance with one embodiment of the invention, the process may use the processing of FIG. 3, as described above, so as to generate the initial feasible points in solving the multiobjective portfolio optimization problem.

Once the optimization problem has been prepared as shown in steps 573 and 572, the process passes to steps (200, 300 and/or 310). That is, the process of FIG. 9 uses one or more techniques to generate a number of interim efficient frontiers 574. For example, these techniques might include PSEA, TOGA, SLP, and others, for example. Steps (200, 300 and/or 310) might be performed in parallel, for example.

Once the interim efficient frontiers 574 have been generated, the process passes to step 575. In step 575, the process of FIG. 9 fuses the various interim efficient frontiers, which were generated by the processes (200, 300, 310). This fusing is performed by combining the interim efficient frontiers in some suitable manner, as discussed below. Each of the techniques used by the processes (200, 300, 310), shown in FIG. 9, may be executed multiple times to yield different efficient frontiers. Various different runs of the techniques may incorporate a different set of stochastic search heuristics, and may respectively focus on particular problems and on particular regions of the efficient frontier.

Further, it is appreciated that the user might view the generated efficient frontier (from step 575 or step 576) and determine that such generated efficient frontier is not sufficient. For example, the efficient frontier may not have the diversity that the user, e.g., a portfolio manager, desires or expects. Accordingly, the user might rerun the process of FIG. 9, so as to attain the desired diversity, for example. The results of the multiple runs might be combined in some suitable manner, as shown in step 578 of FIG. 9.

Further, it is not necessary that each of the techniques be used. For example, only PSEA processing and TOGA processing might be used. Each of the PSEA, TOGA and/or SLP processing feeds into the fused efficient frontiers. That is, in step 575 of FIG. 9, the various generated interim efficient frontiers are collected and are fused together. While the fusion technique itself may be based on one of several heuristics, one approach presented herein includes a concatenation, i.e., an augmentation of sets, of the frontiers determined by the various algorithms. However, the fusion processing of step 575 may include other techniques to combine the efficient frontiers 574. Other fusion operators, e.g. probabilistic fusion techniques, may be applied when there exists a measure of uncertainty in the generated efficient frontiers.

In accordance with one embodiment of the invention, as shown in FIG. 9, after step 575 in which the interim efficient frontiers are fused into a single efficient frontier, the single efficient frontier is then passed through dominance filtering. In accordance with one embodiment of the invention, the novel "fast dominance filtering" as described herein may be used. The dominance filtering is a key step in the fusion of frontiers since this filtering guarantees that only the overall best performing results from each of the algorithm executions are retained. The effect of the filtering is therefore retention of the solutions representing a best, i.e., the best that can be achieved, approximation to the true efficient frontier. This processing results in a robust efficient frontier (36, 36'), as shown in FIG. 2 and FIG. 9.

Hereinafter, further aspects of the fusion processing will be described in accordance with some embodiments of the invention. Fusion as described herein may be characterized as relying on two assumptions: (1) the evaluation of a given portfolio is deterministic, i.e., the performance of a portfolio $\overline{X}_i$ (a vector of asset allocations in the portfolio configuration space $\overline{X}$) is represented by a point $\overline{Y}_i=[y_{i,1},\ldots,y_{i,n}]$, defined in an n-dimensional performance space $\overline{Y}$); and (2) each process generating a set of non-dominated points (i.e., any of the execution blocks (200, 200', 300, 300', 310, 310') illustrated in FIG. 9) is equally reliable. Under these assumptions the set aggregation, i.e. union, is a reasonable fusion operator.

It is possible to have situations in which we need to relax one of the above assumptions. In situations when we could no longer assume a deterministic portfolio evaluation, we could face two possible types of evaluation uncertainty: "stochastic" (defined by a continuous probability distribution) and "discrete-probabilistic." Stochastic uncertainty is introduced when the performance of the assets included in a portfolio $\overline{X}_i$ can only be evaluated stochastically. Hence the performance of $\overline{X}_i$ will be a probability distribution defined on each dimension j of the performance space (e.g., return, risk, etc.) Under usual assumptions of normality, this distribution will be represented by a mean $\mu_{i,j}$ and a standard deviation $\sigma_{i,j}$ (average and standard deviation of portfolio $\overline{X}_i$ for performance metric $y_j$). Therefore, the representation of portfolio $\overline{X}_i$ in the performance space is now $\overline{Y}_i=[(\mu_{i,1},\sigma_{i,1}),\ldots,(\mu_{i,n},\sigma_{i,n})]$. Initially, by using a common statistical transformation we can transform each pair $(\mu_{i,j},\sigma_{i,j})$ into a confidence interval $[a_{i,j},b_{i,j}]$, where $a_{i,j}$ and $b_{i,j}$ are the lower and upper bounds of the confidence interval for a given confidence level $\alpha$. The representation of a portfolio $\overline{X}_i$ in the performance space is now $\overline{Y}_i=[(a_{i,1},b_{i,1}),\ldots,(a_{i,n},b_{i,n})]$. In contrast with the deterministic evaluation, each portfolio will now be represented in performance space $\overline{Y}$ by a hyper-rectangle instead of a single point.

The fusion process will now account for this uncertainty and the set augmentation will be extended to include hyper-rectangles as well as single points. In such a case, it is important to also consider this uncertainty when using the space-decomposition-based dominance filter. Rather than selecting only non-dominated points in the set generated by the fusion, the filter will include a tolerance bound $\epsilon$, which will retain $\epsilon$-dominated points. These aspects of the fusion processing in accordance with one embodiment of the invention are described below.

Figure 29:
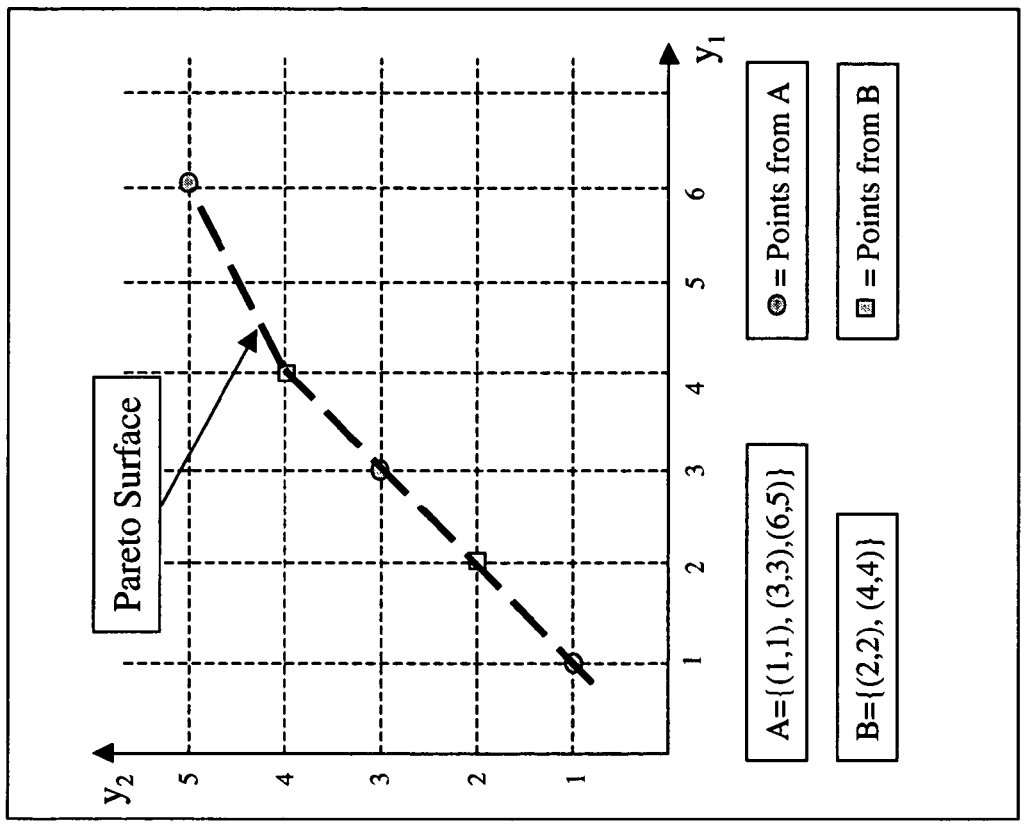
FIG. 29 is a graph showing aspects of a deterministic evaluation in accordance with one embodiment of the invention.

In FIG. 29 we illustrate an example of fusion for the deterministic evaluation of portfolio performance obtained from two sources, A and B. These sources could be any of the execution blocks (200, 200', 300, 300', 310, 310') illustrated in FIG. 9. In this example, Source A is generating 3 points, $\{(1,1), (3,3), (6,5)\}$, while source B is generating 2 points, $\{(2,2), (4,4)\}$. As the points are all distinct, the fusion will generate the union of all five points.

Figure 30:
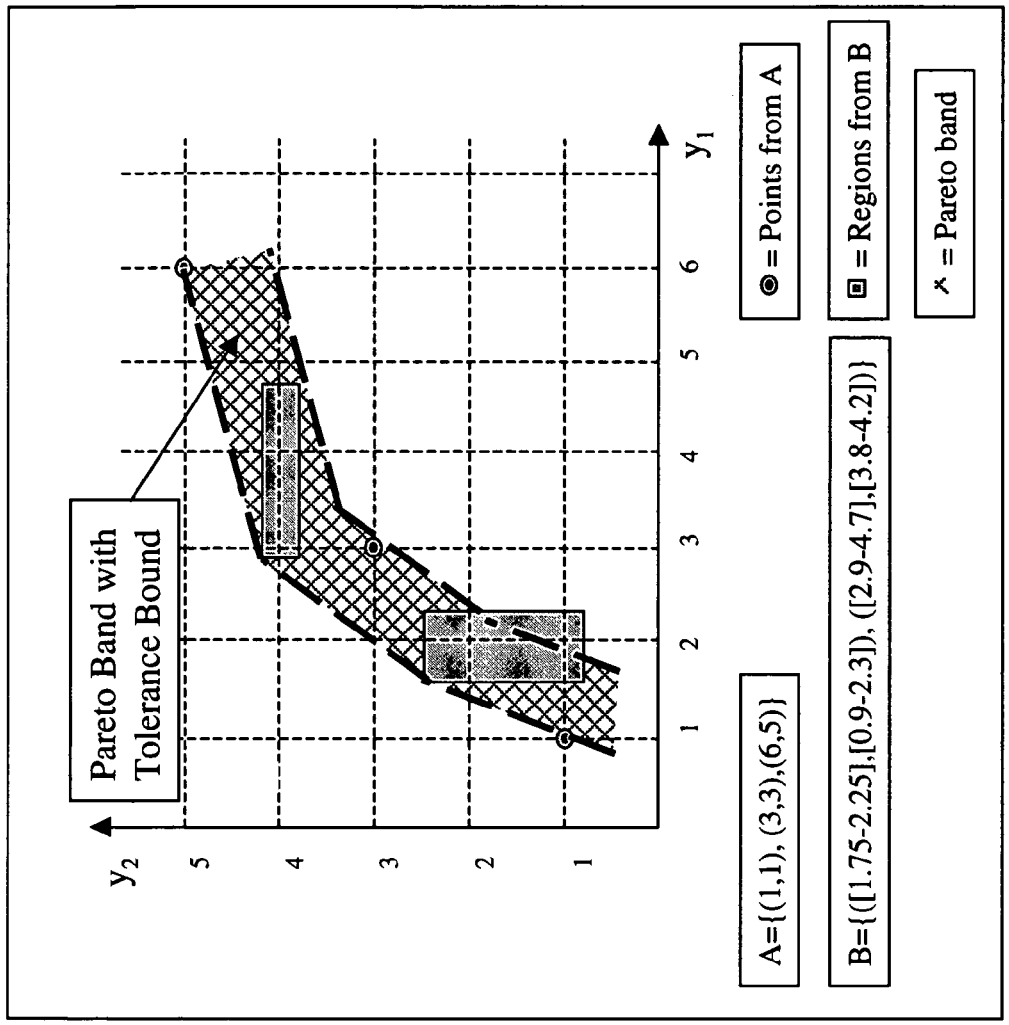
FIG. 30 is a graph showing aspects of a stochastic evaluation in accordance with one embodiment of the invention.

In FIG. 30, we illustrate the same example but now source B is using a stochastic evaluation of the portfolio performance. In lieu of generating two points, as in FIG. 29, after the transformation from the evaluation statistics to the confidence intervals, we now have two regions (defined by rectangles in 2-D spaces and by hyper-rectangles in higher dimensional spaces). The fusion is the union of all regions and points. The same FIG. 30 shows a Pareto surface with some tolerance bound, to account for the uncertainty in the evaluation.

A different situation arises when the uncertainty cannot be represented by a continuous probability distribution but rather by discrete probability assignments to subsets of points in the performance space $\overline{Y}$. Imagine for instance that the evaluation of a given metric (e.g., return) can take only one of a small, finite number of values, depending on the outcome of a given event (e.g. the approval of a merger, the granting of a license from a regulatory agency, etc.)

Instead of creating hyper-rectangles (as we did in the case of stochastic uncertainty), we now have a discrete subset of points, with a probabilistic assignment associated with each singleton point. For example the representation of portfolio $\overline{X}_i$ in the performance space could be described as:

$$\overline{Y}_i = \left\{ \begin{array}{l} [\{(y_{i,11}), m_1\}\{(y_{i,12}), m_2\}, \{(y_{i,13}), m_3\}\{(y_{i,14}), m_4\}, \\ \{(y_{i,15}), (1-m_1-m_2-m_4)\}], \ldots, \\ [\{(y_{i,n1}), m_6\}, \{(y_{i,n2})(1-m_7)\}] \end{array} \right\}$$

This representation can be interpreted as following: in the first assignment, we show that the first metric can take one of five possible values: $y_{i,l1}$ through $y_{i,l5}$. Each value assignment has an associated probability value. The sum of the probability values for the entire assignment is equal to one. In the last assignment, we show that the last metric can take one of two possible values $y_{i,n1}$ and $y_{i,n2}$. Next to each value we show its associated probability value.

Figure 31:
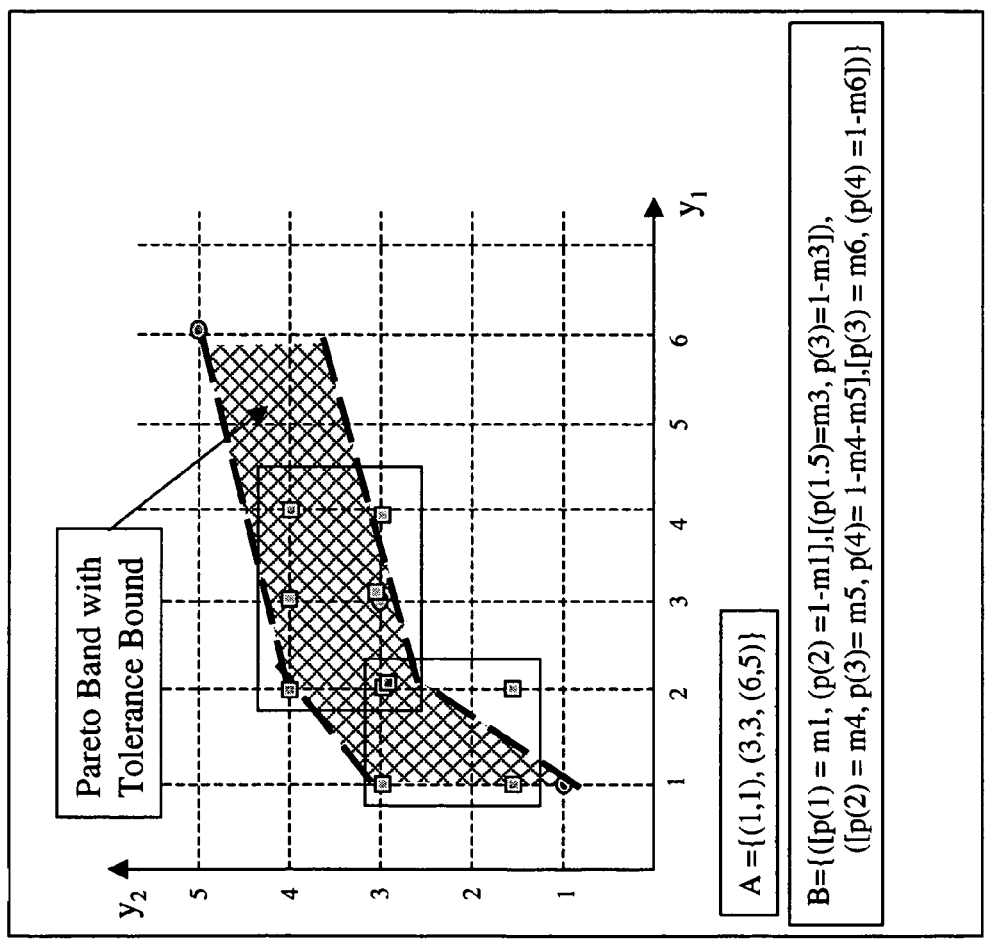
FIG. 31 is a graph showing aspects of a discrete probabilistic evaluation in accordance with one embodiment of the invention.

Note that we could represent the deterministic assignment illustrated in FIGS. 30 and 31 in this manner, by binding one of the probability values in each assignment (as shown contained in a squared bracket) to one and binding the remaining ones to zero. This concept is illustrated in FIG. 31, where the deterministic assignments in source A are represented as three probabilistic assignments, each with probability one. That is, FIGS. 30 and 31 show continuous and discrete probabilistic assignments.

In the same example in FIG. 31, we can observe that source B has generated a "discrete-probabilistic" evaluation. In lieu of the two points or two rectangles we now have two discrete assignments, as indicated in FIG. 32.

After all assignments have been determined, we can perform a "probabilistic fusion," which is derived from an extension of Dempster-Shafer (DS) rule of combination. DS rule has been defined (Shafer, 1967; Dempster, 1976) to implement the "intersection" of the probabilistic outcome of two or more sources. In a generalization of this rule, filed in a previous patent application (U.S. application Ser. No. 10/425, 721, filed Apr. 30, 2003, which is incorporated herein by reference in its entirety, the inventors redefined DS rule of combination as the "outer product" of two probability distributions using the "scalar product" as an operator. In the same patent application, the inventors generalized DS rule of composition by allowing the outer product operator to be any Triangular T-norms (instead of the scalar product). This is illustrated in the table of FIG. 37.

We recall that Triangular norms (T-norms) and Triangular conorms (T-conorms) are the most general families of binary functions that satisfy the requirements of the intersection and union operators, respectively (Schweizer and Sklar, 1963;

Bonissone 1987). T-norms $T(x,y)$ and T-conorms $S(x,y)$ are two-place functions that map the unit square into the unit interval, i.e., T: $[0,1]\times[0,1]\to[0,1]$ and S: $[0,1]\times[0,1]\to[0,1]$ They are monotonic, commutative and associative functions. Their corresponding boundary conditions, i.e., the evaluation of the T-norms and T-conorms at the extremes of the [0,1] interval, satisfy the truth tables of the logical AND and OR operators. They are related by the DeMorgan duality, which states that if $N(x)$ is a negation operator, then the T-conorm $S(x,y)$ can be defined as $S(x,y)=N(T(N(x), N(y)))$.

Given that the fusion, in accordance with some embodiments of the invention requires evaluating the "union" of the probabilistic outcome of two or more sources, we extend the previous work set out in U.S. application Ser. No. 10/425,721 (to P. Bonissone, et al. entitled "System And Process For A Fusion Classification For Insurance Underwriting Suitable For Use By An Automated System") by using Triangular conorms $S(x,y,)$ as the outer product operators. In FIG. 32, we show the results of the fusion using the triangular conorm $S(x,y,)=x+y-x*y$. This conorm is the DeMorgan dual of the scalar product, using the negation operator $N(x)=1-x$. Let's recall that $S(x,y)=N(T(N(x), N(y)))$. Other T-conorms, such as the ones listed in the table of FIG. 38, could also be used to account for positive or negative correlation among the sources.

Once the fusion is performed, we can use a threshold and only consider those points whose probability is greater than the threshold. This is analogous to the threshold-operation that yielded the confidence interval in the case of stochastic uncertainty.

As a further extension, the probabilistic assignment illustrated in FIG. 31 could be extended to "subsets" rather than "singletons," and a similar generalization of the fusion could be applied as well.

Up to this point we assumed that original assumption two was valid, i.e., we assumed that each process generating a set of non-dominated points was "equally reliable." When this is not the case, we need to use a discounting mechanism that can provide such a differentiation. This discounting can be implemented in the framework of discrete-probabilistic evaluation by assigning a non-zero probability value to the union of all values.

Space-Decomposition-Based Dominance Filtering Process

In accordance with the embodiment of the invention shown in FIG. 2, dominance filtering is a highly useful component of our approach to multi-objective portfolio optimization. To explain, given a set of M vectors to be partitioned into dominated and non-dominated subsets, and given N objectives, the worst-case computational complexity of the typical partitioning process is $O(N M^2)$. For large M and N>2, the time required to partition the set of M vectors grows rapidly. Also, since the PSEA described above is dependent on its ability to repeatedly and rapidly differentiate between the dominated and non-dominated solutions, speed in dominance filtering directly impacts the computational performance of the PSEA.

Accordingly, in some embodiments of the invention, what might be characterized as a fast version of dominance filtering is disclosed below, i.e., an approach to dominance filtering that has been observed by the inventors to typically be faster than known approaches. This implementation, as provided by one aspect of the invention, relies on intelligently decomposing the set of solutions to be partitioned, and working systematically on smaller subsets of the full set of solutions. Such a problem decomposition results in a significantly reduced problem complexity, since the cardinality (m), i.e., size, for these smaller sets is typically much smaller than the cardinality (size) of the entire solution set (m<<M).

However, while the use of a dominance filter is described herein in accordance with some embodiments of the invention, it is noted that the use of this specific implementation may not be needed, and that one novelty of the inventive systems and methods described herein is in the use of a dominance filter with performance better than the traditional $O(N M^2)$ for improving the on-line performance of a multi-objective search algorithm, and more specifically for portfolio optimization. Therefore, any so called fast dominance filter that may implement any from a diverse set of heuristics for improving on the traditional filter's computational performance without compromising on the quality of results may be utilized for the purposes of achieving performance improvements.

Figure 10:
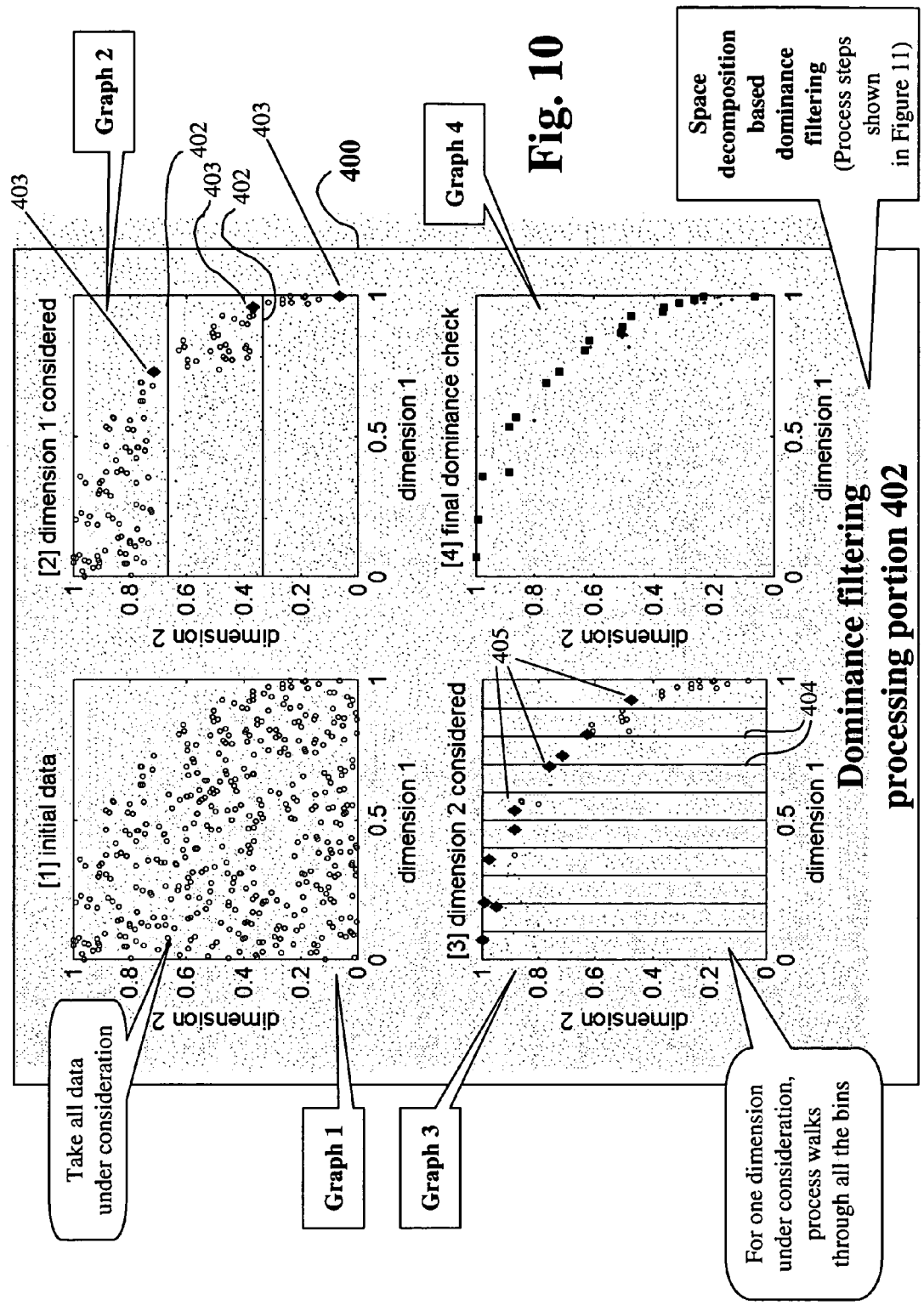
FIG. 10 is a diagram showing aspects of a dominance filtering process in accordance with one embodiment of the invention.
Figure 11:
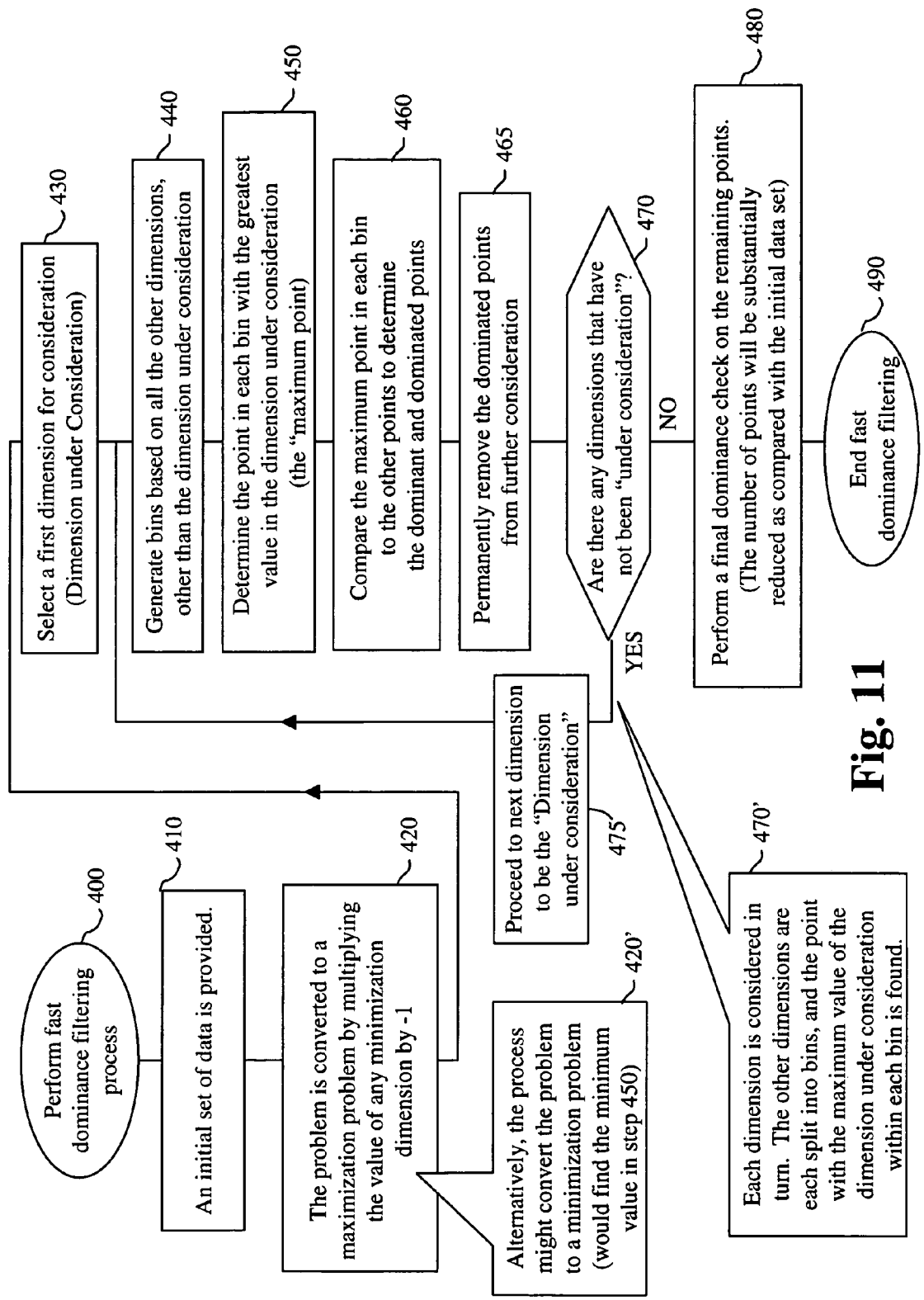
FIG. 11 is a flowchart showing further aspects of the dominance filtering processing in accordance with one embodiment of the invention.

We refer to FIG. 10 in explanation of the operation of the fast dominance filter, in accordance with one embodiment of the invention. As shown, FIG. 10 includes four graphs representing the process or computational steps. FIG. 11 is a flowchart also illustrating the process steps. As shown in FIG. 10, the dominance filtering might be characterized as space decomposition based dominance filtering. Further, the dominance filtering process may be performed by a suitable dominance filtering processing portion 402.

For purposes of illustration, the steps of FIG. 10 are shown in two dimensions. The two dimensions respectively represent two objectives. Accordingly, the goal of the fast dominance filtering process is the maximization of each of the two objectives, in this two-dimensional example. The process of FIG. 10 can and typically will be expanded to many more than two dimensions. Also, as illustrated in FIG. 2, the fast dominance filtering process may be used in conjunction with the PSEA processing (step 200) and/or the related fusion processing (step 500), for example.

As shown in FIG. 11, the process starts in step 400 and passes to step 410. In step 410, a set of initial data is provided. However, as used here, the term "initial data" means data initially used in the process of FIG. 11. Accordingly, the initial data of step 410 may have been previously processed by any of a variety of other techniques, prior to the processing of FIG. 11.

The initial set of data is also illustrated by graph 1 of FIG. 10. After step 410 of FIG. 11, the process passes to step 420. In step 420, the problem is converted to a maximization ("larger is better") problem by multiplying the value of any minimization ("smaller is better") dimension by −1. This step enforces uniformity in any sorting procedures and consequently saves computational time. However, the problem might alternatively have been converted to a minimization problem to achieve the same effect with no difference in the resulting Pareto optimal set.

After step 420, the process passes to step 430. In step 430, a first dimension is selected for consideration. Accordingly, the considered dimension may be termed a "dimension under consideration." As shown in FIG. 10, graph 2 illustrates consideration of dimension 1 and graph 3 illustrates consideration of dimension 2.

After step 430, in which the dimension under consideration is selected, the process passes to step 440. In step 440, the process generates bins based on all the dimensions, other than the dimension under consideration. Thus, if dealing with a total of two dimensions, the binning will simply involve strips, as shown in FIG. 10. In FIG. 10, graph 2 shows the consideration of dimension 1 and includes splitting dimension 2 into a plurality of bins 402. On the other hand, graph 3 shows the consideration of dimension 2 and includes splitting dimension 1 into a plurality of bins 404.

Alternatively, if dealing with a total of three dimensions, the binning will involve decomposing the space into rectangles based on all the dimensions, other than the dimension under consideration. Alternatively, if dealing with a total of four dimensions, the binning will involve decomposing the space into hexahedra based on the three dimensions not under consideration. After step 440, the process passes to step 450.

In step 450, the process determines the point in each of the formed bins with the greatest value in the dimension under consideration. For example, with reference to graph 2, this point with the greatest value would be the points 403, as shown in FIG. 10. That is, in step 450, the process determines the points 403. After step 450, the process passes to step 460.

In step 460, the process of FIGS. 10 and 11 compares the maximum point in each bin to the other points in the data set, i.e., including those points in other bins, so as to determine some dominated points in the data set. As shown in FIG. 10, the filled diamonds (403) are maximum values within a bin along the dimension under consideration. In FIG. 10, points not dominated by the bin-maximum points are shown as open circles. Further, dominated points are shown as "dots." The "dots" are not greater than the respective points 403 in both dimension 1 or dimension 2. Accordingly, the dots are dominated points, which by definition can not be a part of the Pareto front. As a result, in step 465, the process permanently removes all the dominated points found in the current iteration from further consideration. Thus, as the process progresses, it is necessary to compare fewer and fewer points to each other. This drastically improves the computational performance in the later stages of the processing.

After step 465 of FIG. 11, the process passes to step 470. In step 470, the process determines whether there are dimensions that have not been "under consideration." If yes, than the process passes to step 475. In step 475, the process proceeds to the next dimension to be the "dimension under consideration." For example, the process proceeds to consider dimension 2, as shown in graph 3 of FIG. 10.

After step 475, the process returns to step 440. Thereafter, the process proceeds as described above, i.e., in processing of the further dimension. As the process proceeds through the dimensions, i.e., by making in turn each dimension the dimension under consideration, the number of points in the data set is progressively reduced.

As described herein, a first dimension will be the dimension under consideration, and thereafter, a second dimension will be the dimension under consideration, for example. It should be understood that during processing with the "second dimension under consideration", for example, the first dimension (which was previously under consideration) is treated as any other dimension, i.e., the first dimension is not, at the time, under consideration. Likewise, when a third dimension is under consideration, the first and third dimension will be treated as any other.

At some point in the process of FIG. 11, each dimension will have been considered. Accordingly, at that time, the process will determine, in step 470, that each dimension has indeed been considered. The process then passes to step 480.

In step 480, the process performs a final dominance check on the remaining points. This final dominance check may be performed using known techniques. The set of remaining points subjected to the final dominance check will be in most cases substantially reduced, as compared to the number of points in the initial data set. After step 480, the process passes to step 490. In step 490, the fast dominance filtering process ends.

As shown in FIG. 10 and discussed above, the dimensions (other than the dimension under consideration) are respectively split into some number of bins. The particular number of bins may be based on any of a variety of criteria, such as the number of points remaining to classify, for example, or any other criteria. For example, as shown in FIG. 10, the bins based on dimension 2 (Graph 2) are courser than the bins based on dimension 1 (Graph 3). For example, as the number of points decreases, the coarseness of the bins may decrease.

In accordance with embodiments of the invention, the dominance filter provides a speedup. The magnitude of the speedup provided by the fast dominance filter varies of course based on the nature of the binning method, including the size of the bins, and the distribution of the initial set, for example. If the number of points dominated by the maximum points within the bins early in the process is a relatively large fraction of $M_r$, very good speedups are possible in the dominance filtering. The maximum speedups therefore arise when the raw data are relatively evenly distributed throughout the objectives space.

Hereinafter, further aspects and subtitles of the dominance filtering process are described. The dominance filtering process 400 as described herein assumes that there is no uncertainty associated with the value of each portfolio on each dimension. While this assumption produces quite reasonable and usable results, it is assuredly false. Any metric that purports to measure the future value of a portfolio has some uncertainty associated with the prediction.

To take that uncertainty into account for the dominance filtering, one needs only to extend the definition of dominance described above. That is, the definition of dominance may be extended to: Given an n-dimensional measurable space whose elements can be partially ordered, and some estimate of uncertainty, $\epsilon_i$, a vector in this space $x=(x_1, x_2, \ldots, x_n)$ is considered non-dominated if there exists no other vector z such that:

$$x_i + \epsilon_i \leq z_i \text{ for all i, and } x_k + \epsilon^k < z_k \text{ for at least one } 1 \leq k \leq n.$$

As used in this relationship, the symbol $\leq$ may be interpreted as "the right-hand-side of the relationship "is better than" its left-hand-side" (or "better-than" relation) without loss of generality. Using this definition of dominance, the dominance filtering process can take the uncertainty inherent in estimating future values into account. Note that the value of $\epsilon$ need not be the same for each dimension.

Interactive Supplementation of the Efficient Frontier

As described above, when the measures of return and risk may be represented by functions that are arbitrarily nonconvex and nonlinear, there is no computationally tractable algorithmic approach that can guarantee optimality of the identified efficient frontier. As such the identified efficient frontier may have a few gaps or holes. Such holes may be easily identified by a user via a use of multiple orthogonal 2D projections of the efficient frontier. The TOGA described earlier is a multi-objective optimizer more suited when good targets may be placed in the objectives space.

When a user identifies potential gaps or holes in the efficient frontier, they may select those regions for further sampling by manually placing targets in those areas, in accordance with one embodiment of the invention. Once a gap is identified on a plot, choose values of one of the objectives that exhibit the gap that would fill the gap, and use these values to construct $\bar{T}^c$ as described in the description herein of TOGA processing, i.e., as shown in step 310 of FIG. 8, for example. This may be performed by interactively using a suitable visualization tool capable of two-dimensional plots. Once targets are specified in those regions, the TOGA is invoked to identify the efficient frontier in those regions. This frontier is combined with the efficient frontier identified via the algorithm fusion, and results in a more complete robust efficient frontier. This process is shown in FIG. 12.

Figure 12:
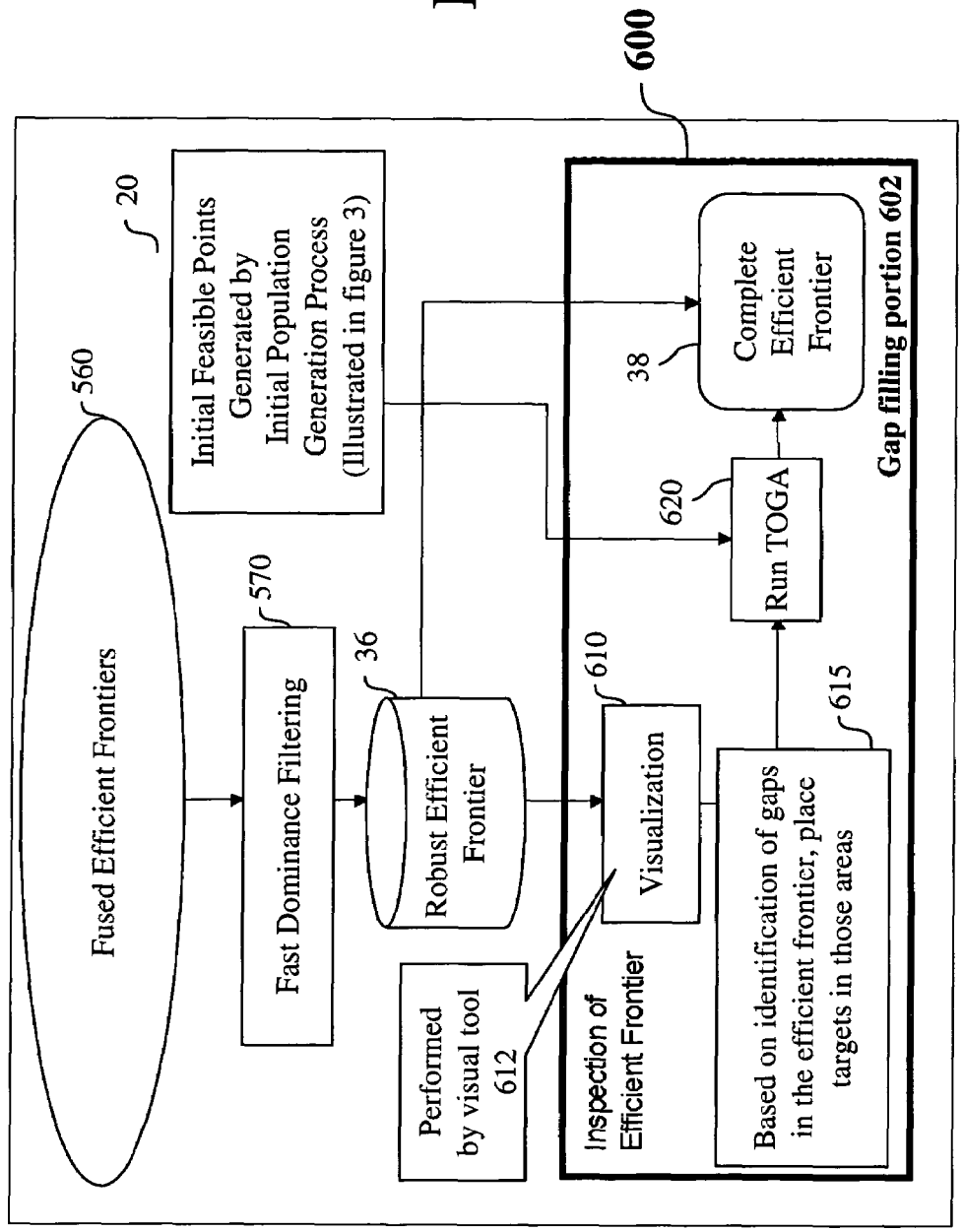
FIG. 12 is a flowchart showing a process to interactively fill gaps in an identified efficient frontier in accordance with one embodiment of the invention.

As shown in FIG. 12, the process starts with the fused efficient frontiers 560', as described above with reference to FIG. 2. After step 560 of FIG. 12, the process passes to step 570. In step 570 fast dominance filtering is performed, as is also described above. This processing results in a robust efficient frontier 36. After obtaining the robust efficient frontier 36, the generated efficient frontiers may be examined in the gap filling processing 600, as shown in FIG. 12. The processing 600 may be performed by a gap filling portion 602, for example.

Figure 13:
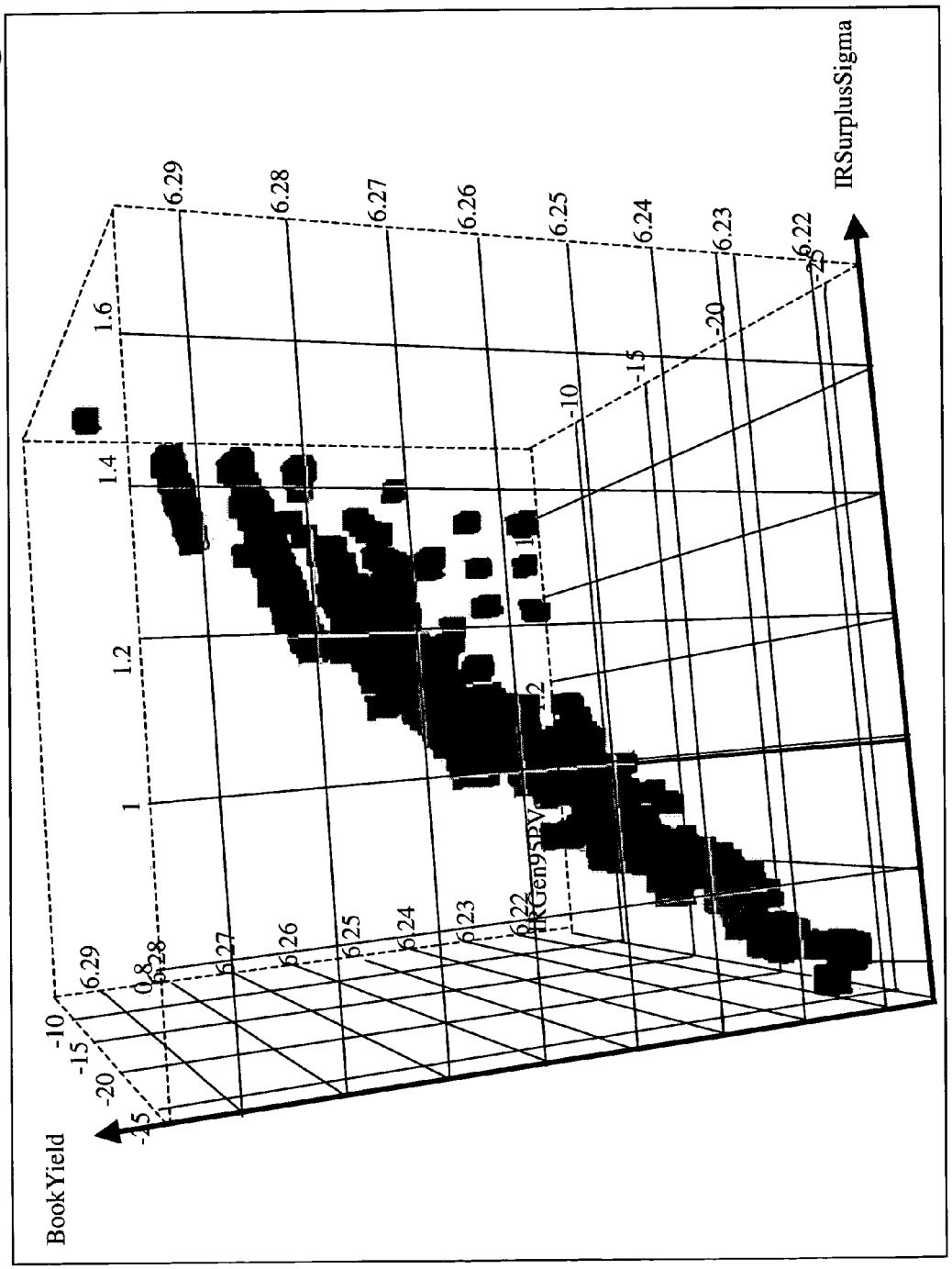
FIG. 13 is a diagram showing an efficient frontier in a 3D View in accordance with one embodiment of the invention.

As can be appreciated, there may be gaps in the efficient frontier. To explain, in accordance with one embodiment of the invention, the efficient frontier is visually observed or inspected by a user, e.g., a portfolio manager. For example, FIG. 13 is a diagram showing an efficient frontier in a 3D View in accordance with one embodiment of the invention. A suitable visualization tool 612 might be used for this visual observation. Based on this inspection, the user may well identify gaps in the efficient frontier. The user may be interested in points in the area of the gaps and wish to effect further sampling in the area of the gaps. Accordingly, the user may interactively place targets in those identified areas having gaps, in accordance with one embodiment of the invention.

Accordingly, with reference to FIG. 12, as a result of the visualization step 610 of FIG. 12, the process passes to step 615. In step 615, based on the identification of gaps in the efficient frontier, targets are interactively placed in the area of the gaps. After step 615, the process passes to step 620.

In accordance with one novel aspect of the invention, in step 620 TOGA processing is effected. Specifically, TOGA processing is performed in the targeted area so as to fill in the targeted area with further points, i.e., so as to more completely fill the efficient frontier. As can be appreciated, the target area must be provided to the TOGA processing in some suitable manner, i.e., so as to effect the TOGA processing in the desired target area. This may be performed by providing the initial feasible points to the TOGA processing. In accordance with one embodiment of the invention, the initial feasible points might be generated by randomized linear programming.

Accordingly, the results of the TOGA will provide further data points on the efficient frontier in places or areas where there were previously gaps. These supplemental points will be combined with the remainder of the efficient frontier 36, so as to generate a more complete efficient frontier. The more complete efficient frontier provides a user, such as a portfolio manager, with further options as to the characteristics of a particular portfolio which might be chosen.

Portfolio Selection Using Visualization Technique and Decision Making in Multi-Objective Optimization Hereinafter, further aspects of the systems and methods of embodiments of the invention will be described relating to portfolio selection using visualization techniques and decision making in multi-objective optimization.

Real-world problems are often characterized by multiple measures of performance, which need to be optimized or at least satisfied simultaneously. The decision maker needs to search for the best, i.e., the non-dominated solutions, while evaluating and aggregating his/her preferences over multiple criteria. For instance, the decision maker, for instance portfolio manager or investor, might want to find the portfolio that minimizes risk (measured by standard deviation, value at-risk, credit risk, etc.) and maximizes expected return (measured by expect profits, accounting income, yield, etc.). Since these objectives cannot be satisfied simultaneously, tradeoffs must be performed. In accordance with one aspect of the invention, we need to establish a search method driven by multi-objective functions to find non-dominated solutions, a multi-criteria tradeoff policy, and an order for the optimization process. It should be noted that the search for the best solution and the multi-criteria aggregation are not independent activities.

(Horn 1997) identifies three models of decision-making. The first method relates to performing multi-objective aggregation and decision before search. This approach reduces the dimensionality of the problem by adding more ordering information. This is a well-known approach that could potentially generate sub-optimal solutions when the solution space is not convex.

Further, a second known approach is to perform search before multi-objective aggregation. This second approach postpones tradeoffs until large numbers of inferior, dominated solutions are eliminated and the efficient Pareto Front has been identified.

Lastly, a third method iteratively integrates search and multi-objective aggregation and decision. This third approach starts with a multi-criteria search that provides the decision maker with a preliminary idea of possible tradeoffs. The decision maker can then make multi-criteria decisions, limiting the search space dimensionality. A new search is then performed in this region of the solution space.

In accordance with one embodiment of the invention, the third such method is applied in a novel manner, i.e., so as to iteratively integrate search and multi-objective aggregation and decision.

With reference to the search processing utilized in this embodiment, we have already described the search process above, based on multi-objective evolutionary algorithms, to generate the Pareto Front. This front is a (hyper-) surface defined in the multi-objective space composed of the various metrics of return and risk used to evaluate a portfolio. Each point in such space represents a non-dominated solution, i.e. an efficient portfolio. At this point we need to incorporate the decision maker's preferences in the return-risk tradeoff. The goal is to reduce the large number of viable solutions (thousands of points) into a much smaller subset that could then be further analyzed for a final portfolio selection.

The present inventive concepts described herein provide visualization tools to elicit preferences and constraints to support down selection process. We consider the case in which the decision maker is an integral part of the process. First we will discuss some of the visualization tools that might be used to support this analysis, and then we will briefly describe the down-selection process. Finally we will provide an example using a sequence of 2D projections generated with the assistance of a graphic tool provided by and licensed from AETION, Inc., and which is described in greater detail in (Josephson et al.1998). J. R. Josephson, B. Chandrasekaran, M. Carroll, N. S. Iyer, Wasacz, G. Rizzoni, Q. Li, and D. A. Erb, "An Architecture for Exploring Large Design Spaces." Proceedings of National Conference of the American Association for Artificial Intelligence, Madison, Wis., pp. 143-150, 1998. There are many known visualization tools that could be used to support the down selection and tradeoff process, such as parallel coordinates, web-diagrams, sequence of 2D projections, etc.

Figure 14:
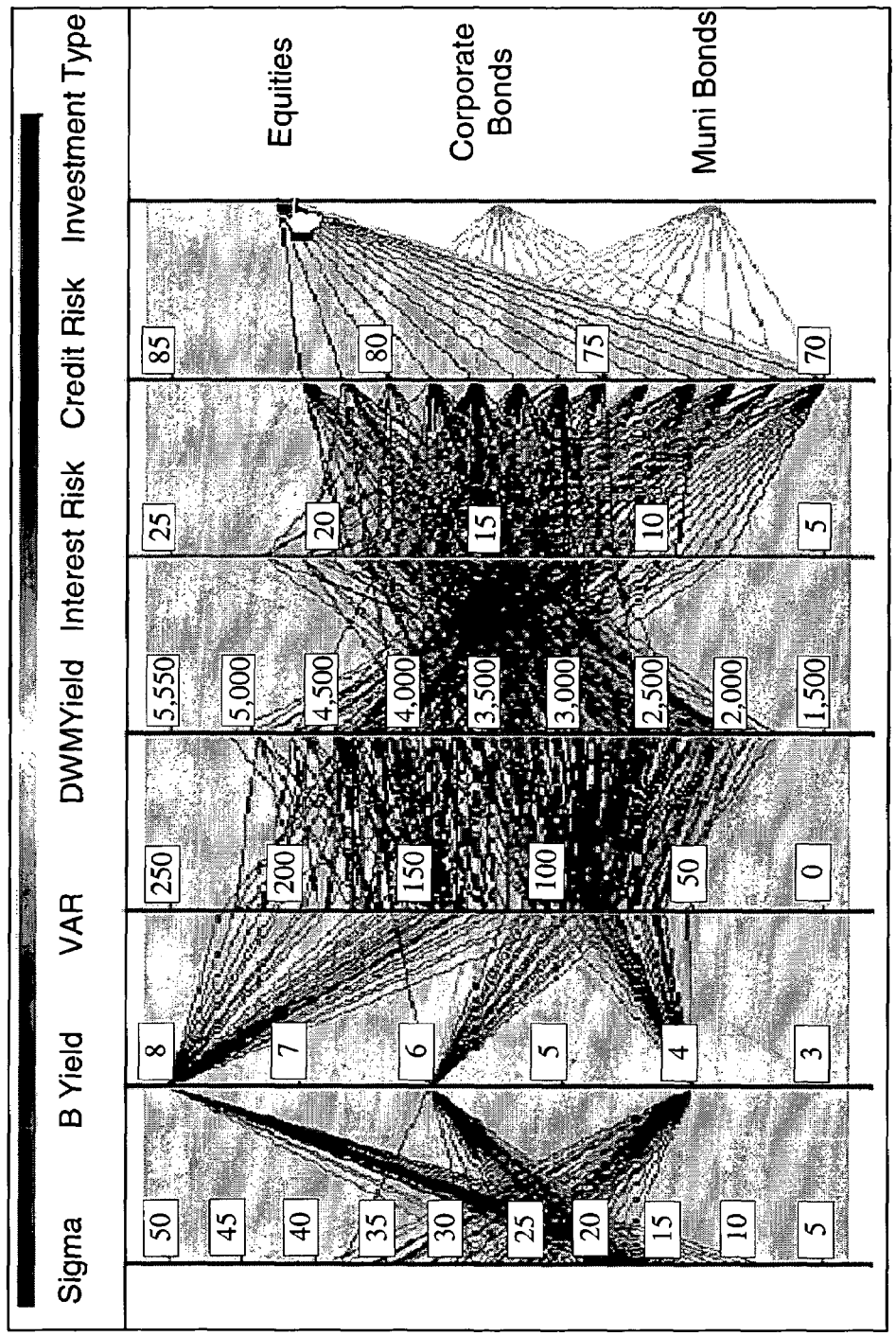
FIG. 14 is a graph showing a parallel coordinate plot in accordance with one embodiment of the invention.

For example, a parallel coordinates approach might be used. Using parallel coordinates, we can visualize a portfolio as line segments that pass through a sequence of post (one for each corresponding metrics). The order of the posts indicates the relative priorities of the metrics in the tradeoff process. FIG. 14 shows an example of the parallel coordinates approach.

An alternative to the parallel coordinates is the Web-diagrams, which have the same interpretation as the parallel coordinates. In this case all posts share the same origin.

Further, another method to visualize a high dimensional space is to generate a sequence of lower-dimensional projections. This method is the base of some Unix visualization tool, such as XGOBI and is in the same family of interactive visualization and decision-making tools as is the AETION, Inc. graphical tool that will be used later in our example.

In accordance with one embodiment of the invention, a process includes defining a down-selection (or filtering) process that is based on iterative constraints and tradeoffs performed in the (Return, Risk) space. Return is a subspace that could be measured by one or more return metrics, such as expected profits, accounting income, yield etc. Similarly, Risk is a subspace that can also be defined by one or more metrics, such as Standard Deviation, Value at Risk (VAR), Interest Risk, Credit Risk etc.

In addition to these metrics, which could be used in the optimization process described above, we could also compute additional metrics that will be used only to guide the down selection and tradeoff process.

In accordance with one embodiment of the invention, the first step includes posting a set of independent constraints to determine the lower limits on return and the upper limits on risk, for each of the metrics. The set of potential solutions is refined as each of these constraints is executed. At the end of this process, we are left with all the points that have satisfied all these limit constraints.

Further Dependent Filters may be utilized. That is, at this point the decision maker will perform local tradeoffs, usually local dominance-filters such as a Pareto Front on a projection of the original space. Note that these tradeoffs are performed on sub-spaces (regions) of the original portfolio performance space. The order of these filters will determine the relative importance of each of the tradeoffs and reflects the preference of the decision maker.

Additional metrics, with their associated constraints, could be used to further refine the down selection process. For instance, we could consider the case in which a Pareto Front is constructed in 3 dimensions, maximizing yield and minimizing variability (standard deviation) and Value at Risk (VAR). We could augment the space with an additional metric: transaction cost, which for the sake of simplicity could be considered proportional to the amount of changes (sell and buy) that must be applied to the original portfolio to transform it into its new desired configuration. It might be the situation that we do not want to explicitly minimize transaction costs, since the goal of generating a robust (to VAR) portfolio is more important and will conflict with this (robust portfolios require diversification, which in turn requires higher number of changes). However, after the multi-objective evolutionary algorithm described above has generated the Pareto Front, and we found the non-dominated solutions in the performance space (measured for instance by yield, standard deviation, and Value at Risk), we would like to consider transaction cost as part of our tradeoff policy.

For purposes of illustration, let us consider as an example a portfolio rebalancing problem, in which the original portfolio needs to be modified to maximize the return measure Book yield (B-yield), while minimizing two risk measures (Risk1 and Risk2). A three-dimensional Pareto Front was obtained using the evolutionary search described above. In addition, we also computed three other metrics that will be used in the tradeoffs: Market Yield (M-yield), Dollar Duration Weight Market Yield (DWM-yield), and transaction costs (Delta). We use a graphical tool, licensed from AETION, Inc., that shows 2D projections of the multi-dimensional Pareto Front. If the Pareto Front is defined in N1 dimensions and we use an additional set of N2 metrics to guide the tradeoffs, we will have to examine (N1+N2)*(N1+N2−1)/2 projections. In this example the total number of possible projection will be (3+3)*(3+3−1)/2=15. However, we will not need all 15 projections, since some of them have higher priority in the decision-making process, because of the subjective preferences of the decision-maker, and will have a strong effect in the down selection process.

Figure 15:
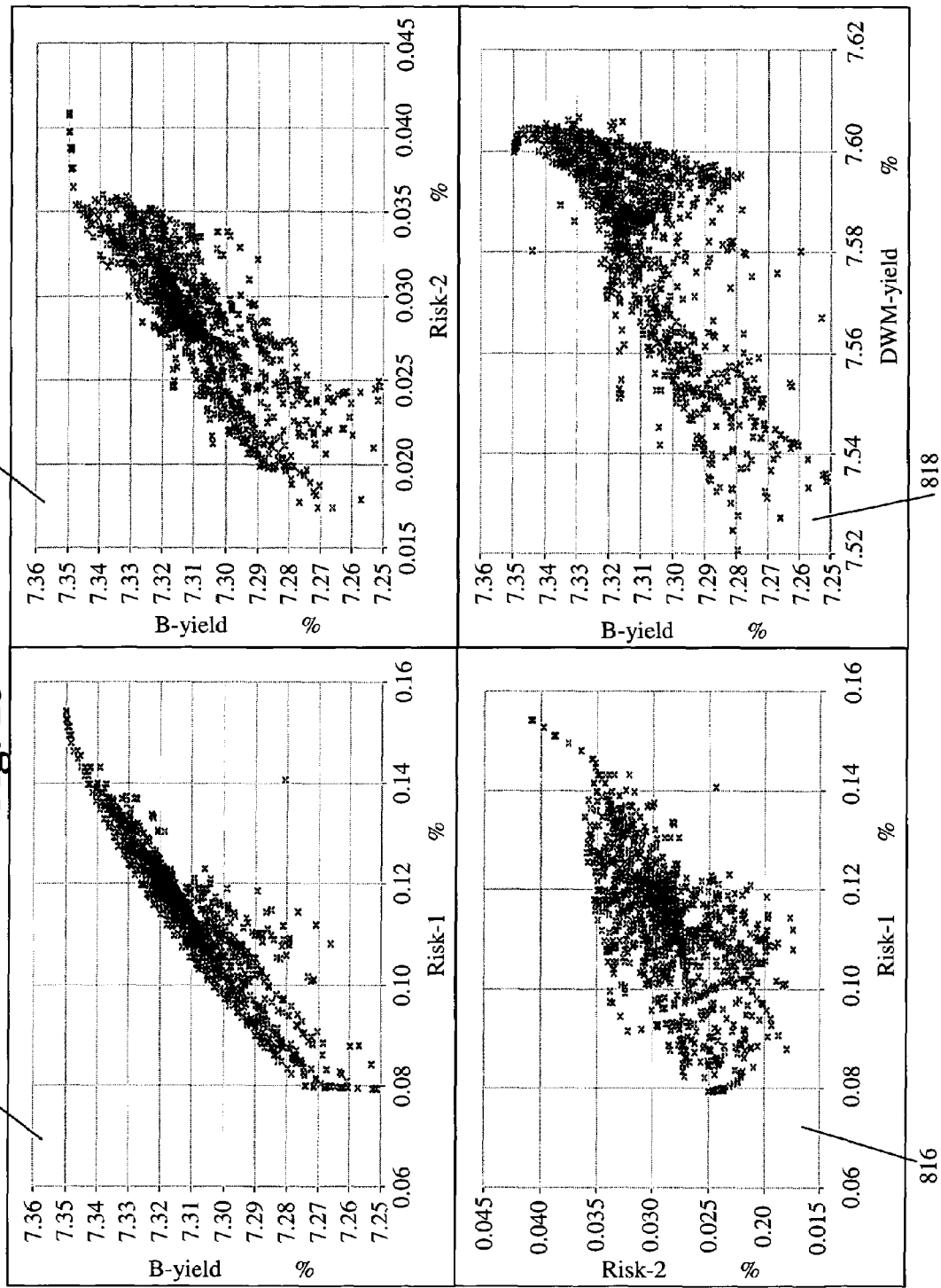
FIG. 15 is a diagram showing four projections illustrating aspects of a portfolio rebalancing problem in accordance with one embodiment of the invention.

In accordance with one embodiment of the invention, we project the Pareto Front on four projections: (B-yield, Risk1) 812, (B-yield, Risk2) 814, (Risk2, Risk1) 816, and (B-yield, DWM-Yield) 818. With reference to FIG. 15, the first two projections show tradeoffs between return and risk (using different metrics), while the third and fourth projections show relationship between risk metrics and between return metrics. These projections are also shown in FIGS. 16-22, as described below.

Figure 16:
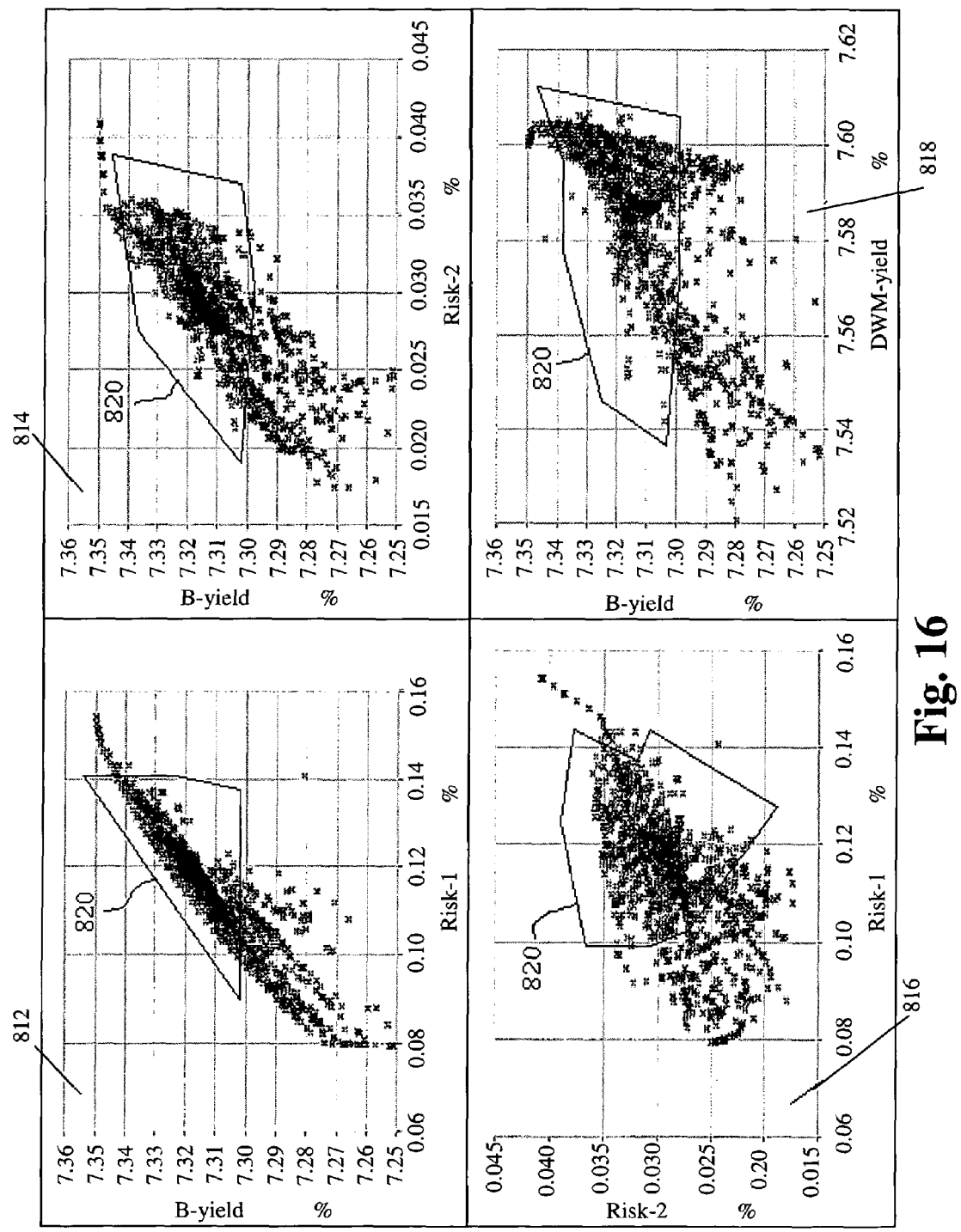
FIG. 16 is a further diagram showing four projections illustrating aspects of a portfolio rebalancing problem in accordance with one embodiment of the invention.

In this example, the first step is to define the independent constraints in the (Return, Risk) space, such as limits on the "minimal amount of return" (B-yield) and the maximum amount of risk (Risk1) that the decision maker is willing to accept. For instance, illustratively we want all portfolios to yield at least 7.3% and have a Risk1 of at most 0.14%. As shown in FIG. 16, all points satisfying these criteria are respectively illustrated in the four projections as areas 820.

Figure 17:
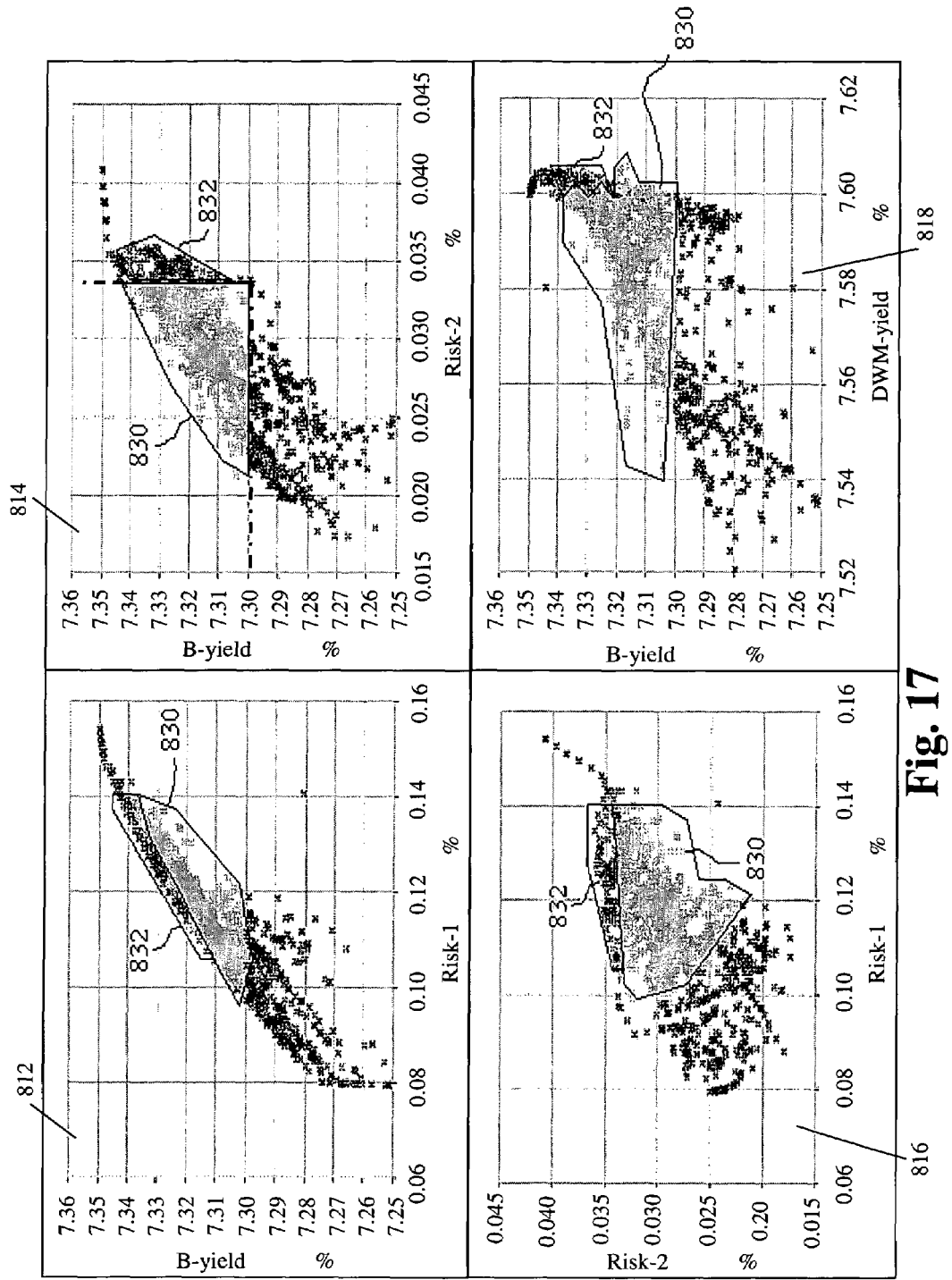
FIG. 17 is a further diagram showing four projections illustrating aspects of a portfolio rebalancing problem in accordance with one embodiment of the invention.

Now we consider the third metric, by limiting Risk2 not to exceed 0.034%, for example. With reference to FIG. 17, the portfolios satisfying this constraint and the previous ones are shown by the areas 830. Further, as shown in FIG. 17, the points satisfying the first set of constraints, but not the last one, are shown by the area 832. Further, the remaining points shown in FIG. 17 do not satisfy any constraints. Accordingly, it should be appreciated that the only relevant part of this display of FIG. 17 is the set of points in the areas 832.

Figure 18:
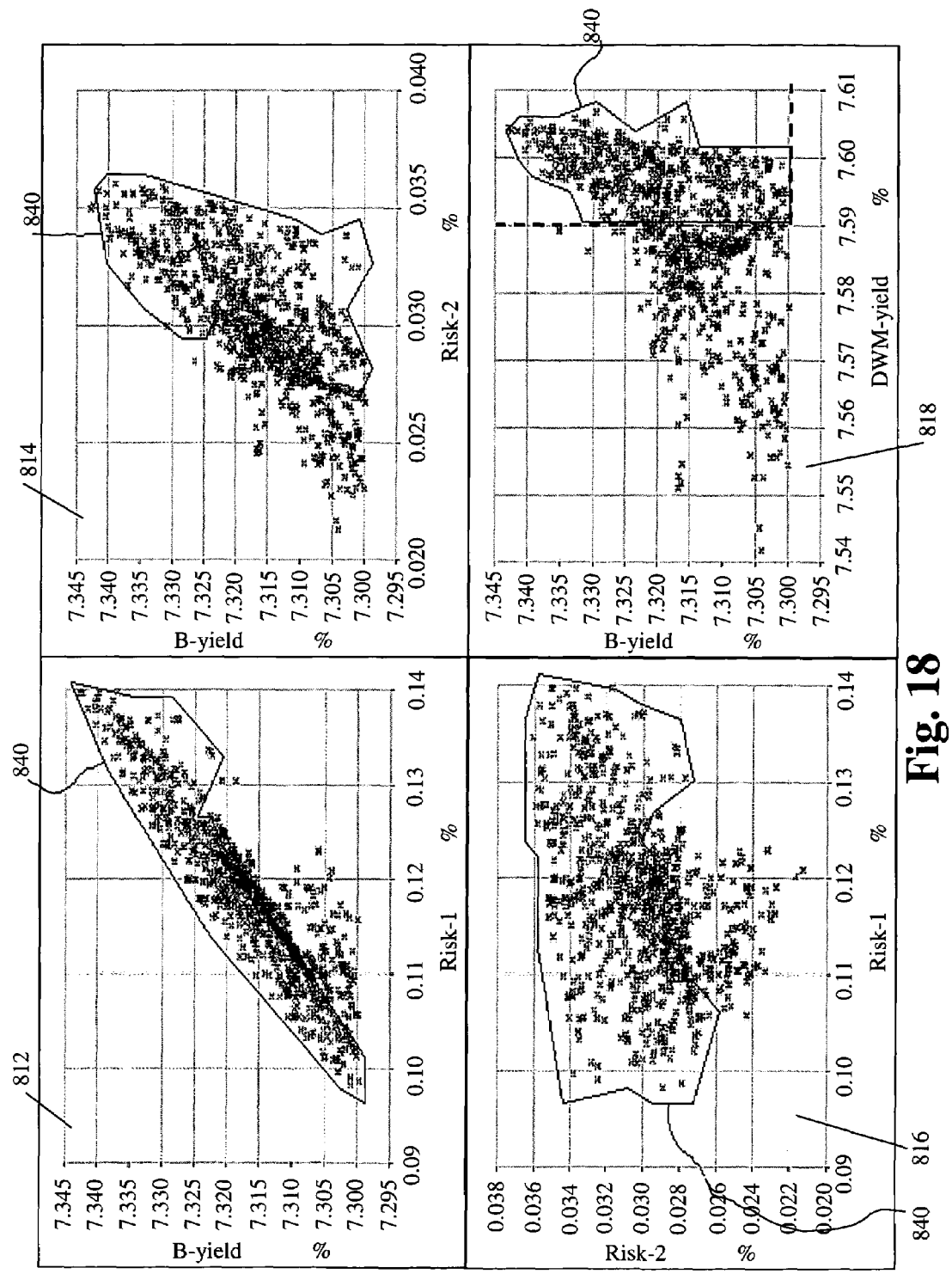
FIG. 18 is a further diagram showing four projections illustrating aspects of a portfolio rebalancing problem in accordance with one embodiment of the invention.

At this point we want to eliminate the points that do not satisfy all the previous constraints and zoom in the region with the most promising solutions. We started with 1237 points. As part of executing these three constraints, we have reduced the number of points to a subset of 894 points. Now we impose the last independent constraint, by limiting the second yield metric DWM-yield to be greater or equal than 7.59%. As illustrated in FIG. 18, all the points satisfying this and all previous constraints are shown in the areas 840.

Figure 19:
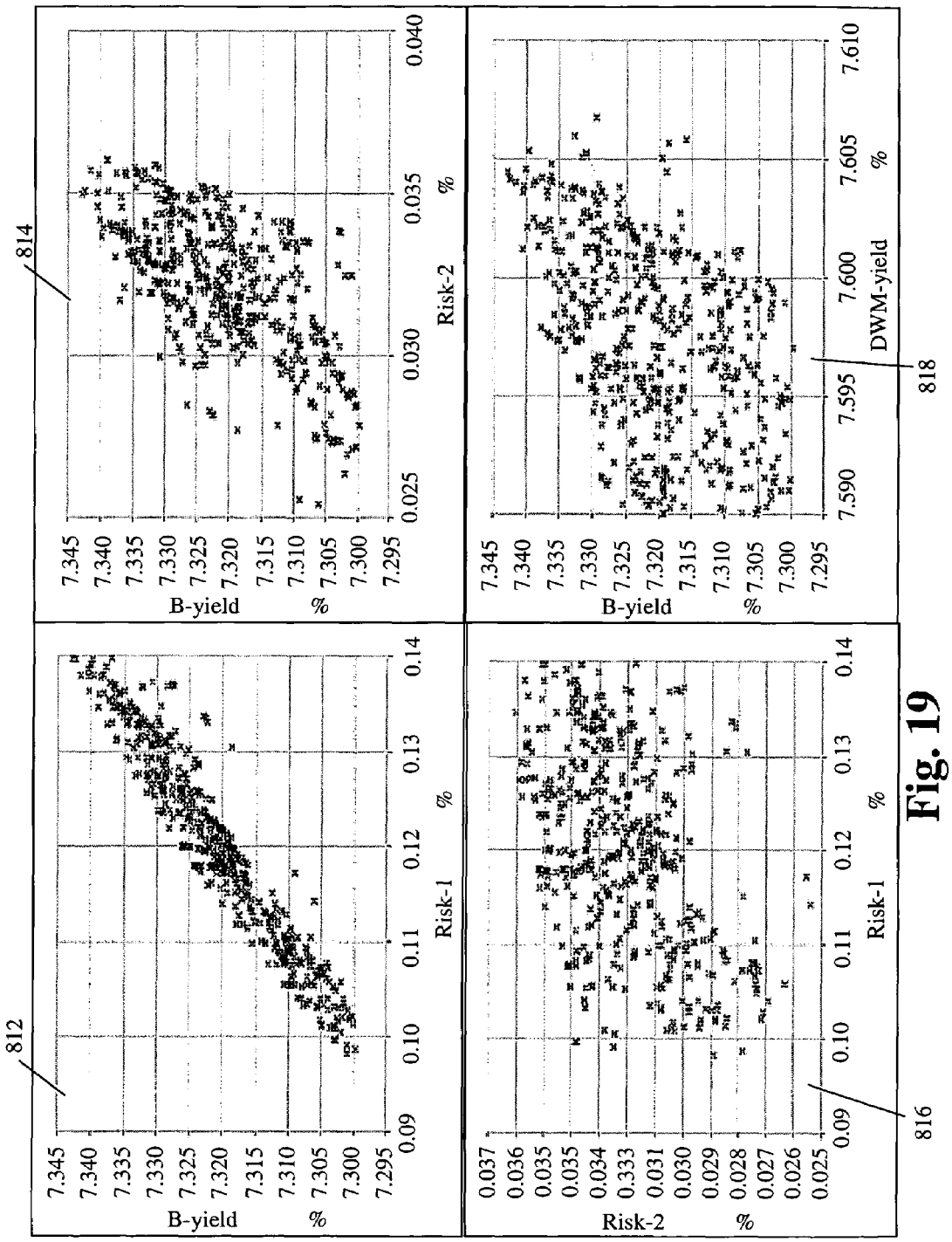
FIG. 19 is a further diagram showing four projections illustrating aspects of a portfolio rebalancing problem in accordance with one embodiment of the invention.
Figure 20:
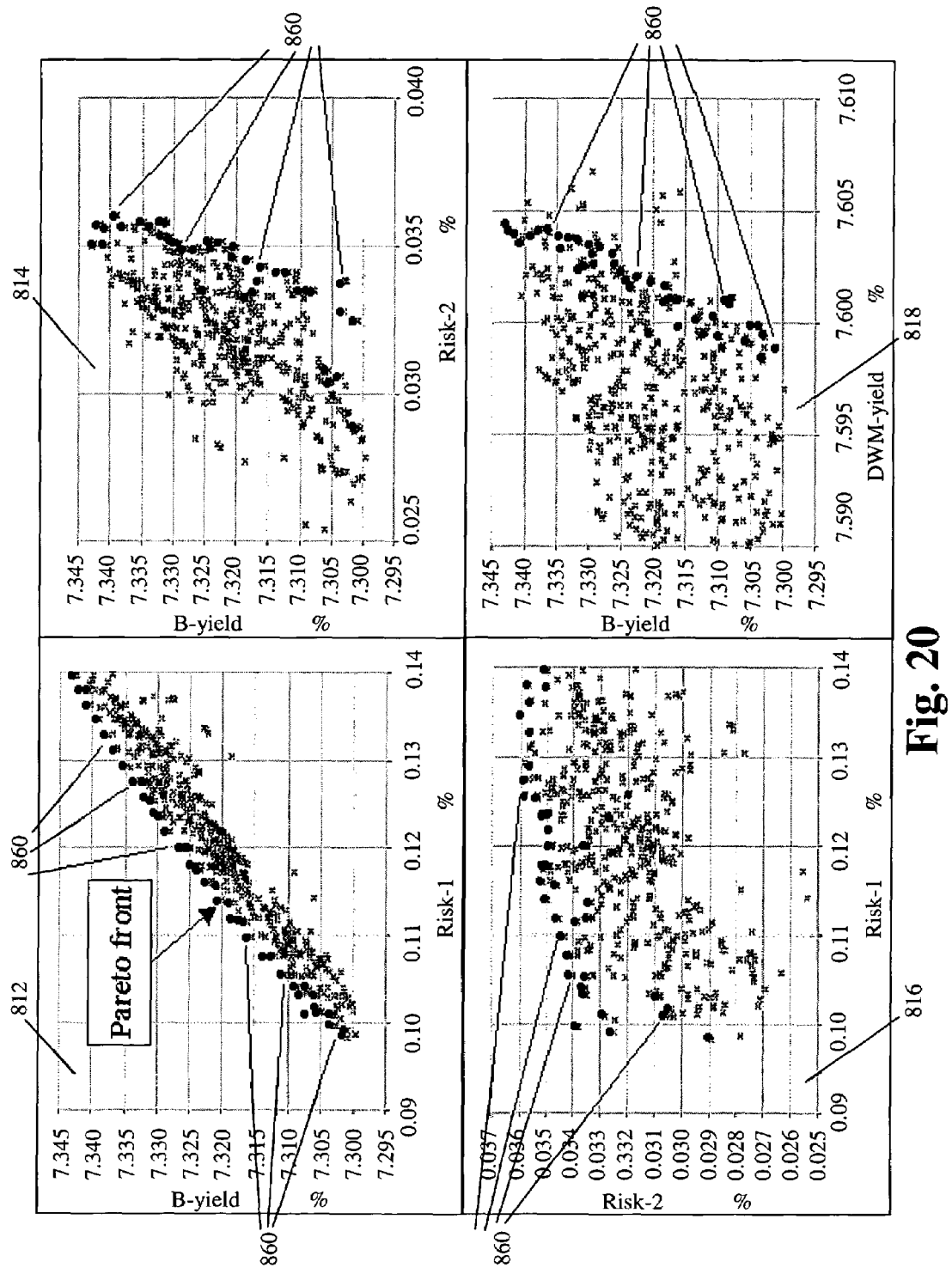
FIG. 20 is a further diagram showing four projections illustrating aspects of a portfolio rebalancing problem in accordance with one embodiment of the invention.

This is the result of applying the independent constraints to the initial set. We have reduced the number of solutions from 1237 to 479. All these points, redrawn as the points shown in FIG. 19, are globally non-dominated points that satisfy all the independent constraints. Note that the order of the application of the independent constraints is irrelevant, as the result would be the same. These constraints could have also been defined and executed in a batch mode, i.e., using a standard query.

As described above, we have performed a series of independent constraints, by defining separate lower limits on return and upper limits on risk. At this point we can perform limited, local tradeoffs, i.e., focusing on a subspace of the total space, by creating the Pareto Front in the 2-dimensional region (B-yield, Risk1). The 55 points that satisfy this tradeoff are shown by the dots 860 of FIG. 20. It should be appreciated that the order in which the local tradeoffs are performed is indeed relevant to the result. By starting in the (B-yield, Risk2) projection we state that, after satisfying all independent constraints, we want the best performance of the portfolio in this subspace, i.e., trying to maximize Book Yield and minimize Risk2, for example.

Figure 21:
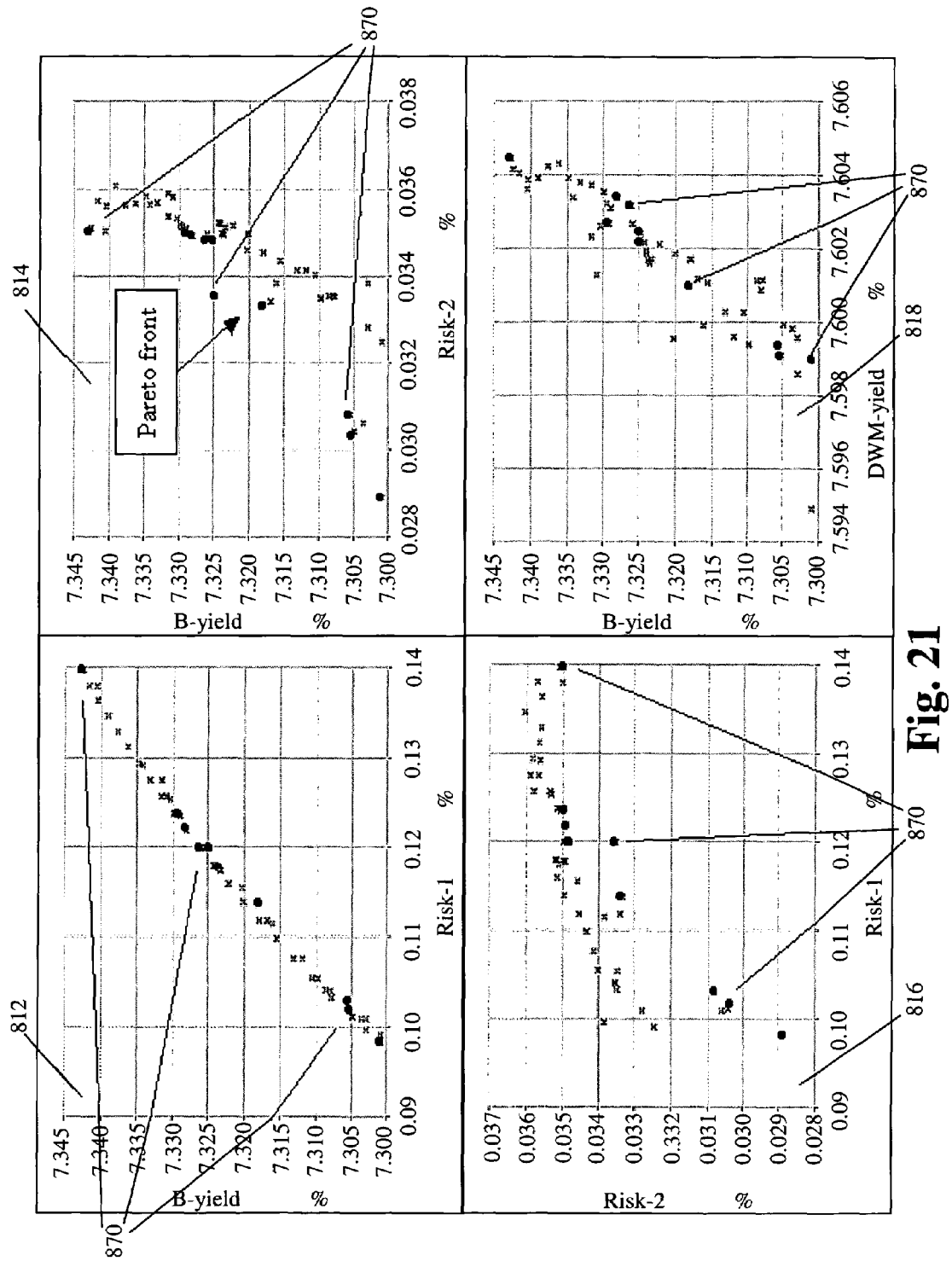
FIG. 21 is a further diagram showing four projections illustrating aspects of a portfolio rebalancing problem in accordance with one embodiment of the invention.
Figure 22:
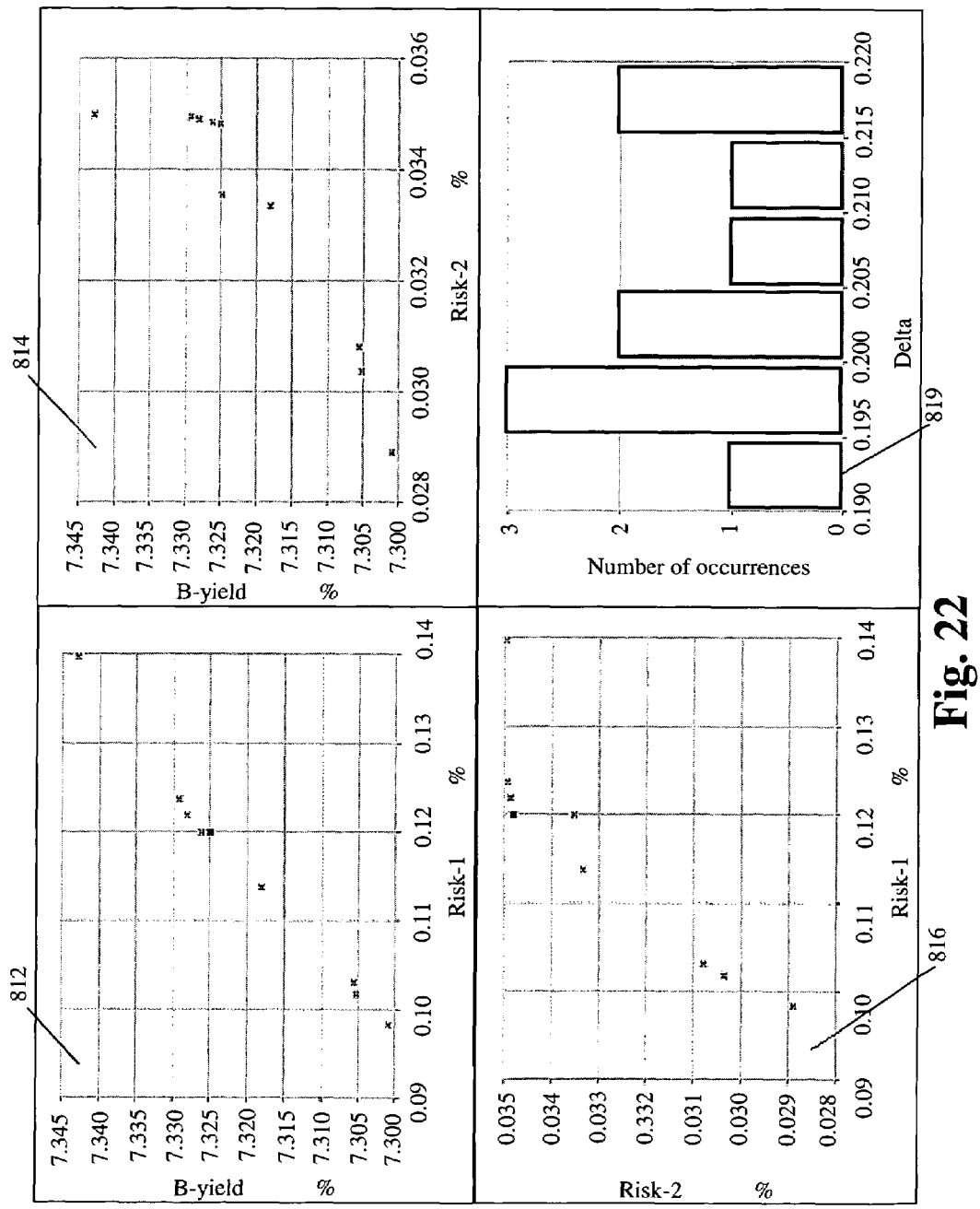
FIG. 22 is a further diagram showing four projections illustrating aspects of a portfolio rebalancing problem in accordance with one embodiment of the invention.

After imposing this ordering preference, we zoom into the resulting 55 points as shown in FIG. 21. We then perform the next most important tradeoff, generating a Pareto Front in the (B-yield, Risk2) region. The 10 points of this second front are shown in FIG. 21 as the points 870.

In accordance with one embodiment of the invention, at this point we could use additional metrics and constraints. For example, we could zoom into this new subset of 10 points and use other metrics, e.g., transaction cost (Delta), to select the lowest cost portfolio, as shown in the bar graph 818 in FIG. 22.

Figure 23:
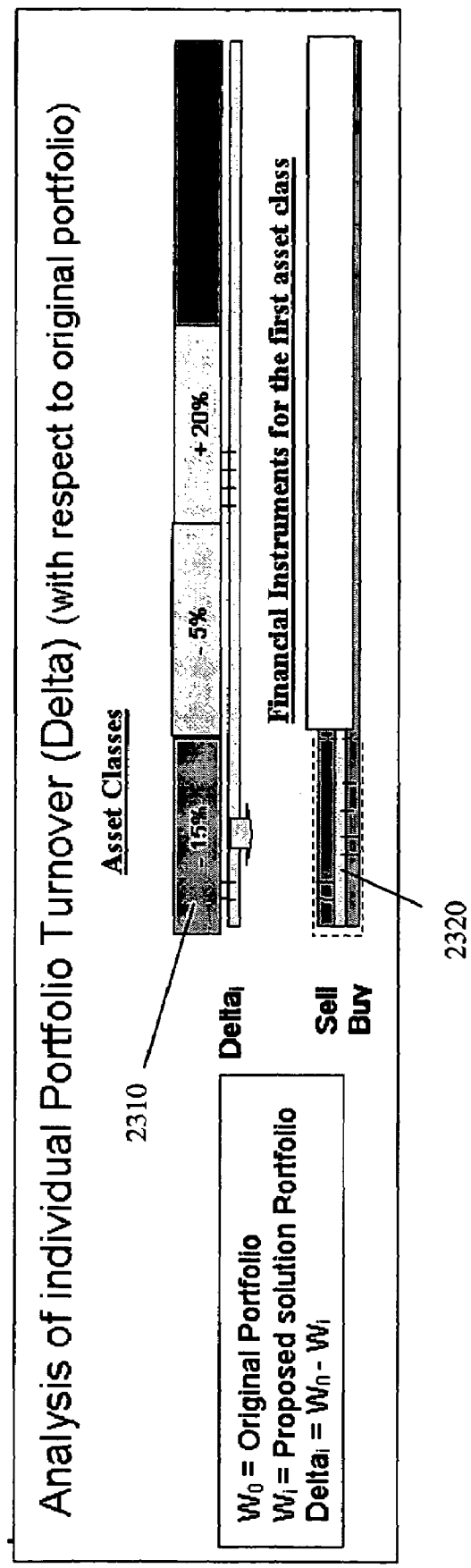
FIG. 23 is a diagram showing aspects of individual portfolio turnover analysis in accordance with one embodiment of the invention.

Alternatively, instead of applying additional constraints, we could analyze the structure of the subset of 10 points in the portfolio configuration space (X) instead of the portfolio performance space (Y). In FIG. 23, we describe an example in which we visualize the asset allocation configuration of one of the selected ten portfolios. We could visualize the asset class allocation (2310) or individual securities in that asset class (2320). This will allow us to determine the overall transaction costs due to portfolio turnover and compare it with the other nine portfolios.

Let us assume that in our example we only consider five asset classes, such as AAA Corporate bonds, AA, etc., as illustrated in FIG. 24. We will compare the allocation in the original portfolio with the allocation in each of the best 10 portfolios being considered.

As illustrated by FIG. 25, we compute the percentage of "sell" transactions (negative changes) and "buy" transactions (positive changes) required to transform the original portfolio into the new one.

Figure 26:
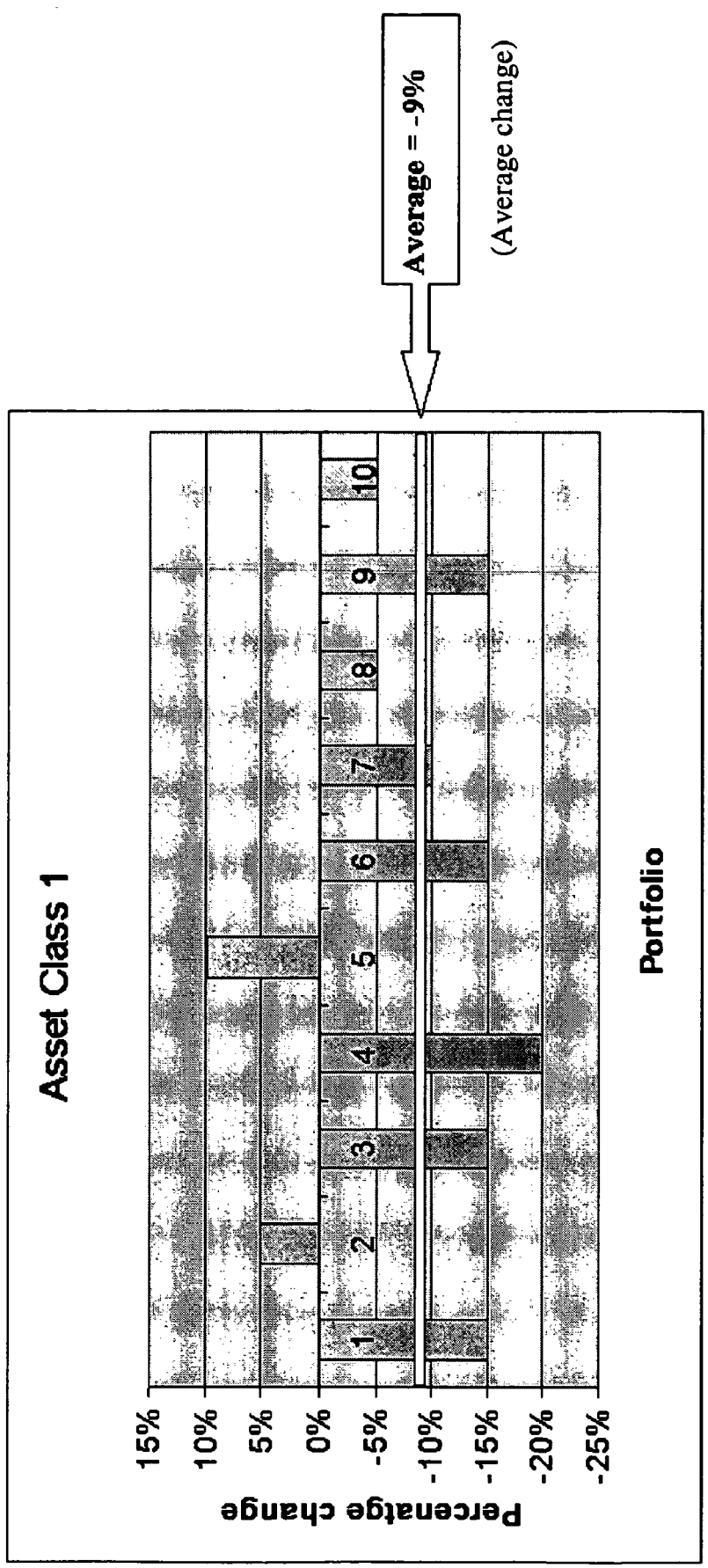
FIG. 26 is a further diagram showing aspects of manipulation and analysis of asset classes in accordance with one embodiment of the invention.

Let us focus on the first asset class. The average transaction (across all ten portfolios) involves selling 9% of the allocation in this asset class. The histogram of the suggested changes in this asset class across all portfolios is shown in FIG. 26.

By looking at this histogram we might decide that we do not want to increase our holdings in this class and decide to drop portfolio 2 and 5 (which would require further buy transactions in this asset class.) We could continue this process for other asset classes, the order again reflecting our sense of priority for each asset class, until the subset of 10 portfolios is reduced to a final point.

We could also perform a similar analysis by looking at the absolute allocations by asset classes required by each portfolio, instead of the deltas, and impose limits on the total investment that we want to have in those asset classes.

It should be appreciated that various visualization tools might be used in practice of the process as described above with respect to FIGS. 15-22, for example. For example, the visualization tool offered by AETION, Inc. might be used. However, it is appreciated that a variety of visualization tools might alternatively be utilized.

Figure 27:
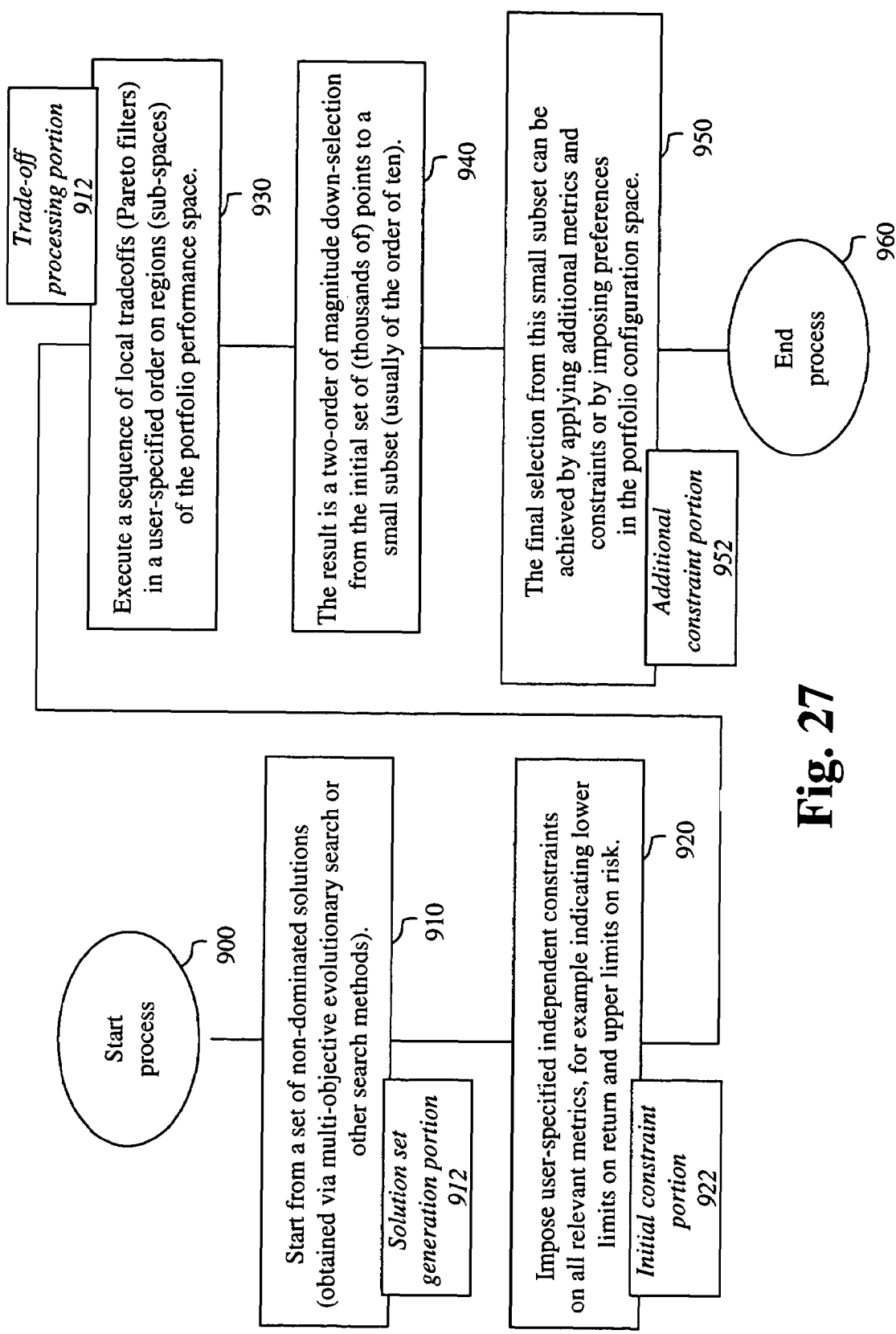
FIG. 27 is a flowchart showing a process using tradeoffs in accordance with one embodiment of the invention.
Figure 28:
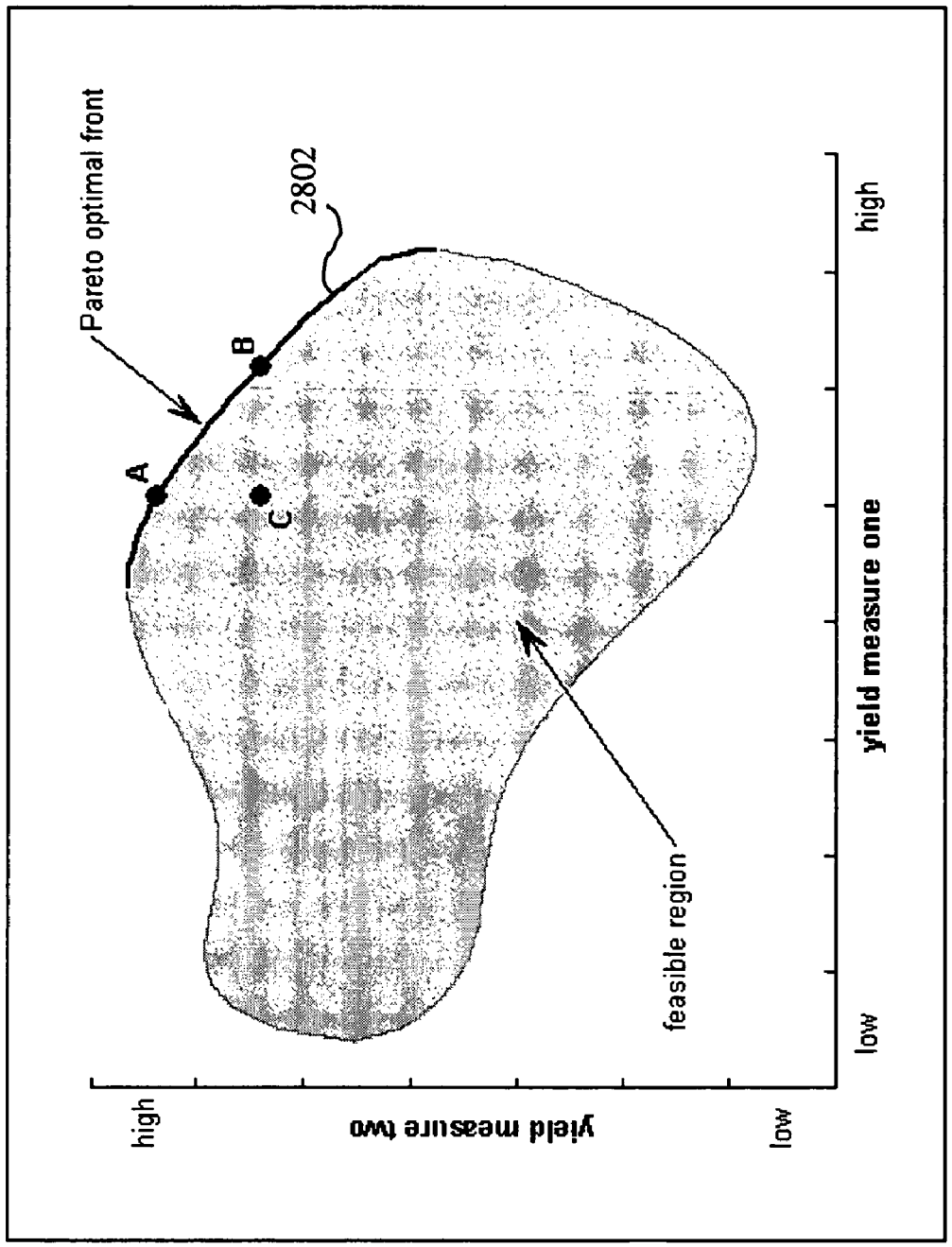
FIG. 28 is a graph showing a Pareto optimal front as is known in the art.

Accordingly, various aspects of the process have been described above. In summary, FIG. 27 presents the steps of the process. As shown in FIG. 27, the process starts in step 900 and passes to step 910.

In step 910, the process starts from a set of non-dominated solutions. These solutions might be obtained via multi-objective evolutionary search or other search methods. As illustrated in FIG. 27, the non-dominated solutions might be generated by a solution set generation portion 912, as is described above. Then in step 920, the process imposes user-specified independent, or alternatively dependent, constraints on all relevant metrics, for example lower limits on return and upper limits on risk. As illustrated in FIG. 27, the application of the constraints in step 920 might be performed by an initial constraint portion 922. After step 920, the process passes to step 930.

In step 930, the process executes a sequence of local tradeoffs (Pareto filters) in a user-specified order on regions (sub-spaces) of the portfolio performance space, as is described in detail above. The execution of this sequence of local trade-offs might be performed by a trade-off processing portion 912, as is shown in FIG. 27. As shown in step 940, the result of the processing of step 930 is a two-order of magnitude down-selection from the initial set of (thousands of) points to a small subset (usually of the order of ten). After step 940, the process passes to step 950.

In step 950, the final selection from this small subset can be achieved by applying additional metrics and constraints or by imposing preferences in the portfolio configuration space. For example, as discussed above, the additional metrics or constraints might relate to a variety of parameters including asset allocation, commission rates, or transaction costs, for example. The imposition of these additional metrics might be illustratively performed by a subsequent constraint portion 950, for example. After step 950, the process ends in step 960.

In accordance with one aspect of the invention, the visualization techniques described above may utilize two types of metrics. These two types include "performance metrics" (in a performance space), as well as "portfolio configuration metrics" (in portfolio configuration space). Performance metrics may be characterized as metrics that measure the actual performance of a particular solution in a space. On the other hand, portfolio configuration metrics do not measure of the performance of a particular solution. Rather, portfolio configuration metrics measure particular attributes about a solution, i.e., a portfolio. For example, portfolio configuration metrics may measure the transactions necessary to convert one portfolio to a second portfolio. Alternatively, portfolio configuration metrics may measure the required transaction costs to generate a particular portfolio.

FURTHER ASPECTS OF THE INVENTION

In accordance with various embodiments of the invention described herein, a system and method for solving multifactor nonlinear non-convex multi-objective portfolio risk optimization problems is presented. The approach is based on a powerful combination of Evolutionary Algorithms and algorithms and heuristics that exploit problem domain knowledge. The disclosed approach to multifactor nonlinear non-convex portfolio risk optimization is based on a combination of Evolutionary Algorithms and algorithms and heuristics that exploit domain knowledge.

The approach exploits domain knowledge via (i) the geometrical nature of the problem to explore and partially memorize the bounds of the feasible space and (ii) the geometrical nature of the problem to design search operators that can efficiently explore the interiors of the feasible space, and (iii) employs a powerful combination of Evolutionary Algorithms for identifying the Pareto frontier over multiple nonlinear and non-convex return and risk objectives.

The principal advantage of this approach over existing approaches is that it facilitates risk management and investment decisions by the identification of an efficient frontier with respect to multiple measures of return and risk and the selection of portfolios using visualization technique. The approach does not require that these measures be linear, convex if nonlinear, or in analytical forms. The only requirement of the disclosed approach is that the search space be defined by a set of linear constraints that enclose a convex polytope.

FURTHER ASPECTS OF EMBODIMENTS OF THE INVENTION

As described above, a goal of portfolio optimization is maximizing return and, at the same time, minimizing risk. This might be characterized as a two-objective optimization problem. However, it is appreciated that the systems and methods of the invention are not limited to manipulating, e.g., minimizing, risk. That is, the systems and methods of the invention may be used to consider and manipulate any of a wide variety of objectives in connection with a portfolio optimization problem.

Various methods in accordance with the various embodiments of the invention, and steps that go to make up those methods, are described above. It is appreciated that suitable processing components may be used to implement each and every step as described above. Further, a particular processing component might only process one method step as described above or a particular processing component might process a plurality of method steps, for example. Alternatively, a particular process step might be implemented using a plurality of processing components. The suitable processing components might include code or a portion of code, for example. Further, the suitable processing components might include a computer system or part of a computer system, for example. Further aspects of implementation of the various embodiments of the invention are illustratively described below in further detail.

As described above, various inventions and various embodiments are described, including various processing components and various processes. Hereinafter, general aspects relating to possible implementation of the inventions, and embodiments thereof, will be described.

The various systems of the inventions or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

In accordance with one aspect of the inventions described above, it is appreciated that a variety of off-the-shelf software is described above. The features of the inventions may be used in conjunction with such off-the-shelf software and to enhance such off-the-shelf software, as described herein. However, it is noted that the features of the invention are not limited to implementation with any particular off-the-shelf software.

REFERENCES

As noted above, various references have been cited showing the state of the art. These cited references, each of which is incorporated by reference in their entirety, include:

Thomas Bäck. Evolutionary Algorithms in Theory and Practice. Oxford University Press, New York, 1996.

Carlos A. Coello, David A. Van Veldhuizen, and Gary B. Lamont. Evolutionary Algorithm MOP Approaches. In Evolutionary Algorithms for Solving Multi-Objective Problems, pp 59-99. Kluwer Academic, 2002.

Indraneel Das and John Dennis. A Closer Look at Drawbacks of Minimizing Weighted Sums of Objectives for Pareto Set Generation in Multicriteria Optimization Problems. Structural Optimization, 14(1), pp 63-69, 1997.

Neil Eklund. Multiobjective Visible Spectrum Optimization: A Genetic Algorithm Approach. Ph.D. Thesis, Rensselaer Polytechnic Institute, Troy, N.Y., 2002.

David E. Goldberg. Genetic Algorithms in Search, Optimization, and Machine Learning. Addison-Wesley, Massachusetts, 1989.

J. D. Schaffer, and J. J. Grefenstette, "Multi-objective Learning via Genetic Algorithms," In Proceedings of the Ninth International Joint Conference on Artificial Intelligence, pp. 593-595, 1985.

Raj Subbu and Arthur C. Sanderson. Modeling and Convergence Analysis of Distributed Coevolutionary Algorithms. In Proceedings of the IEEE International Congress on Evolutionary Computation, pp 1276-1283, 2000.

Arthur P. Dempster. Upper and lower probabilities induced by a multivalued mapping. Annals of Mathematical Statistics, 38:325-339, 1976.

Glenn Shafer A Mathematical Theory of Evidence, Princeton University Press, Princeton, N.J., 1967.

B. Schweizer and A. Sklar. Associative Functions and Abstract Semi-Groups,. Publicationes Mathematicae Debrecen, 10:69-81, 1963.

Piero Bonissone. Summarizing and Propagating Uncertain Information with Triangular Norms, International Journal of Approximate Reasoning, 1(1):71-101, January 1987.

W. Winston, Operations Research: Applications and Algorithms. Duxbury Press, Belmont, Calif., 1994.

D. Goldberg, The Design of Innovation: Lessons from and for Competent Genetic Algorithms. Kluwer Academic Publishers, Norwell, Mass., 2002.

Z. Michalewicz, Genetic Algorithms+Data Structures=Evolution Programs (3rd. Ed). Springer-Verlag, Berlin, 1996.

F. Green, A method for utilizing diploid/dominance in genetic search. In, Michalewicz, Z. Schaffer, J., Schwefel, H., Fogel, D., and Kitano, H. (Eds.), Proceedings of the First IEEE International Conference on Evolutionary Computation, v1, 439. IEEE Service Center, Piscataway, N.J., 171-176, 1994.

D. Goldberg and K. Deb, A comparison of selection schemes used in genetic algorithms. In Foundations of Genetic Algorithms, Rawlins, G. (Ed.), 69. M. Kaufmann Publishers, San Mateo, Calif., 69-93, 1991.

C. Coello and A. Christiansen, MOSES: A multiobjective optimization tool for engineering design. Engineering Optimization, 31, 337-368, 1999.

J. R. Josephson, B. Chandrasekaran, M. Carroll, N. S. Iyer, Wasacz, G. Rizzoni, Q. Li, and D. A. Erb, "An Architecture for Exploring Large Design Spaces." Proceedings of National Conference of the American Association for Artificial Intelligence, Madison, Wis., pp. 143-150, 1998.

J. Horn, Multicriterion Decision Making, Handbook of Evolutionary Computation, (Back T, Fogel DB and Michalewicz Z, eds.), pages F1.9:1-F1.9:15, IOP Publ. Ltd and Oxford University Press, 1997.

V. Tarascio, Pareto's Methodological Approach to Economics. University of North Carolina Press, Chapel Hill, Va., 1968.

Piero Bonissone, Kareem Aggour, Rajesh Subbu, Weizhong Yan, Naresh Iyer, Anindya Chakraborty. SYSTEM AND PROCESS FOR A FUSION CLASSIFICATION FOR INSURANCE UNDERWRITING SUITABLE FOR USE BY AN AUTOMATED SYSTEM, U.S. application Ser. No. 10/425,721, filed Apr. 30, 2003.

It will be readily understood by those persons skilled in the art that the present inventions are susceptible to broad utility and application. Many embodiments and adaptations of the present inventions other than those herein described, as well as many variations, modifications and equivalent arrangements, will be apparent from or reasonably suggested by the present inventions and foregoing description thereof, without departing from the substance or scope of the invention.

Accordingly, while the present inventions have been described here in detail in relation to its exemplary embodiments, it is to be understood that this disclosure is only illustrative and exemplary of the present inventions and is made to provide an enabling disclosure of the various inventions. Accordingly, the foregoing disclosure is not intended to be construed or to limit the present invention or otherwise to exclude any other such embodiments, adaptations, variations, modifications and equivalent arrangements.

What is claimed is:

1. A computer-implemented method for multi-objective investment portfolio analysis and decision-making using visualization techniques the method sequentially comprising:

generating in a computing system on a processor a non-dominated solution set comprising an efficient frontier in an original portfolio performance space having at least three-dimensions of risk and return measures, each point in the original portfolio performance space representing a non-dominated solution, the non-dominated solution set generated using one of an evolutionary algorithm and optimization processing;

imposing in the computing system on the processor a sequence of user-specified constraints in either the original portfolio performance space or a portfolio configuration space containing portfolio allocations to reduce the non-dominated solutions in the non-dominated solution set to an initial solution subset, each solution in the initial solution subset representing a portfolio allocation;

executing in the computing system on the processor a sequence of Pareto filters in a user-specified order on regions of a lower dimensional portfolio performance space containing a lower dimensional projection of one of the non-dominated solution set and the initial solution subset to produce a resulting solution subset having a fewer number of points than the initial solution subset; and applying preferences on the resulting solution subset to produce a final selection, the final selection being used in investment decisions.

2. The method of claim 1, wherein the user-specified constraints is defined by limits on performance metrics.

3. The method of claim 2, wherein the performance metrics include risk and return.

4. The method of claim 2, wherein the user-specified constraints include imposing a lower limit on return and an upper limit on risk.

5. The method of claim 2, wherein the user-specified constraints include imposing a first range on return and a second range on risk.

6. The method of claim 1, wherein the preferences are represented by relative weights on performance metrics.

7. The method of claim 1, wherein the preferences are represented by relative weights on performance configuration metrics.

8. The method of claim 1, wherein after the imposing step, the method further includes:

applying portfolio configuration metrics based on a plurality of asset allocations in a portfolio; and comparing portfolio configuration metrics between a plurality of portfolios.

9. The method of claim 8, wherein the comparing step includes determining a required transaction to transform the plurality of asset allocations in a currently existing portfolio to a plurality of asset allocations in each of the portfolios in the resulting solution subset.

10. The method of claim 1, wherein the user-specified constraints are one of independent and dependent constraints.

11. A system for multi-objective investment portfolio analysis and decision-making using visualization techniques, the system comprising:

a solution set generation portion utilizing a processor of a computing device to generate a non-dominated solution set comprising an efficient frontier in an original portfolio performance space having at least three-dimensions of risk and return measures, each point in the original portfolio performance space representing a non-dominated solution, the non-dominated solution set generated using one of an evolutionary algorithm and optimization processing;

an initial constraint portion utilizing the processor of the computing device to impose a sequence of user-specified constraints in either the original portfolio performance space or a portfolio configuration space containing portfolio allocations to reduce the non-dominated solutions in the non-dominated solution set to an initial solution subset, each solution in the initial solution subset representing a portfolio allocation; and a trade-off processing potion utilizing the processor of the computing device to execute a sequence of Pareto filters in a user-specified order on regions of a lower dimensional portfolio performance space containing a lower dimensional projection of one of the non-dominated solution set and the initial solution subset to produce a resulting solution subset having a fewer number of points than the initial solution subset, the trade-off processing portion applying additional user-specific constraints to the resulting solution subset to produce a final selection, the final selection being used in investment decisions.

12. The system of claim 11, wherein the additional user-specific constraints are based on structure metrics.

13. A program storage device readable by a machine, tangibly embodying a program of instructions executable by the machine to perform method steps for multi-objective investment portfolio analysis and decision-making using visualization techniques, the method steps comprising:

generating a non-dominated solution set comprising an efficient frontier in an original portfolio performance space having at least three-dimensions of risk and return measures, each point in the original portfolio performance space representing a non-dominated solution, the non-dominated solution set generated using one of an evolutionary algorithm and optimization processing;

imposing a sequence of user-specified constraints in either the original portfolio performance space or a portfolio configuration space containing portfolio allocations to reduce the non-dominated solutions in the non-dominated solution set to an initial solution subset, each solution in the initial solution subset representing a portfolio allocation;

executing a series of Pareto filters in a user-specified order on regions of a lower dimensional portfolio performance space containing a lower dimensional projection of one of the non-dominated solution set and the initial solution subset to produce a resulting solution subset having a fewer number of points than the initial solution subset; and applying, after the resulting solution subset has been produced, additional user-specified constraints to the resulting solution subset to produce a final selection, the final selection being used in investment decisions.

14. A computer-implemented method for multi-objective investment portfolio analysis and decision-making using visualization techniques, the method sequentially comprising:

generating in a computing system on a processor a non-dominated solution set comprising an efficient frontier in an original portfolio performance space having at least three-dimensions of risk and return measures, each point in the original portfolio performance space representing a non-dominated solution, the non-dominated solution set generated using either an evolutionary algorithm or optimization processing;

imposing in the computing system on the processor a sequence of user-specified constraints in at least one of the original portfolio performance space and a portfolio configuration space containing portfolio allocations to reduce the non-dominated solutions in the non-dominated solution set to an initial solution subset, each solution in the initial solution subset representing a portfolio allocation; and executing in the computing system on the processor a series of Pareto filters in a user-specific order on regions of a lower dimensional portfolio performance space containing a lower dimensional projection of one of the non-dominated solution set and the initial solution subset to produce a resulting solution subset having a fewer number of points than the initial solution subset, the resulting solution subset being used in investment decisions; and wherein the executing the sequence of Pareto filters is performed in performance configuration space; and wherein after executing the sequence of Pareto filters in performance configuration space, the method further includes the steps of:

applying in the computing system on the processor portfolio configuration metrics based on a plurality of asset allocations in a portfolio; and comparing in the computing system on the processor portfolio configuration metrics between a plurality of portfolios.

* * * * *

UNITED STATES PATENT AND TRADEMARK OFFICE
CERTIFICATE OF CORRECTION

PATENT NO. : 7,630,928 B2
APPLICATION NO. : 10/781871
DATED : December 8, 2009
INVENTOR(S) : Bonissone et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1636 days.

Signed and Sealed this

Second Day of November, 2010

David J. Kappos
*Director of the United States Patent and Trademark Office*